US010521623B2

United States Patent
Rodriguez et al.

(10) Patent No.: US 10,521,623 B2
(45) Date of Patent: *Dec. 31, 2019

(54) DIGITAL IDENTITY SYSTEM

(71) Applicant: Yoti Holding Limited, London (GB)

(72) Inventors: Francisco Angel Garcia Rodriguez, Guadix (ES); Piers Powlesland, London (GB); Paolo Greci, London (GB); Laurence Withers, Reading (GB); Eleanor Simone Frederika Loughlin-McHugh, London (GB); Roman Edward Szczesniak, London (GB); Quirino Zagarese, London (GB)

(73) Assignee: Yoti Holding Limited, London (GB)

( * ) Notice: Subject to any disclaimer, the term of this patent is extended or adjusted under 35 U.S.C. 154(b) by 0 days.

This patent is subject to a terminal disclaimer.

(21) Appl. No.: 15/835,301

(22) Filed: Dec. 7, 2017

(65) Prior Publication Data
US 2018/0173906 A1 Jun. 21, 2018

Related U.S. Application Data

(63) Continuation of application No. 15/550,712, filed as application No. PCT/EP2016/053076 on Feb. 12, (Continued)

(30) Foreign Application Priority Data

Jun. 5, 2015 (GB) ...................................... 1509808

(51) Int. Cl.
H04L 29/06 (2006.01)
G06F 17/30 (2006.01)
(Continued)

(52) U.S. Cl.
CPC ......... *G06K 7/10297* (2013.01); *G06F 21/34* (2013.01); *G06Q 20/363* (2013.01);
(Continued)

(58) Field of Classification Search
CPC .. G06K 7/10297; G06Q 40/00; G06Q 50/265; G06Q 20/363; H04L 63/0861
(Continued)

(56) References Cited

U.S. PATENT DOCUMENTS 6,993,658 B1 1/2006 Engberg et al.
7,073,195 B2 7/2006 Brickell
(Continued)

FOREIGN PATENT DOCUMENTS

CN 101641707 A 2/2010
EP 1942430 A1 7/2008

OTHER PUBLICATIONS

Elisa Bertino; Privacy-preserving Digital Identity Management for Cloud Computing; 2009 IEEE.; p. 1-6.*
(Continued)

Primary Examiner — Monjur Rahim
(74) Attorney, Agent, or Firm — Knobbe, Martens, Olson & Bear, LLP

(57) ABSTRACT

A method of a digital identity system generating a sharing token for authenticating a bearer to a validator, wherein a data store of the digital identity system holds a plurality of attributes of the bearer, the method comprising implementing by the digital identity system the following steps: receiving at the digital identity system from a bearer an electronic sharing token request, wherein the token request identifies at least one of the bearer's attributes in the data store selected for sharing with a validator; in response to the electronic token request, generating a sharing token, which is unique to that request, for presentation by the bearer to a
(Continued)

validator; associating with the unique sharing token at the digital identity system the identified at least one bearer attribute; and issuing to the bearer the unique sharing token; and wherein later presentation of the unique sharing token to the digital identify system by a validator causes the at least one bearer attribute associated with the sharing token to be rendered available to the validator by the digital identity system.

20 Claims, 34 Drawing Sheets

Related U.S. Application Data 2016, which is a continuation-in-part of application No. 14/622,527, filed on Feb. 13, 2015, now Pat. No. 9,785,764, and a continuation-in-part of application No. 14/622,709, filed on Feb. 13, 2015, now Pat. No. 9,858,408, and a continuation-in-part of application No. 14/622,549, filed on Feb. 13, 2015, now abandoned, and a continuation-in-part of application No. 14/622,737, filed on Feb. 13, 2015, now Pat. No. 9,852,285, and a continuation-in-part of application No. 14/622,740, filed on Feb. 13, 2015, now Pat. No. 9,648,496.

(51) Int. Cl.
    G06F 15/16      (2006.01)
    G06F 7/04       (2006.01)
    G06K 7/10       (2006.01)
    G06Q 20/36      (2012.01)
    G06Q 40/00      (2012.01)
    G06Q 50/26      (2012.01)
    G06Q 20/38      (2012.01)
    G06F 21/34      (2013.01)

(52) U.S. Cl.
    CPC ..... *G06Q 20/3672* (2013.01); *G06Q 20/3821* (2013.01); *G06Q 40/00* (2013.01); *G06Q 50/265* (2013.01); *H04L 63/0861* (2013.01)

(58) Field of Classification Search
    USPC .......................................................... 726/5
    See application file for complete search history.

(56) References Cited

U.S. PATENT DOCUMENTS

| | | | |
|---|---|---|---|
| 7,690,032 | B1 | 3/2010 | Peirce |
| 8,762,288 | B2 | 6/2014 | Dill |
| 8,862,664 | B1 | 10/2014 | Lin et al. |
| 8,908,977 | B2 | 12/2014 | King |
| 8,997,195 | B1 | 3/2015 | Fadida et al. |
| 9,172,697 | B1 | 10/2015 | Holtz |
| 9,721,147 | B1* | 8/2017 | Kapczynski ......... G06Q 50/265 |
| 2002/0165861 | A1 | 11/2002 | Gilmour |
| 2003/0023878 | A1 | 1/2003 | Rosenberg et al. |
| 2003/0136850 | A1 | 7/2003 | Yamagishi et al. |
| 2003/0145223 | A1 | 7/2003 | Brickell et al. |
| 2003/0217294 | A1 | 11/2003 | Kyle |
| 2004/0220964 | A1 | 11/2004 | Shiftan et al. |
| 2006/0056625 | A1 | 3/2006 | Nakabayashi et al. |
| 2006/0159312 | A1 | 7/2006 | Chiang et al. |
| 2006/0161435 | A1 | 7/2006 | Atef et al. |
| 2006/0282662 | A1 | 12/2006 | Whitcomb |
| 2007/0005627 | A1 | 1/2007 | Dodge |
| 2007/0005874 | A1 | 1/2007 | Dodge |
| 2007/0067828 | A1 | 3/2007 | Bychkov |
| 2007/0107017 | A1 | 5/2007 | Angel et al. |
| 2007/0203852 | A1 | 8/2007 | Cameron et al. |
| 2007/0240202 | A1 | 10/2007 | Sullivan et al. |
| 2008/0091619 | A1 | 4/2008 | Perlman et al. |
| 2008/0197192 | A1 | 8/2008 | Lindahl et al. |
| 2009/0172775 | A1 | 7/2009 | Mardikar et al. |
| 2009/0196423 | A1 | 8/2009 | Chandrasekaran et al. |
| 2009/0228365 | A1 | 9/2009 | Tomchek et al. |
| 2010/0107229 | A1 | 4/2010 | Najafi et al. |
| 2010/0262832 | A1 | 10/2010 | Tie et al. |
| 2011/0093385 | A1 | 4/2011 | Minnis et al. |
| 2011/0125770 | A1 | 5/2011 | Battestini et al. |
| 2011/0126272 | A1 | 5/2011 | Betzler et al. |
| 2011/0167059 | A1 | 7/2011 | Fallah |
| 2011/0167148 | A1 | 7/2011 | Bodziony et al. |
| 2011/0197266 | A1 | 8/2011 | Chu et al. |
| 2011/0231666 | A1 | 9/2011 | Guenther |
| 2012/0011066 | A1 | 1/2012 | Telle et al. |
| 2012/0084135 | A1 | 4/2012 | Nissan et al. |
| 2012/0090038 | A1 | 4/2012 | Pacella et al. |
| 2012/0114190 | A1 | 5/2012 | Bladel et al. |
| 2012/0144461 | A1 | 6/2012 | Rathbun |
| 2012/0214443 | A1 | 8/2012 | Daigle |
| 2012/0291108 | A1 | 11/2012 | Talamo et al. |
| 2013/0117822 | A1 | 5/2013 | Soulez |
| 2013/0117861 | A1 | 5/2013 | Aussel et al. |
| 2013/0124292 | A1 | 5/2013 | Juthani |
| 2013/0124416 | A1 | 5/2013 | Pawar et al. |
| 2013/0138570 | A1 | 5/2013 | Ross |
| 2013/0151419 | A1 | 6/2013 | Hitchcock et al. |
| 2013/0159194 | A1 | 6/2013 | Habib |
| 2013/0227651 | A1 | 8/2013 | Schultz et al. |
| 2013/0282580 | A1 | 10/2013 | O'Brien et al. |
| 2013/0318249 | A1 | 11/2013 | McDonough et al. |
| 2013/0318575 | A1 | 11/2013 | Hart et al. |
| 2014/0007205 | A1 | 1/2014 | Oikonomou |
| 2014/0025620 | A1 | 1/2014 | Greenzeiger et al. |
| 2014/0032723 | A1* | 1/2014 | Nema ................... G06Q 10/00 709/220 |
| 2014/0101744 | A1 | 4/2014 | Liu et al. |
| 2014/0115341 | A1* | 4/2014 | Robertson ............. H04L 9/3228 713/183 |
| 2014/0173695 | A1 | 6/2014 | Valdivia |
| 2014/0181911 | A1 | 6/2014 | Kula |
| 2014/0196110 | A1* | 7/2014 | Rubinstein ............ H04L 63/08 726/3 |
| 2014/0207518 | A1 | 7/2014 | Kannan et al. |
| 2014/0270349 | A1 | 9/2014 | Amtrup et al. |
| 2014/0281509 | A1 | 9/2014 | Angelo et al. |
| 2014/0294175 | A1 | 10/2014 | Boloker |
| 2014/0294258 | A1 | 10/2014 | King |
| 2014/0333414 | A1 | 11/2014 | Kursun |
| 2014/0337954 | A1 | 11/2014 | Ahmed et al. |
| 2014/0359722 | A1 | 12/2014 | Schultz et al. |
| 2014/0379477 | A1 | 12/2014 | Sheinfeld et al. |
| 2015/0007297 | A1 | 1/2015 | Grossemy |
| 2015/0082399 | A1 | 3/2015 | Wu et al. |
| 2015/0172273 | A1 | 6/2015 | Dong et al. |
| 2015/0270971 | A1 | 9/2015 | Dietrich |

OTHER PUBLICATIONS

Bertino et al., "Privacy-preserving Digital Identity Management for Cloud Computing," IEEE Computer Society Technical Committee on Data Engineering, 2009; pp. 1-7.
Ryutov et al., "Adaptive Trust Negotiation and Access Control," ACM, New York, NY, 2005; pp. 139-146.
Xu et al., "k-Anonymous Secret Handshakes with Reusable Credentials,"; ACM, New York, NY, 2005; pp. 1-10.
International Search Report and Written Opinion dated May 17, 2016 in International Application No. PCT/EP2016/053075.
International Search Report and Written Opinion dated Aug. 4, 2016 in International Application No. PCT/EP2016/053073.
Chenxi Zhang, An Efficient Identity-based Batch Verification Scheme for Vehicular Sensor Networks, IEEE: 2008, p. 816-823.

* cited by examiner

| Credential | Reference Key | URI | N/W address | Link to uPass | Expiration Time | Lifecycle metadata |
|---|---|---|---|---|---|---|
| 30 | 60 | 62 | 64 | 66 | 68 | 70 |
|  |  |  |  |  |  |  |
|  |  |  |  |  |  |  |
|  |  |  |  |  |  |  |
|  |  |  |  |  |  |  |

FIG. 9

| Data Group | Data Element | Fixed/ Variable | Mandatory/ Optional | Data Item |
|---|---|---|---|---|
| DG1 | | | M | MRZ (Summary of details as recorded on MRTD. Refer to Doc 9303) |
| | 01 | F | M | Document type |
| | 02 | F | M | Issuing State or organization |
| | 03 | F | M | Name (of holder) |
| | 04 | F | M | Document number (Nine most significant characters) |
| | 05 | F | M | Check digit — Document number or filler character (<) indicating document number exceeds nine characters. (see 10.2.2) |
| | 06 | F | M | Nationality |
| | 07 | F | M | Date of birth |
| | 08 | F | M | Check digit — Date of birth |
| | 09 | F | M | Sex |
| | 10 | F | M | Date of expiry (For MRP, TD-1 and TD-2) |
| | 11 | F | M | Check digit — Date of expiry or valid until date |
| | 12 | F | M | Optional data and/or in the case of a TD-1 least significant characters of document number plus document number check digit plus filler character |
| | 13 | F | M | Check digit — Optional data field |
| | 14 | F | M | Composite check digit |

- DG5 - Portrait;
- DG7 - Signature;
- MRZ - Machine Readable Zone of Passport.

FIG. 13

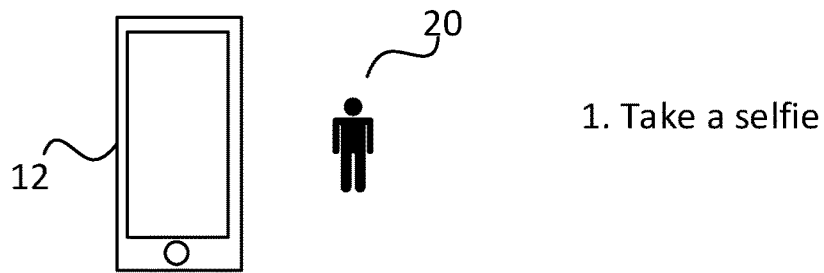
1. Take a selfie
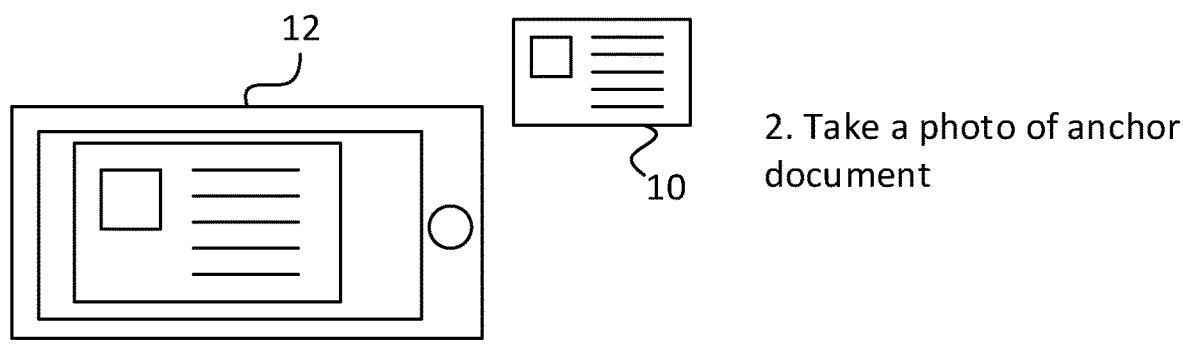
2. Take a photo of anchor document
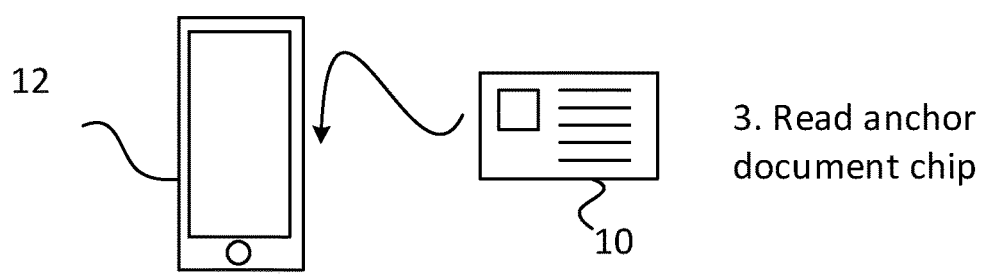
3. Read anchor document chip
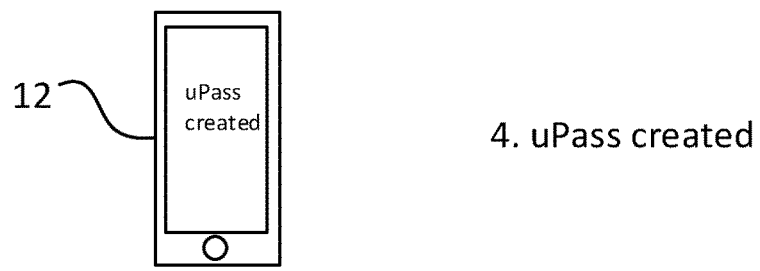
4. uPass created
FIG. 25

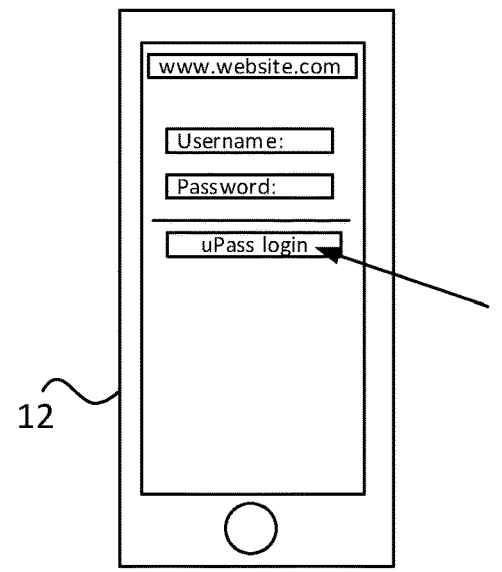
1. User clicks uPass login
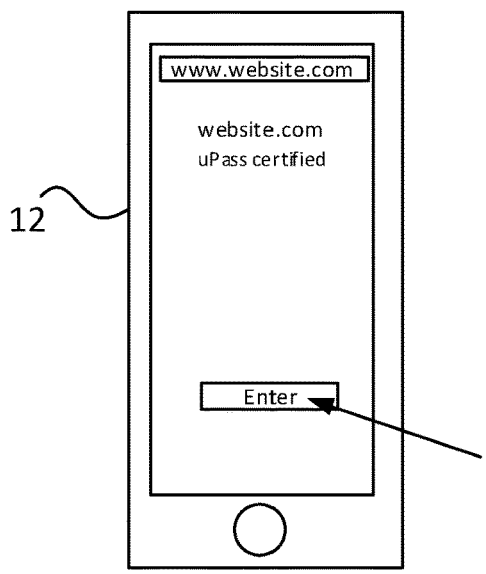
2. User touches uPass login
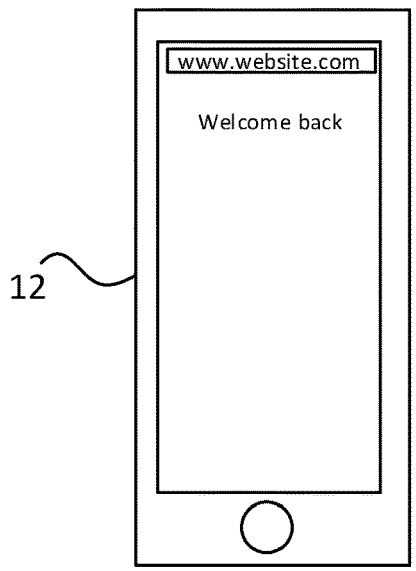
3. Succesful login
FIG. 28

DIGITAL IDENTITY SYSTEM

BACKGROUND

From time to time people need to prove some aspect of their identity, and often the most compelling way to do this is with a passport or other national photo ID such as a driving license or (in jurisdictions which mandate them) an identity card. However whilst these documents are greatly trusted due to the difficulty involved in making fraudulent copies and their issuance by government institutions, they are also sufficiently valuable that it is preferable not to have to carry them everywhere with us.

SUMMARY

A first aspect of the present invention is directed to a method of a digital identity system generating a sharing token for authenticating a bearer to a validator, wherein a data store of the digital identity system holds a plurality of attributes of the bearer, the method comprising implementing by the digital identity system the following steps: receiving at the digital identity system from a bearer an electronic sharing token request, wherein the token request identifies at least one of the bearer's attributes in the data store selected for sharing with a validator; in response to the electronic token request, generating a sharing token, which is unique to that request, for presentation by the bearer to a validator; associating with the unique sharing token at the digital identity system the identified at least one bearer attribute; and issuing to the bearer the unique sharing token; and wherein later presentation of the unique sharing token to the digital identify system by a validator causes the at least one bearer attribute associated with the sharing token to be rendered available to the validator by the digital identity system.

The sharing token is unique to each sharing token request. A user can request as many sharing tokens as he likes, and specifies each time which of his attributes he wants bound to that sharing token, which provides a flexible sharing mechanism.

Each sharing token is bound to a fixed set of attribute(s), which is specified entirely by the token request such that the user has complete control over what data he makes available with that token.

In embodiments, the token request may comprise an associated policy defined by the bearer and the steps may further comprise: storing the bearer-defined policy at the digital identity system in association with the sharing token, wherein the at least one bearer attribute is only rendered available to the validator if the validator presents a matching policy with the sharing token.

The policy defined by the bearer may be a bearer policy that specifies a type of the at least one attribute associated with the sharing token.

The method may comprise receiving from the bearer at the digital identity system a credential of the bearer, and validating the credential, wherein the sharing token is generated only if the bearer credential is valid.

The credential may be a one-time only use credential, and the method may comprise issuing to the bearer a fresh one-time only use bearer credential.

The at least one bearer attribute may only be rendered available to the validator if the validator presents, with the sharing token, a credential of the validator that is determined to be valid by the digital identify system.

The presentation of the sharing token to the digital identity may also cause at least one attribute of the validator held in the data store to be rendered available to the bearer by the digital identity system.

The policy defined by the bearer may be a validator policy which specifies at least one attribute type that the bearer expects the validator to share with the bearer.

The at least one validator attribute may have the type specified by the bearer-defined validator policy.

The token request may comprise both the bearer policy and the validator policy.

The validator credential may be a one-time only use credential, and the digital identity system may issue to the validator a fresh one-time only use credential to the validator in response to the presentation of the valid validator credential.

The at least one attribute of the bearer may be rendered available to the validator by storing a version of it at an addressable memory location, and transmitting to a network address associated with the validator a validator receipt, which comprises a link to the addressable memory location.

The at least one validator attribute may be rendered available to the bearer by storing a version of it at another addressable memory location, and transmitting to a network address associated with the bearer a bearer receipt, which comprises a link to the other addressable memory location.

The steps may further comprise: storing a hash of the bearer credential and/or the fresh bearer credential in association with the sharing token at the digital identity system.

The presentation of the sharing token by the validator may also cause the digital identity system to generate, in a master receipt store of the digital identity system, a master receipt comprising: the hash of the bearer credential and/or the fresh bearer credential; and an indicator of the at least one attribute rendered available to the validator.

The master receipt may also comprise an indicator of the at least one attribute of the validator rendered available to the bearer.

The master receipt may also comprise a hash of the fresh validator credential and/or a hash of the validator credential.

Each indicator may be a link to a respective addressable memory location at which a version of the indicated attribute is held.

The at least one bearer attribute may be held in the data store in association with at least one identifier of the bearer, wherein the sharing token may only generated if a matching bearer identifier is received with the bearer credential.

The at least one bearer identifier may comprise: at least one biometric template of the bearer, and/or at least one secret known only to the bearer, and/or an image of the bearer.

The at least one validator attribute may be held in the data store in association with at least one identifier of the validator, wherein the at least one bearer attribute is only rendered available to the validator if a matching validator identifier is presented with the sharing token.

The at least one validator identifier may comprise: at least one biometric template of the validator, and/or at least one secret known only to the validator, and/or an image of the validator.

A wrapper key of the bearer may be stored at the digital identity system, wherein the at least one attribute held in the data store is encrypted with a bearer key, and wherein a version of the bearer key encrypted with the bearer wrapper key is received from the bearer in the token request; wherein the steps further may further comprise: using the bearer wrapper key to decrypt the bearer key received from the bearer; and using the decrypted bearer key to decrypt the at least one attribute held in the data store; wherein the decrypted at least one attribute is rendered available to the validator when presenting the sharing token.

The attribute may be encrypted with an attribute key, wherein the message identifies a storage location of the digital identity system at which a version of the attribute key encrypted with the bearer key is held; wherein the decrypted bearer key may be used decrypt the at least one attribute by using the decrypted bearer key to decrypt the attribute key held at the identified storage location and using the decrypted attribute key to decrypt the attribute.

The sharing token may be associated with the at least one attribute by storing the decrypted at least one attribute at the digital identity system in association with the sharing token.

The wrapper key may be a device key bound to a single device operated by the bearer.

The bearer and validator attributes rendered available to the validator and the bearer respectively may be encrypted with a transaction key, a copy of which may be provided to both the bearer and the validator in response to the presentation of the sharing token to the digital identity system by the validator.

Each of the indicators in the receipts may be encrypted with a transaction key, a copy of which is provided to both the bearer and the validator in response to the later presentation of the sharing token.

Each of the bearer and the validator may be associated with a respective code unique to that entity (bearer/validator), wherein the method may comprise: generating a unique composite code by combining the code of the bearer with the code of the validator, wherein neither of the codes is derivable from the composite code alone; wherein in response to the later presentation of the sharing token, the composite code may be provided to the bearer and/or the validator by the digital identity system.

The unique code of the bearer may be derived from the bearer key.

The unique code of the validator may be derived from a validator key, with which the at least one validator attribute is encrypted.

Two different composite codes may be generated, each being unique to both that pair of entities (i.e. the pairing of the bearer and the validator) and to a different one of the entities (i.e. to one of the bearer and the validator), wherein that composite code is provided to that entity.

The sharing token may be associated with the at least one bearer attribute by storing a copy of at least a part of the token request at the digital identity system in association with the unique sharing token, wherein the later presentation of the unique sharing token to the digital identity system causes the digital identity system to retrieve the at least one selected attribute from the data store using the stored token request.

The stored request may be encrypted with a sharing key, a copy of which is issued to the bearer with the sharing token, whereby the validator must present the sharing key with the sharing token to access the at least one bearer attribute.

The token request may comprise, for each attribute it identifies, a respective database key and/or at least one pointer and/or other data denoting a location of that attribute in the data store.

The token request may identify at least two attributes of the bearer held at different locations in the data store.

The token request may be one of a plurality of sharing token requests received from the bearer, wherein a different sharing token is generated for each of the requests that is unique to that request.

The sharing token is renderable as a bar code on a display.

Another aspect of the present invention is directed to a digital identity system comprising a computer system configured to implement any of the methods disclosed hereinabove or hereinbelow.

Another aspect of the present invention is directed to a bearer device comprising: a computer interface; a processor configured to execute a digital identity application, wherein the digital identity application is configured when executed on the processor to perform operations of: generating an electronic sharing token request, wherein the token request identifies at least one of bearer attribute in a data store of the digital identity system; transmitting the token request to the digital identic system via the computer interface; receiving from the digital identity system, in response to the electronic token request, a sharing token unique to that request for presentation by the bearer to a validator; and rendering the unique sharing token available to a validator, wherein presentation of the unique sharing token to the digital identify system by the validator causes the identified at least one bearer attribute to be rendered available to the validator by the digital identity system.

In embodiments, the unique sharing token may be received with a sharing key for decrypting the at least one bearer attribute, which the application may be configured to provide to the validator with the sharing token.

The electronic message may be generated in response to receiving a selection of the at least one bearer attribute from a user of the bearer device via a user interface of the bearer device.

The application may be configured to render the sharing token available by displaying on a display of the device a bar code in which the sharing token is embedded.

The application may be configured to also generate at least one policy which is included in the electronic message transmitted to the digital identity system, wherein the application may be configured to render a copy of the policy available to the validator with the sharing token.

The policy or a link to the policy may be embedded in the bar code, and thereby rendered available to the validator.

The at least one policy may define at least a type of the at least one bearer attribute and/or at least one attribute type to be shared by the bearer in return for the at least one bearer attribute.

Another aspect of the present invention is directed to a method of authenticating a bearer to a validator, the method comprising implementing by a digital identity system the following steps: receiving from a bearer an electronic message comprising a bearer key encrypted with a bearer wrapper key, wherein the message identifies: an attribute of the bearer held in a data store of the digital identity system and a storage location of the digital identity system at which a version of the bearer wrapper key is held; using the received message to retrieve the version of the bearer wrapper key from the identified storage location; using the located wrapper key to decrypt the received bearer key; and using the decrypted bearer key to decrypt the bearer attribute, wherein the digital identity system is configured to render the decrypted bearer attribute available to a validator when authorized to do so by the bearer.

In embodiment the attribute may be encrypted with an attribute key, wherein a version of the attribute key encrypted with the bearer key may be held at a storage location in the digital identity system that is identified by the message; and the decrypted bearer key may be used to decrypt the bearer attribute by using the decrypted bearer key to decrypt the attribute key, and using the decrypted attribute key to decrypt the attribute.

A credential of the bearer may be received with the encrypted bearer key, and the remaining steps are only performed if the credential is determined to be valid by the digital identity system, and the method may further comprise: issuing to the bearer a fresh one-time only use credential of the bearer, and associating the fresh bearer credential with the version of the bearer wrapper key stored at the digital identity system.

Another aspect of the present invention is directed to a validator device comprising: a computer interface; a processor configured to execute a digital identity application, wherein the digital identity application is configured when executed on the processor to perform operations of: receiving, directly from a bearer, an electronic sharing token and an associated policy defined by a bearer; rendering the received policy on a display of the validator device; in response to receiving via a user interface of the validator device from a user of the device, a user input denoting an acceptance of the displayed policy by the user, transmitting an electronic message comprising the sharing token and a version of the bearer-defined policy to a digital identity system via the computer interface, thereby rendering available to the user of the device an attribute of the bearer having a type specified by the accepted bearer policy and/or thereby rendering available to the bearer an attribute of the user of the validator device having a type specified by the accepted policy.

The sharing token and the policy, or a link to the policy, may be received by capturing an image of a bar code provided by the bearer, in which the sharing token and the policy or policy link are embedded.

The bearer may be a user or a computer system.

Another aspect of the present invention is directed to a computer implemented method comprising performing the operations implemented by the digital identity application.

Another aspect of the present invention is directed to a computer program product comprising code stored on a computer readable storage medium and configured when executed to implement any method or digital identity application disclosed herein.

BRIEF DESCRIPTION OF FIGURES

For a better understanding of the present invention, and to show how embodiments of the same may be carried into effect, reference is made by way of example only to the following figures, in which:

FIG. 9 is a block diagram of a database structure for a digital identity system;

FIG. 13 illustrates standardised passport information;

FIG. 25 exemplifies how a digital identity may be created;

FIGS. 26 to 32 exemplify use cases of a digital profile;

DETAILED DESCRIPTION OF PREFERRED EMBODIMENTS

Figure 1:
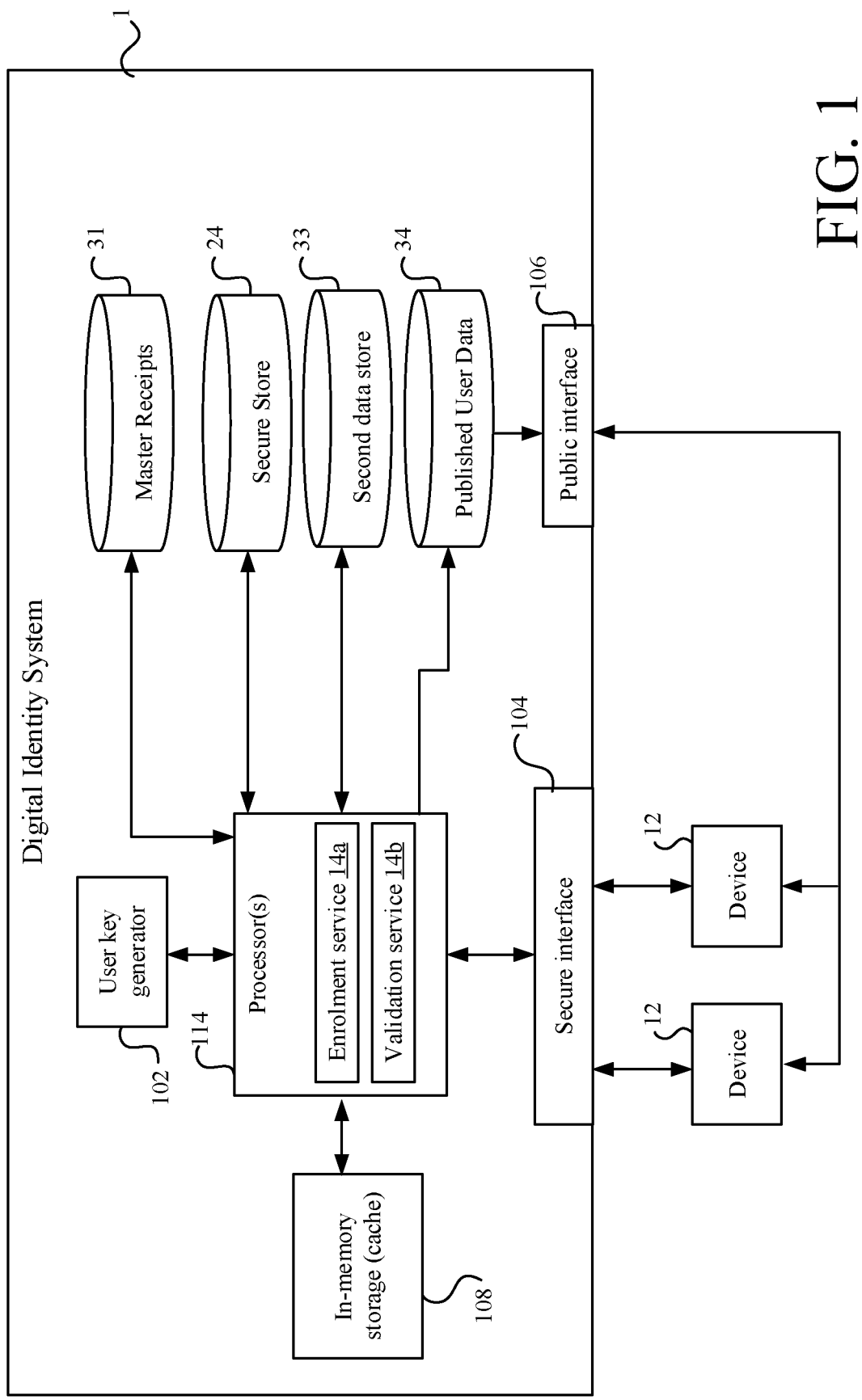
FIG. 1 shows a schematic block diagram of a digital identity system.

FIG. 1 shows a block diagram of a digital identity system 1, which comprises at least one processor 114. The at least one processor 114 is configured to execute digital identity management code so as to implement various services, including an enrolment service 14a and a validation service 14b. The processor 4 has access to in-memory storage ("cache") 108, which may for example be implemented, at the hardware level, in volatile electronic storage.

The services 14a, 14b implemented by the processor 114 are accessed, by external devices 12, via a secure interface 104, such as a secure API. The secure interface 104 provides a secure (i.e. encrypted) channel(s) by which an external device 12 can communicate with the services 14a, 14b securely. The external device 12 can be any device desiring to make use of the services 14a, 14b, and in the examples below is a user device operated by a user. Examples of such user devices include smartphones and other smart devices, tablets, laptop/desktop computer devices etc. The data stores are implemented at the hardware level in non-volatile electronic storage.

Four data stores of the digital identity system 1 are shown: a first data store 24 ("secure store"), a second data store 33, a third data store 34 ("published data store"), and a fourth data store 31 ("master receipt book"). Data held at an addressable memory location in the published data store 34 is accessible via a public interface 106, for example using a link (e.g. URI, URL etc.) to that memory location. That is not to say that the information held in the published data store 34 is freely available to the public, as the data held therein and/or the links to it are encrypted in the manner described below.

The digital identity system 1 also comprises a secure, encryption key generator 102 ("user key generator"), the functionality of which is described later.

The purpose of the various data stores 24, 31, 33, 34 within the digital identity system 1 is described in further to detail below. Suffice it to say that user data is held on behalf of users of the digital identify system 1 in the secure store 24. Each piece of user data is encrypted using an encryption keys ("user keys", generated by the user key generator 102) that are held only by the user himself, i.e. which are not stored within the digital identity system 1 itself. Each piece of user data is stored as the value of a database key-value pair of the secure store 24. The database key for that key-value pair is randomly generated upon creation, and is held only by the user himself, i.e. it is not associated with the user anywhere within the digital identity system 1. To gain access to this piece of user data, the user must therefore provide both its database key (so it can be located in the secure store 24) and his user key (so it can be decrypted once located). This provides a highly secure mechanism for the storage of user data within the digital identity system 1.

The set of user data that is held in the secure store 24 for a given user constitutes a digital identity of the user as that term is used herein. In the following, each piece of user data is an attribute of that user, against which one or more documents or other verifiable information sources may be anchored (see below) such as surname, first name(s), date of birth, facial image ("selfie"), address etc. Thus a user's digital identity is the one or more of his attributes that are held in the secure store 24. Each of these attributes may be anchored to one or more respective identity documents or other verifiable information sources, as described later. That is, each attribute may be anchored to a different set of document(s).

A core function of the digital identity system 1 is to provide a mechanism by which users can validate themselves to one another. In high level terms, when two user's wish to validate each other, each user authorizes the digital identity system 1 to share one or more of their stored attributes with the other user. Because each user can see that the shared information is coming from the digital identity system 1, they can trust it to the extent that they trust the digital identity system 1. This function is provided without the user ever having to share his user key or the database keys to his attributes with anyone, thus providing convenient but secure data sharing.

To enable this, the digital identity system 1 provides a user with a sharing token on request, which is bound to one or more of the user's stored attributes (as specified by the requesting user himself). Once obtained, the user can present this sharing token to another user of the digital identity system 1 to allow the other user access to his data that is bound to the sharing token (and only that data). In this context, the user who obtains and presents the sharing token is referred to the "bearer" and the other user the "validator", although in fact the system is equipped to provide not only the information needed to allow the validator to validate the bearer but can also provide the information needed to allow the bearer to validate the validator in the same transaction.

To obtain the sharing token, the user provides to digital identity system 1 in an electronic sharing token request message his user key (in an encrypted form) along with the database key(s) of the attributes he wishes to be bound to the sharing token, and thus rendered available to a validator who subsequently receives the sharing token from the bearer.

The sharing token is unique to each sharing token request. A user can request as many sharing tokens as he likes, and specifies each time which of his attributes he wants bound to that sharing token, which provides a flexible sharing mechanism.

Each sharing token is bound to a fixed set of attribute(s), which is specified entirely by the token request such that the user has complete control over what data he makes available with that token.

Provided the sharing token request is determined by the digital identity system 1 to be legitimate, the sharing token is generated and issued to the bearer. At least the user key and database key(s) of sharing token request are cached, i.e. temporarily stored in the cache 108, in a secure manner, in association with the sharing token, thereby binding the sharing token to the bearer attribute(s) identified in the request. Upon later presentation of the sharing token to the digital identity system 1 by a validator, the digital identity system can use the cached database key(s) and user key to locate and decrypt the bearer attribute(s) to which it is bound. Once located and decrypted, the digital identity system publishes them, i.e. stores them at an addressable memory location in the published data store 34, and provides the validator with a link to this memory location. Using this link, the validator is able to access the published attribute(s) and is thus able to access them in order to validate the bearer.

The cached request may be permanently deleted from the cache 108 after a desired duration and/or in response to presentation of the sharing token (in which case the sharing token can only be used once).

Alternatively, the bearer attribute's may be decrypted when the request is received, encrypted with the sharing token and cached in association with the sharing token in place of the request.

Figure 2:
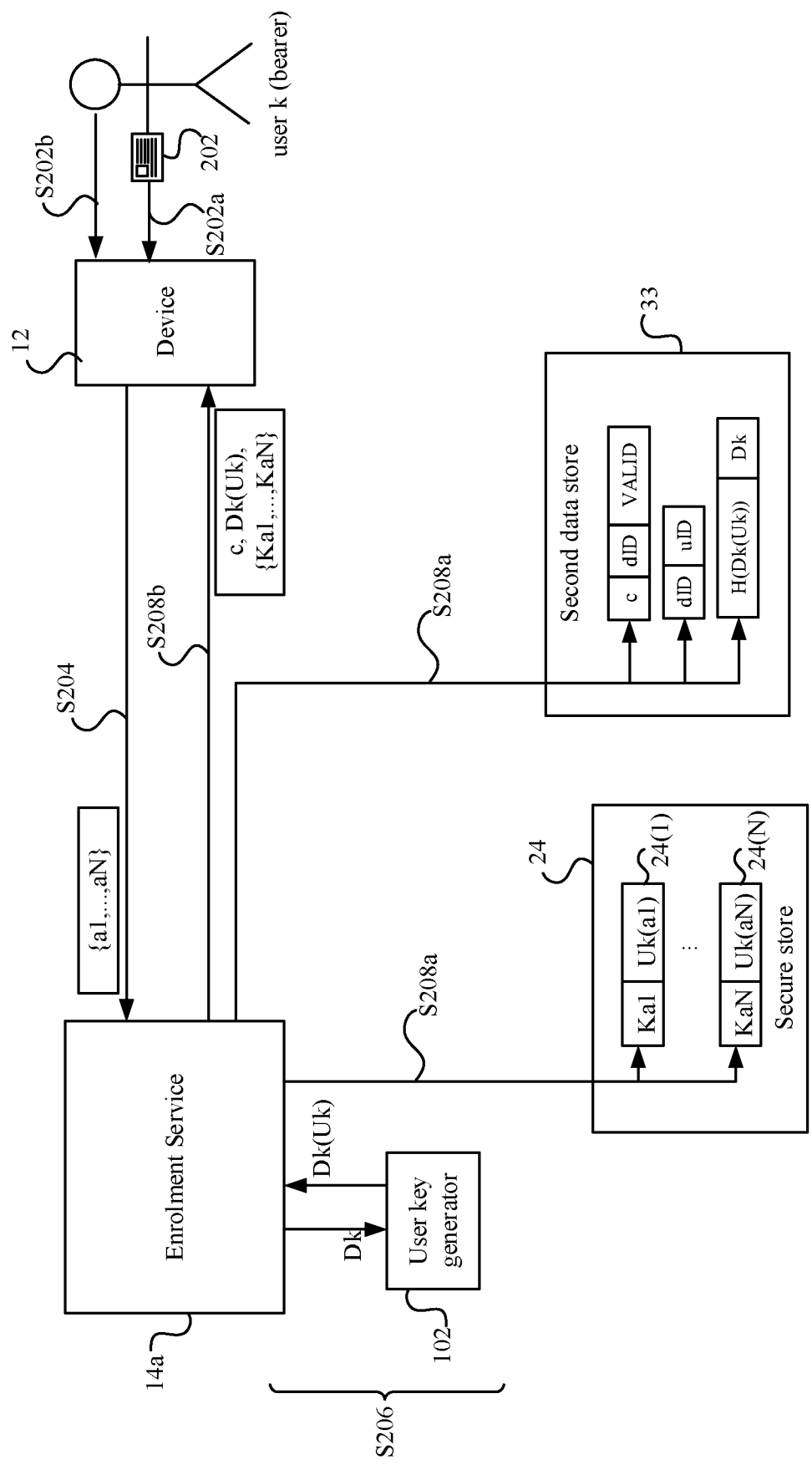
FIG. 2 shows a signalling diagram for a method of creating a digital identity within a digital identity system.

FIG. 2 shows an example method by which a user of a device can create a digital identity for himself within the digital identity system 1.

At step S202a, the user uses his device 12 to capture a set of N attributes {a2, . . . , aN}, where N>1, from an identity document 202, such as a passport, driving licence, national identity document etc. These may for example be captured using a camera of the device 14 or from an NFC chip embedded in the document, or a combination of both. At step S202b, the user captures using the camera of the device 12 an image of his face, i.e. his selfie, which is also an attribute of the user denoted a1 by convention herein.

At step S204, the user transmits to the enrolment service 14a of the digital identity system 1 an electronic identity creation request comprising the set of attributes {a1, a2, . . . , aN}, denoted {a} for convenience below. That is, the selfie a1 and the additional attribute(s) captured from the document 202.

In response to the enrolment request, the enrolment service 14a generates (S206) a user key Uk for the user. The user key Uk is encrypted with a device key Dk for the device 12, wherein Dk(Uk) denotes a version of Uk encrypted with Dk. To generate the user key Uk, the enrolment service 14a inputs the device key Dk to the user key generator 102. To provide optimum security, the user key generator 102 can be implemented as a dedicated, hardware security model of the system, e.g. in accordance with the FIPS 14-2 standard. In response to receiving the device key Dk, the user key generator 102 generates the user key Uk and outputs only the encrypted version of it Dk(Uk) to the enrolment service 14a. The unencrypted version Uk is never rendered directly accessible by the user key generator 102.

At step S208a, the enrolment service 14a uses the device key Dk to decrypt the encrypted version of the user key Uk, and uses the unencrypted version of the user key Uk to encrypt each of the attributes a1, . . . aN. The user key Uk may be used directly to encrypt the attributes. Alternatively, each attribute may be encrypted with a key unique to that attributr ("Item key/attribute key" Ik); in this case, the item key Ik is unencrypted with the user key Uk. The encrypted item key Uk(Ik) is held in the identity system 1, in a manner such that the user can send a message to the identity system which comprises Dk(Uk) and identifies where a given one of their attributes a is stored, and also where the item key Uk(Ik) for that attribute is stored. The device key Dk is used to decrypt Dk(Uk), Uk is used to decrypt Uk(Ik), and Ik is used to decrypt the identified attribute Ik(a).

Note that them terminology "data encrypted with a key" is not limited to direct encryption of that data with that key, an also covers, for example, a situation where the data is directly encrypted with a different key, and the different key is encrypted directly with that key (among others).

A respective entry 24(1), . . . , 24(N) is created in the secure store 24 for each of the attributes a1, . . . , aN. Each entry is a key-value pair, whose value is the encrypted version of that attribute, denoted Uk(a1), . . . , Uk(aN), and whose database key Ka1, . . . , KaN of is a randomly generated sequence. The database key is needed to locate that key-value pair in the database. Below, {Ka} is used to denote the set of database keys for the set of attributes {a}. Alternatively {Ka} may comprise, for each attribute, the user massage may comprise at least one respective pointer (or other data identifying where the relevant target data is stored). The pointer(s) for that attribute may identity both where the encrypted attribute Ik(a) is held, and where the encrypted item key Uk(Ik) for that attribute is held.

At step S208b, the enrolment service responds to the enrolment request by transmitting an electronic response message to a network address associated with the device 12. The response comprises the encrypted version of the user key Dk(Uk), the set of database keys {Ka} and a credential c. Once the request has been sent, the set of database keys {Ka} is purged from the digital identity system 1. This means that the entries 21(1), . . . 21(N) are not associated with the user anywhere in the digital identify system 1; the only association that exists between those entries and the user arises by virtue of the fact that the user holds the set of database keys {Ka}.

The credential is a one-time only use credential for the user that is bound to his device 12 and a user identifier uID of the user. At step S208c, the enrolment service 14a stores in the second data store 33 an identifier dID of the device 12, in association with the credential c and a state of the credential. The credential is in a valid state. The state subsequently changes to either "used" or "expired", upon use or if it is not used within a certain duration form its creation. The user uID is also stored in association with the device identifier dID, and is thereby associated in the digital identify system 1 with the credential c. By virtue of these associations, the credential is bound to both the user and the device 12.

In this example, the user identifier uID comprises image data of the selfie captured at step S202b, which is some embodiments may also be encrypted with the user key Uk. Herein, the term image data of an image (or sequence of images) is used to mean the image itself or selective information extracted from the image(s), such as a local binary pattern (LBP) generated from the image(s) or a set of parameters generated by training a machine learning model (ML) using the image(s) themselves or information extracted from them, e.g. an ML model may be trained using LBPs which have been extracted from the original image(s).

Such selfie image data is one example of what is referred to herein as a biometric template of the user. Alternative biometric templates include image data of a fingerprint image, retinal image, or an image capturing some other suitable biometric feature of the user. In general, the user identifier uID may comprise any such biometric template(s) and/or a non-biometric identifier such as a secret(s) known only to the user. The information embodied in the user identifier uID is voluntarily made available by the enrolling user during enrolment, on the understanding that it is only being stored at the digital identity system 1 to prevent others from being able to gain access to their stored attributes.

The device key Dk itself is also stored in the second store 33, in association with a hash (e.g. HMAC) of Dk(Uk). The hash of an input value means an output value obtained by applying a hash function, such as an HMAC function, to the input value. The advantage of a hash is that it is impossible to recover the original input value from the output value alone. In the present disclosure, this property is exploited by using the hash H(Dk(Uk)) as an index for Dk. This allows Dk to be stored in association with Dk(Uk) without having to store Dk(Uk) at the digital identity system 1 itelf (as noted above, Dk(Uk) is held only by the user). This allows Dk to be located when (and only when) the user device subsequently presents Dk(Uk) to the digital identity system, by re-hashing Dk(Uk) and using the result to locate Dk.

Figure 3:
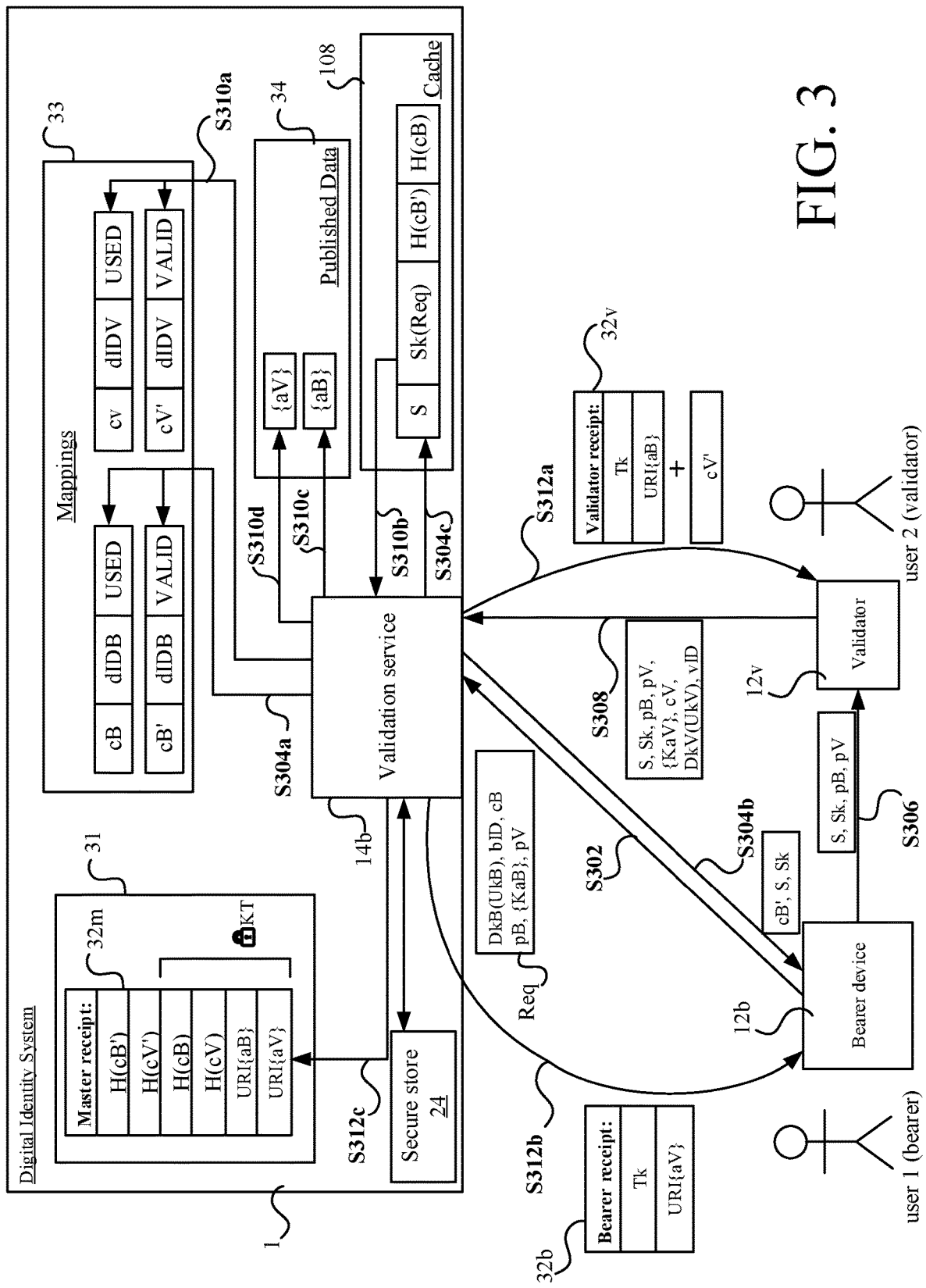
FIG. 3 shows a signalling diagram for a method of validating, to a validator, a bearer of a sharing token.

FIG. 3 shows a method by which a bearer, using a bearer device 12, can validate themselves to a validator using a validator device 12v. At the start of the method, each has the following:
  a currently-valid one-time use credential—cB and cV respectively—bound to himself and his device;
  a set of one or more attribute keys—{KaB} and {KaV} respectively—for a set of one or more attributes ({aB}, {aV}) held in the secure store 24 encrypted with their respective user keys (UkB, uKV); and
  a version of his user key (UkB, UkV) encrypted with his device's device key (DkB, DkV)—DkB(UkB) and (DkV(UkV) respectively.

The bearer and the validator can obtain these by enrolling with the digital identity system 1 using their respective devices 12b, 12b according to the method of FIG. 2.

The method has two stages: a first stage, in which the bearer obtains a sharing token S of the kind described above; and a second stage in which he presents the sharing token S to the validator, who in turn presents it to the digital identity system 1.

At step S302, the bearer causes an electronic sharing token request message "Req" to be transmitted from his device 12b to the validation service 14b. The sharing token request comprises the following:
  the encrypted user key DkB(UkB);
  the bearer's credential cB;
  an identifier bID of the bearer.

The request Req also comprises a bearer policy pB. The bearer policy pB is defined By the bearer using his device 12b, and specifies one or more types of attribute types that he is willing to share. For example, the bearer specify, as a minimum, that he is willing to share a selfie and, optionally, that he is also willing to share his name and/or date of birth etc. To enable the sharing of these attributes, the request also comprises the set of database key(s) {KaB} for the identified attributes(s), so that they can be located in the secure store 24. Either policy may also specify a time for which the sharing token Sk is valid, after which it expires.

The request Req also comprises a validator policy pV, which is also defined by the bearer. The bearer-defined validator policy pV specifies one or more types of attribute which the bearer expects the validator to share in return. The validator is only granted access to those bearer attribute(s) as defined the bearer policy pB if he grants the bearer access to his own attributes as defined by the validator policy pV. For example, by setting the bearer and validator policies pB, PV accordingly, the bearer may denote a willingness to grant the validator access to his selfie, name and date of birth provided the validator grants the bearer access to his own selfie.

The validation service receives the request Req from the bearer device 12b, and validates the received bearer credential cB in response. That is, it determined whether the credential exists in the second store 33, and if so that its state is valid. If the credential is valid, the validation device 14b compares:

the bearer device 12b with the device identifier dIDB bound to the bearer's credential cB in the second data store 33 (i.e. corresponding to dID in FIG. 2); and the bearer identifier bID with the identifier of the bearer bound to the bearer's credential cB in the second data store 33 (i.e. corresponding to uID in FIG. 2).

The bearer identifier bID included in the request Req can take any suitable form that allows this comparison to take place. For example, the bearer may capture a new selfie at the start of the process, and the bearer identifier bID may comprise image data of the new selfie. Preferably, the bearer identifier bID generated by selectively extracting limited amount of information form the new selfie, i.e. only as much as is necessary, as this reduces the bandwidth needed to transmit it. For example, the bearer identifier bID may be an LBP generated from the new selfie.

The validation service 14b changes the state of the bearer credential cB in the second data store 33 to used and generates a fresh, one-time only use credential cB' for the bearer (S304a). The fresh bearer credential cB' is generated in bound to the bearer device identifier dIDB (and thus to the bearer himself due to the association created between uID and dID at enrolment—see FIG. 2), and has a state that is initially valid.

Provided the device and the bearer ID do indeed match the corresponding identifiers held in the second data store 33, the validation service 14b generates a sharing token S as requested together with a sharing encryption key Sk. A response comprising the fresh bearer credential cB', the sharing token S and the sharing key Sk (or a link to a location at which the sharing key Sk is stored) is transmitted to a network address associated with the bearer S304b. For added security, the request may be sent out of band, for example by pushing it to a network address for the bearer device 12b that has been pre-registered with the digital identity system 1. In any event, the request is made available to the bearer device 12b.

A copy of at least part request Req is encrypted with the sharing key Sk by the validation service 14b, and cached at the digital identity system, i.e. stored in the cache 108, in association with the sharing token S (S304c). As will be apparent in view of the following, not all of the data in the request needs to be cached, and in some embodiments only the data that is needed later is encrypted and cached. For example, in some cases, it is sufficient to encrypt and cache only the encrypted bearer key DkB(UkB). In this described below, additional security is provided by also encrypting and caching the bearer and validator policies pB, pV defined by the bearer. For reasons that will become apparent, hashes (e.g. HMAC) of the fresh bearer credential H(cB') and the now-used credential H(cB) are also cached in association with the session token.

In the second stage of the method, at step S306, the bearer presents the sharing token S to the validator—together with the sharing key Sk, the bearer policy pB and the validator policy pV—to the validator. Preferably, S, Sk, pB and pV are encoded in a bar code that is displayed on a display of the bearer device 12b, so that the validator device 12v can capture an image of the bar code and extract these elements from it. In many cases, it will be possible to encode all of this information in a three-dimensional bar code (e.g. a "QR code"). If not, a link to at least some of this information may be encoded in the bar code instead (e.g. a link to a memory location at which at least one of Sk, pB, and pV is stored).

Preferably, the bearer and validator policies pB and pV are rendered on a display of the validator device 12v, so that the validator can see (i) the attribute(s) of the bearer that the bearer is willing to share and (ii) the attribute(s) of the validator that the validator must share in return. Assuming the validator is happy to proceed on this basis, at step S308 he causes a validation message to be sent to the validation service 14b. The validation message comprises the following:

the sharing token S;

the sharing key Sk;

both of the policies pB and pV;

the set of database key(s) {KaV} that is needed for the digital identify system 1 to be able to locate, in the secure store 24, the attribute(s) of the validator that are specified by the bearer-defined validator policy pV;

the validator's credential cV;

the encrypted version of the validator's user key DkV (UkV); and an identifier of the validator vID, for comparison with the corresponding validator credential bound to his credential cV (i.e. corresponding to uID in FIG. 2).

The validation service 14a validates the validator credential cV in the same manner as described above. If the validator credential is valid, the method proceeds as it did for the bearer following step S302, by validation service 14b comparing:

the validator device 12v with the device identifier dIDV bound to the validator credential cV (i.e. corresponding to dID in FIG. 2); and the received validator identifier vID with the corresponding identifier of the validator that is bound to dIDV (i.e. corresponding to dID in FIG. 2).

At step S310a, the validation service 14b changes the state of the validator credential in the second data store 33 to used, generates a fresh, one-time only use credential for the validator cV', which it binds to the validator device identifier dIDv with an initially valid state.

Provided the validator and validator device identifiers do indeed match those bound to the validator credential cV, at step S310a, the validation service 14b proceeds as follows.

At step S310b, the validation service 14b uses the sharing token S received from the validator to locate the cached copy of the request Sk(Req) received previously from the bearer, descripts it using the sharing key Sk received from the validator and thereby obtains the copies of the bearer and validator policies pB and pV as received from the bearer. It compares these with the bearer and validator policies pB and pV received from the validator at step S308. Provided each policy received from the validator matched its cached counterpart, the method proceeds as follows.

At step S310c the validation service 14b uses the set of database key(s) {KaB} of the bearer, contained in the cached and now decrypted request Req, to locate the corresponding bearer attribute(s) in the secure store 24. It also computes the hash of DkB(UkB) contained in the decrypted request, uses this to locate DkB in the second data store 33, decrypts DkB(UkB) using the located DkB, and uses UkB to decrypt the bearer attribute(s) located using {KaB}. The set of decrypted bearer attribute(s), denoted {aB}, is published by storing it at an addressable memory location in the published data store 34.

The validation service 14b also performs equivalent operations (S310d) for the validator, i.e. it uses the set of database key(s) {KaV} of the validator, as received at step S308, to locate the corresponding validator attribute(s) in the secure store 24. It also computes the hash of DkV(UkV) as received at step S308, uses this to locate DkV in the second data store 33, decrypts DkV(UkV) using the located DkV, and uses UkV to decrypt the validator attribute(s) located using {KaV}. The set of decrypted validator attribute(s), denoted {aV}, is published in the same manner i.e. by storing it at an addressable memory location in the published data store 34.

Once the attributes have been published, the validation service:
transmits (S312a), to a network address associated with the validator device 12v: a bearer receipt 32v, and the fresh validator credential cV'.
transmits (S312b), to the network address associated with the bearer device 12b, a bearer receipt 32b.

Again, these may be transmitted out of band in the manner described above.

Each of the receipts 32b, 32v comprises a respective copy of a transaction key Tk. The validator receipt 32v also comprises a link, such as a URI, to the addressable memory location in the published data store 34 to which the bearer's attribute(s) {aB} have been published, denoted URI{aB}, thereby enabling the validator device 12v to render them available to the validator. The bearer receipt 32b also comprises a link, such as a URI, to the addressable memory location in the published data store to which the validator's attribute(s) {aV} have been published, denoted URI{aV} so that the bearer device 12b can render them available to the bearer. Although not shown in FIG. 3, the bearer and validator receipts 32b, 32v also comprise the links URI{aB} and URI{aV} such that the bearer and the validator can also see what has just been rendered available to the other party. The URI's URI{aB} and URI{aV} and/or the published attributes themselves {aB} and {aV} (i.e. the versions held in the published data store 34) are encrypted using the transaction key Tk, such that they can only be accessed by the bearer and validator themselves.

The validation service 14b also generates (S312c) a master receipt 32m in the master receipt book 31. The master receipt comprises also comprises both of the links URI{aB} and URI{aV} which may be encrypted using the transaction key Kt (particularly if the published attributes themselves are not), and in addition comprises:
the hash (e.g. HMAC) of the fresh bearer credential H(cB'); and
a hash (e.g. HMAC) of the fresh validator credential H(cB');

the hash of the used bearer credential H(cB)—also encrypted with Kt; and
a hash of the now-use validator credential H(cV)—also encrypted with Kt.

Each of the hashes H(cB'), H(cV) functions as an index, in that the master receipt 32m can be located using cB' or cV' even after they have been used or expired.

Further details of the master receipt are given below.

Figure 4:
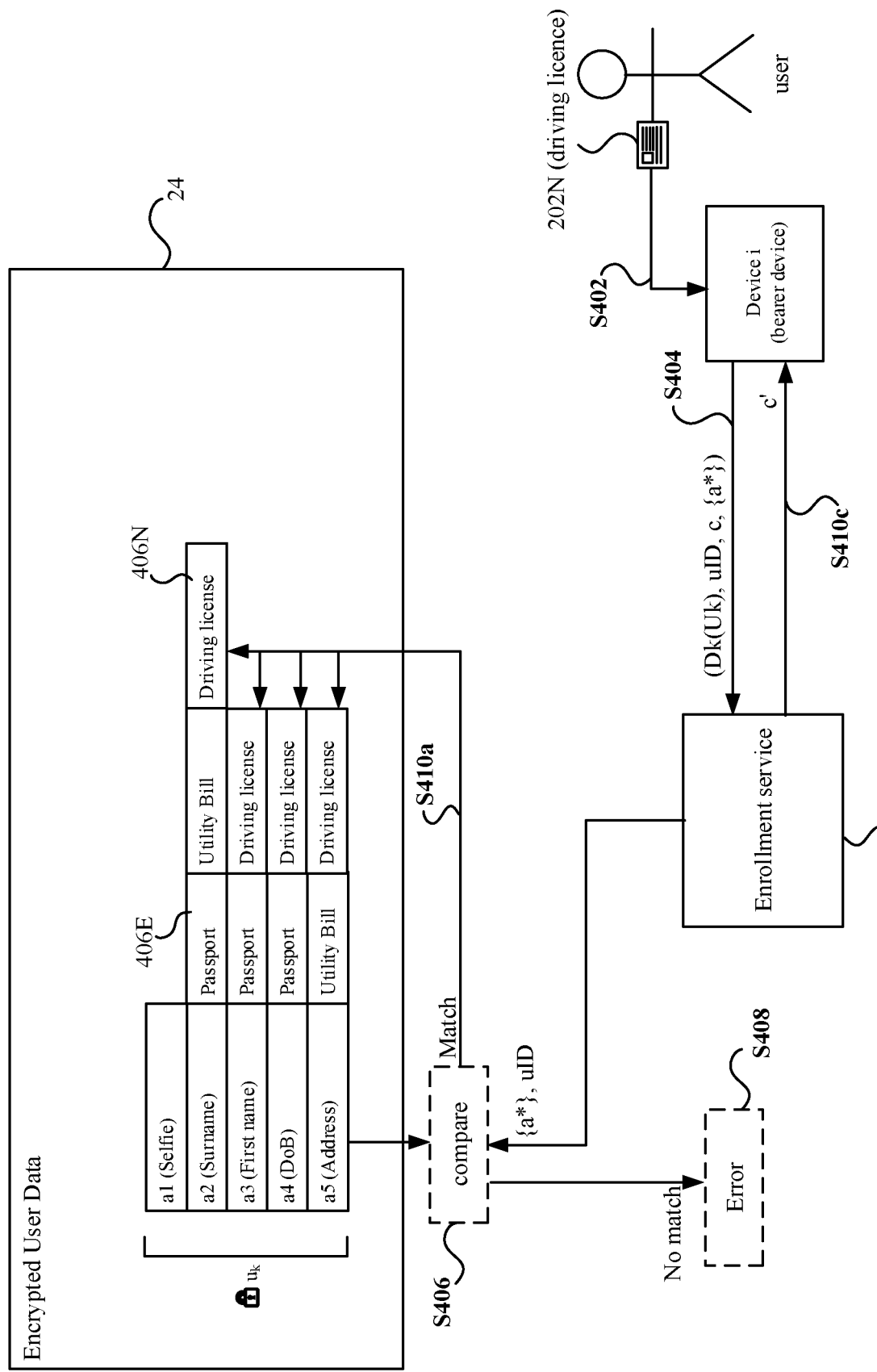
FIG. 4 shows a signalling diagram for a method of anchoring attributed to identity documents in a digital identity system.

FIG. 4 shows how a user's attributes may be anchored to identity documents (or to other verifiable information sources), such as a driving licenses and passports. The top half of FIG. 4 illustrates further details of how the user's attributes may be stored in the secure store 24. As shown, each of the attributes may be stored in association with any number of anchor identifiers 406 (including zero—not ever attribute needs to be anchored to a document; for example the selfie a1 is not anchored to any document in this example), and is thereby anchored to the identified document(s). The anchor identifier need not identify the document individually (though neither is that excluded)—it is sufficient for them to simply indicate its type e.g. "passport", "driving license", "utility bill" etc.

As indicated, different attributes may be implemented to different documents, and different numbers of documents. An attribute is only anchored to a document where that document evidences that attribute. For example, in FIG. 1, the user's surname a2, first name a3 and date of birth a4 are all anchored to the user's passport because these attributes appear on the user's passport and this has been verified by the digital identify system 1. For some attributes, it may be a prerequisite that they are anchored to at least one document on enrolment. FIG. 4 shows how a new anchoring document 202N may be added to existing attributes. At step S402, a set of one or more attributes {a*} is extracted from the new document 202N (driving license in this example), which is transmitted to the enrolment server 14a (S404) along with the encrypted user key Dk(Uk), an identifier of the user uID to be compared with that held at the system 1 and the user's current credential c. At step S406, the enrolment server 14a compares the newly-captured attributes {a*} with the attributes {a} held at the system to the extent that such a comparison is possible. For example, the name and date of birth on the driving license 202N should match the user's passport. If any of the relevant attributes do not match, the system generates an error message (S408). If attributes do match, the additional anchoring document is associated within the secure store 24 with the attributes to which it relates i.e. those attributes that are evidenced by that document (S410a). A fresh credential is issued to the user also (S410c).

An additional function provided by the digital identity system 1 is referred to herein as the "remember me" function. Within the digital identity system 1, each of the users is associated with a unique, randomized code (e.g. unique number or other character string), which may be derived from his user key Uk, e.g. it may be derived from Dk(Uk), (which is itself randomly generated). Alternatively the composite code may be generated from the users' attributes, for example by hashing them. Whenever two users interact in the manner described above, the digital identity system combines their unique codes to generate a composite code, which it provides to at least one, and preferably both, of those users. So, in the transaction of FIG. 3, the bearer and the validator each receive, at steps S312b, S312a, a composite code generated by combining their individual codes respectively. The composite code is such that neither of the codes from which it is generated can be recovered from the composite code alone. The composite code is unique to that pair of users. The individual codes are static as is the mechanism by which they are combined. Therefore, whenever those two users interact with one another again in the future, each receives the same composite code and therefore knows that he is interacting with the same user as before, without the user's ever gaining access to each other's individual codes. Preferably two such composite codes are generated—one for each user, that is unique both to that user and to that pair of users. That is, a different composite code for each of the users. The composite code for a given user is only meaningful to that user, i.e. only that user can use it to determine when the are interacting the other user again (the code is meaningless to any other user of the system, including the other user in the pair).

The above has been described with reference to "users" of the digital identity system 1, who are humans. It is important to note, however, that the term "user" in relation to the described digital identity system 1 means any entity that can be represented by one or more attributed, which includes non-human entities. That is the services implemented by the digital identity system 1 can be made available to any suitable entity (including humans and machines). For example, the validation method of FIG. 3 is described by way of example to a validator and a bearer who are both humans with devices available to them. However, the same method can equally be applied in the case that one of the bearer or the validator the device is the bearer or validator device itself, and that in general devices may be physical or virtual.

For example, the bearer or validator may be a Web server (or other content providing server), wherein the other of the bearer or the validator may be a user desiring to gain access to content provided by the Web server. In either case, the method allows the user to be validated to the Web server and the Web server validated to the user by way of the same transaction. Accordingly, all description pertaining to "user keys" and "user data" in the above applies equally to any key generated by the key generator 102 and issued to an entity (human or non-human) and any data of that entity that is held in the secure store 24 encrypted with that key on behalf of the entity respectively, wherein terms like "entity key", "entity data", "bearer key", "bearer data", "validator key", and "validator data" can apply to human and non-human entitles alike.

Each of the bearer and validator devices described above may comprise a processor, on which a respective instance of a digital identity application is executed so as to implement the above described functionality of those devices.

Generally the various services 14a, 14b implemented by the at least processor 114 of the digital identity can be implemented at any suitable manner at the hardware level. For example, each service may be implemented by a single processor, or distributed across multiple processors of the digital identity system. For example, different services may be implemented by different processors of the digital identity, the same processor(s), or with some overlap between the underlying physical processors depending on the circumstances. In general, all of the methods, systems and services described herein may be implemented by a computer system having any hardware architecture suitable for the tasks at hand. Further the various data stores referred to able can also be implemented in any suitable fashion at the hardware level, in a localized or distributed fashion. References to different data stores does not necessarily mean that those data stores are separated at the hardware level (though that is not excluded), and can for example include separation that is purely at a logical level.

The Applicant's has filed co-pending U.S. patent application Ser. Nos. 14/622,527, 14/622,709, 14/622,549, 14/622,737, 14/622,740 which describe a digital identity system, in which a user can, for example, create a profile of their digital identity (referred to therein as a "uPass") based on an identity document, such as a passport, and a self-captured image of their face ("selfie"). The subject matter of these applications has been incorporated explicitly herein below, under the heading "the Original uPass System".

In the Original uPass system, in contrast to the above-described system, the bearer provides his credential cB to the validator directly. However, the Original uPass system can be modified to substitute this credential with the sharing token Sk. That is, embodiments of the present invention relate to a version of the uPass system modified to incorporate sharing tokens in this manner.

Where the bearer credential is replaced with the sharing token Sk, the fresh bearer credential is issued by the modified uPass system when the sharing token is issued (as described above), and not at the end of the validation process (as in the original uPass system).

Note that "profiles" in the context of the Original uPass are implemented in embodiments of the present invention as a collection of one or more attributes selected by the bearer, at his device, when requesting the sharing token.

Note also that the various encryption methods described herein can be applied to data items of the Original uPass system.

Various additional aspects of the present invention are directed to the aspects of the Original uPass system set out below, modified to incorporate sharing tokens and/or in which the described encryption techniques are implemented.

The Original uPass System:

Summary of the Original uPass System:

According to a first aspect a digital identity system for creating a computer stored digital identity comprises: a network interface configured to send and receive electronic messages; persistent electronic storage; a profile management module configured to receive from an entity an electronic message comprising a data item, extract the data item from the electronic message and store the data item in a digital profile in the persistent electronic storage; a credential creation module configured to generate a credential for the profile and associate the credential with the digital profile; a publication module configured to publish the profile by storing a version of it to an addressable memory location; and a receipt generation module configured to automatically generate two non-matching receipts, each receipt comprising a transaction identifier, a first of the receipts comprising a link identifying the memory location to which the profile is published, a second of the receipts comprising the credential, wherein the first receipt is stored at the digital identity system and the second receipt is transmitted to an address associated with the entity. A corresponding method is also provided.

The profile creation mechanism of the present invention provides both a receipt for internal auditing by the digital identity system, and a credential for later use by the user.

Once created, the profile can be used by the entity to assert their identity to another entity (validator) in place of a real-word identity document. The other entity is able to access the published profile to ascertain the entity's relevant details from the data item and any other data items in the profile.

Preferably, presentation of the credential to the digital identity system by a presenting entity makes the published profile available to a presenting entity (in embodiments this may in fact trigger the publication). Thus the entity can provide their credential to the presenting entity as a way to assert their identity, as embodied in the profile, to the presenting entity. That is, the digital credential can be used as a substitute for a real-world identity document.

The data item may for instance be a visual image of the entity. For a human entity, this may be a photo of their face which captured from, or which is known to match, an identification photograph from a real-world identification document such as a passport or driving licence. This may be captured using a camera and/or wireless (NFC, Bluetooth etc.) technology if a suitable electronic chip is embedded in the document. The other entity can verify that the user is who they say they are by visually comparing the user's actual face with that in the published profile. Other data items such the user's name, data of birth, nationality etc. from the identity document may also be received and stored in the profile. Multiple profiles may be created for a user, which may be unique but nonetheless share some data items. For example, a basic profile may have only one data item (e.g. photo), and additional profile(s) may have the photo plus varying degrees of addition user data (name, name and date of birth, name and date of birth and nationality etc.).

By publishing version of the profiles rather than permitting direct access to the profiles, security of the profiles is preserved as the underlying profiles themselves are never visible outside of the digital identity system.

A receipt may be generated every time a transaction involving the profile takes place. Such receipts provide an audit trail, whereby historic activity by the entity is visible within the system. For example, the receipts can be used to isolate historic fraudulent activity by a human entity (user). Where the data item is a visual image of the user's face, this makes it easy to unequivocally link such activity back to an actual human. Preferably the profile is republished at every transaction to provide a "snapshot" of the profile as it was at that time, which is unaffected by future modifications. This ensures an accurate audit trail, whereby activity at any previous point in time can be accurately isolated.

Preferably, the profile is published upon presentation of the credential to the digital identity system e.g. by the validator so that the profile only becomes accessible to the validator when they present the credential.

For the purposes of auditing, a master receipt comprising data of each receipt may in embodiments be generated and stored in a master receipt book at the digital identity system. That is, both the first and the master receipt may be stored separately at the digital identity system. The master receipt may comprise only part of the first receipt, for instance the link, but not the credential.

In certain embodiments, however, it may comprise a hash (e.g. HMAC) of the credential. That is, a value generated by applying a cryptographic hash (e.g. HMAC) function to the credential. The hash function is irreversible, in that it is impossible to recover the credential itself from the hash of the credential. However, if the original credential is made available to the system later by the user, the hash can be re-computed from the available credential, and the resulting value can be used to locate the master receipt. This can allow, for example, lawful interception of receipts without comprising their security.

At least part of the master receipt (at least the link) and/or the published version of profile may be encrypted with the transaction identifier, in which case the master does not include the transaction identifier. That is, the transaction identifier may be used as a cryptographic key to encrypt the link and/or the published profile itself. This means that the published profile can only be accessed by the holder of the receipt comprising the transaction identifier, and cannot be accessed using the master receipt alone.

Preferably the credential is a randomised one-time only use credential, which can only be used to effect a single transaction and becomes invalid thereafter. This links the credential to the creation of the profile specifically. Similar one-time use credentials will then be needed any time the entity subsequently accesses and/or modifies the profile, and or creates a new profile, so that every credentials are linked to one specific transaction.

Preferably, metadata available to a computer device sending the electronic message is included in the message. The metadata may be metadata of the device itself, e.g. a device identifier (ID) such as a serial number or MAC address of the device, or it may be related metadata such as (geo) location (e.g. GPS) data identifying a (geo)location of the device when the message was sent. The metadata can be used to generate the credential, for example as a hash of the metadata and a random sequence (seed). This may result in a credential having a large bit size, thus a significant memory saving results from storing the "ingredients" used to create the credential at the digital identity system rather than the credential itself. A copy of the credential can then be created as and when it is needed, for instance to determine whether a credential presented to the system matches the original (access to the published profile may only be granted if this is the case). The seed and metadata may be hashed a random number of times, and the stored ingredients then include this random number as well.

Where the metadata comprises a device ID to the profile may only be granted if the credential is presented along with a matching device ID. Thus, use of the credential is restricted to that device for added security (if the user wishes to use multiple devices to assert their identify, they can request a separate credential for each device, each credential bound to the profile).

The profile may also have a confidence value allocated to it, which is indicative of the confidence the system has that the entity does indeed have the identity which they are asserting. The confidence value is preferably made available with the published profile, for instance it may be included in and published with the profile itself to the same memory location. Thus, the validator is not simply told that the entity is who or what they say they are, but is told how confident the digital identity system that that is the case. The confidence value may be an easily interpretable metric such as a value between 0 and 1 (or 0% and 100%), 0(%) representing complete uncertainty and 1(00%) representing total certainty, though the latter is unlikely in practice. The confidence value may change over time. For instance as the user uploads more data items e.g. photos of their face ("selfies") which may in some embodiments be required to log in to the digital identity system and stored at the digital identity system each time this may assert a positive influence on the confidence value causing it to (at least in the absence of other influences) increase, provided the photos do indeed match (whereas photos for which the match is questionable may have the opposite effect). Similarly, as the entity completes additional transaction this may exert a similarly positive influence. Conversely, where the data item(s) in the digital profile are captures from, say, a real-world identify document, as the document ages this may assert a negative influence on the confidence value causing it to (at least in the absence of other influences) decrease. Many such influences may be aggregated, whereby the confidence value reflects an overall confidence.

For capturing the relevant data, a second aspect provides a method of registering a digital identity comprising: capturing at a computer device a data item associated with an entity; creating an electronic message comprising the data item; transmitting the electronic message to a registration service; receiving a receipt from the registration service; extracting a credential from the receipt to render the credential available for accessing the data item for authenticating the entity; and storing the receipt in a local receipt book at a location accessible to the computer device.

In the case that the relevant data is captured from an identity document, a third aspect provides a method implemented by executing digital identity software on a processor of a user device (for example a smart device such as a smartphone or tablet) to: capture with a camera of the user device an image of the face of a user of the device; capture data from a real-world identity document (such as a driving licence or passport), the data including an identification photograph, wherein the data is captured with the camera, from an electronic transmitter embedded in the anchoring document, or a combination of both; transmit the image of the user and the captured data to a digital identify system; and receive from the digital identify system a credential for the user, wherein presentation of the credential to the digital identity system renders at least part of the captured data available to a presenting entity.

The captured data also comprises an attribute of the document, for example enough data to be able to ascertain with reasonable certainty a type of the document (e.g. driving licence, passport etc.) and possibly to be able to determine whether or not the document seems authentic.

At the system side, a fourth aspect provides a computer implemented method implemented by a digital identity system, the method comprising: receiving in an electronic message from a user device: an image of the face of a user of the user device which has been captured at the user device; and data which has been captured from a real-world identity document and which comprises an identification photograph; storing at least part of the captured data at the digital identity system in persistent electronic storage; comparing the image of the face with the identity photograph using a facial verification algorithm; only if the image of the face matches the identification photograph, generating a credential for the user and transmitting the credential to the user, wherein presentation of the credential to the digital identity system renders at least part of the stored data available to a presenting entity.

Using facial verification in this manner ensures users can only use their own identity documents as a basis for a digital identity within the system. The image of their face and/or the photograph captured from the identity document is presented to the presenting entity, which is particularly applicable when one human is identifying themselves to another human in the real-world.

Where an attribute of the document is also received, generation and transmission of the credential may only take place if the attribute matches some predetermined criteria. For example, for a passport, the attribute may be characters captured from a machine readable zone (MRZ) and the condition may be that these have a valid format.

According to various aspects of the present invention, an identity is instead asserted using a digital profile. A profile may for instance be created from data captured from a real-world identity document such as a passport or driving licence, which preferably comprises an identification photograph form the document. Once created, the profile can be used by the entity to assert their identity to another entity (validator).

In another aspect, a method of authenticating a digital credential of a bearer by a validating device comprises: capturing the bearer credential by the validating device; transmitting to a validation service the bearer credential with a validator credential bound to the validating device; at the validation service, validating the bearer credential and the validation credential, and if the validator credential is valid, using the bearer credential to access a data item of a digital profile and creating an electronic message for transmission to the validating device, the electronic message indicating the data item and comprising a fresh validator credential generated by the validation service; issuing a fresh bearer credential and creating an electronic message to transmit the fresh bearer credential to an address associated with the bearer.

Preferably the method also comprises the step of using the validator credential to access a data item of a digital profile associated with the validating device and creating an electronic message for transmission to the bearer, the electronic message indicating a data item for verification by the bearer. In this manner, a single transaction provides two-way authentication—not only is the validator able to authenticate the bearer using the data item from the bearer's profile, but the bearer is able to likewise validate the validator. Thus a single transaction tells both entities whether or not they should believe that the other is who or what they assert they are. This arises from the novel combination of the validator presenting both their own and the bearer's credential together, and each entity getting back a respective data item for the other entity. The data item relating to the validator is sent to the bearer by out of band signalling, for instance to a device having an address associated with the bearer credential in the digital identity system.

In another aspect a method of providing access to digital profiles held in persistent electronic storage of a digital identity system comprises: receiving from a requesting entity an electronic request message identifying a target entity; in response to the request, publishing: (i) a digital profile of the target entity by storing a version of that profile in an addressable memory location, and (ii) a digital profile of the requesting entity by storing a version of that profile in another addressable memory location; generating two non-matching receipts, each comprising a transaction identifier, a first of which comprises a link identifying the memory location to which the target entity's profile is published, the second of which comprises a link identifying the other memory location to which the requesting entity's profile is published; transmitting the first receipt to an address associated with the requesting entity; and transmitting the second receipt to an address associated with the target entity.

Each entity can validate the other based on the relevant published profile in a single transaction.

By publishing a version of the profile rather than permitting direct access to the profile, security of the profile is preserved as the underlying profile itself is never visible outside of the digital identity system.

A link, such as a Uniform Resource Indicator (URI), identifying the addressable memory location may be transmitted to the presenting device.

The link may be generated from a random sequence and/or the addressable memory location may be selected based on a random sequence. Random generation of links/ selection of memory addresses ensures efficient use of the memory address/link space.

The data item may for instance be a visual image of the entity. For a human entity, this may be a photo of their face which captured from, or which is known to match, an identification photograph from a real-world identification document such as a passport or driving licence. This may be captured using a camera and/or wireless (NFC, Bluetooth etc.) technology if a suitable electronic chip is embedded in the document. The other entity can verify that the user is who they say they are by visually comparing the user's actual face with that in the published profile. Other data items such the user's name, data of birth, nationality etc. from the identity document may also be received and stored in the profile. Multiple profiles may be created for a user, which may be unique but nonetheless share some data items. For example, a basic profile may have only one data item (e.g. photo), and additional profile(s) may have the photo plus varying degrees of addition user data (name, name and date of birth, name and date of birth and nationality etc.).

Preferably, metadata available to a computer device sending the electronic message is included in the message. The metadata may be metadata of the device itself, e.g. a device identifier (ID) such as a serial number or MAC address of the device, or it may be related metadata such as (geo) location (e.g. GPS) data identifying a (geo)location of the device when the message was sent. The metadata can be used to generate the credential, for example as a hash of the metadata and a random sequence (seed). This may result in a credential having a large bit size, thus a significant memory saving results from storing the "ingredients" used to create the credential at the digital identity system rather than the credential itself. A copy of the credential can then be created as and when it is needed, for instance to determine whether a credential presented to the system matches the original (access to the published profile may only be granted if this is the case). The seed and metadata may be hashed a random number of times, and the stored ingredients then include this random number as well.

Where the metadata comprises a device ID to the profile may only be granted if the credential is presented along with a matching device ID. Thus, use of the credential is restricted to that device for added security (if the user wishes to use multiple devices to assert their identity, they can request a separate credential for each device, each credential bound to the profile).

A receipt may be generated every time a transaction involving the profile takes place. Such receipts provide an audit trail, whereby historic activity by the entity is visible within the system. For example, the receipts can be used to isolate historic fraudulent activity by a human entity (user). Where the data item is a visual image of the user's face, this makes it easy to unequivocally link such activity back to an actual human. Preferably the profile is republished at every transaction to provide a "snapshot" of the profile as it was at that time, which is unaffected by future modifications. This ensures an accurate audit trail, whereby activity at any previous point in time can be accurately isolated.

Preferably, the profile is published upon presentation of the credential to the digital identity system e.g. by the validator so that the profile only becomes accessible to the validator when they present the credential.

For the purposes of auditing, a master receipt comprising data of each receipt may in embodiments be generated and stored in a master receipt book at the digital identity system. That is, both the first and the master receipt may be stored separately at the digital identity system. The master receipt may comprise only part of the first receipt, for instance the link and the transaction identifier, but not the credential.

Preferably each credential is a randomised one-time only use credential, which can only be used to effect a single transaction and becomes invalid thereafter. This links the credential to the creation of a profile specifically. Similar one-time use credentials will then be needed any time the entity subsequently accesses and/or modifies the profile, and or creates a new profile, so that every credentials are linked to one specific transaction.

The profile may also have a confidence value allocated to it, which is indicative of the confidence the system has that the entity does indeed have the identity which they are asserting. The confidence value is preferably made available with the published profile, for instance it may be included in and published with the profile itself to the same memory location. Thus, the validator is not simply told that the entity is who or what they say they are, but is told how confident the digital identity system that that is the case. The confidence value may be an easily interpretable metric such as a value between 0 and 1 (or 0% and 100%), 0(%) representing complete uncertainty and 1(00%) representing total certainty, though the latter is unlikely in practice. The confidence value may change over time. For instance as the user uploads more data items e.g. photos of their face ("selfies") which may in some embodiments be required to log in to the digital identity system and stored at the digital identity system each time this may assert a positive influence on the confidence value causing it to (at least in the absence of other influences) increase, provided the photos do indeed match (whereas photos for which the match is questionable may have the opposite effect). Similarly, as the entity completes additional transaction this may exert a similarly positive influence. Conversely, where the data item(s) in the digital profile are captures from, say, a real-world identify document, as the document ages this may assert a negative influence on the confidence value causing it to (at least in the absence of other influences) decrease. Many such influences may be aggregated, whereby the confidence value reflects an overall confidence.

In another aspect a digital identity system comprises: an enrolment module configured to receive a data item from an enrolling device and to create in persistent electronic storage a digital profile comprising the data item; a credential creation module configured to generate a credential from a random sequence, to associate the credential with the digital profile in a database, and to transmit the credential to the enrolling device; a publication module configured, in response to later presentation of the credential to the digital identity system, to publish the digital profile by storing a version of the digital profile in a memory location accessible to a device presenting the credential.

An entity (which may be a user of the enrolling device or the enrolling device itself) can provide their credential a presenting entity (e.g. the presenting device or user thereof) as a way to assert their identity, as embodied in the profile, to the presenting entity. That is, the digital credential and profile can be used as a substitute for a real-world identity document.

By publishing a version of the profile rather than permitting direct access to the profile, security of the profile is preserved as the underlying profile itself is never visible outside of the digital identity system.

A link, such as a Uniform Resource Indicator (URI), identifying the addressable memory location may be transmitted to the presenting device.

The link is generated from a random sequence and/or the addressable memory location is selected based on a random sequence. Random generation of links/selection of memory addresses ensures efficient use of the memory address/link space.

The data item may for instance be a visual image of the entity. For a human entity, this may be a photo of their face which captured from, or which is known to match, an identification photograph from a real-world identification document such as a passport or driving licence. This may be captured using a camera and/or wireless (NFC, Bluetooth etc.) technology if a suitable electronic chip is embedded in the document. The other entity can verify that the user is who they say they are by visually comparing the user's actual face with that in the published profile. Other data items such the user's name, data of birth, nationality etc. from the identity document may also be received and stored in the profile. Multiple profiles may be created for a user, which may be unique but nonetheless share some data items. For example, a basic profile may have only one data item (e.g. photo), and additional profile(s) may have the photo plus varying degrees of addition user data (name, name and date of birth, name and date of birth and nationality etc.).

Preferably, metadata available to a computer device sending the electronic message is included in the message. The metadata may be metadata of the device itself, e.g. a device identifier (ID) such as a serial number or MAC address of the device, or it may be related metadata such as (geo) location (e.g. GPS) data identifying a (geo)location of the device when the message was sent. The metadata can be used to generate the credential, for example as a hash of the metadata and a random sequence (seed). This may result in a credential having a large bit size, thus a significant memory saving results from storing the "ingredients" used to create the credential at the digital identity system rather than the credential itself. A copy of the credential can then be created as and when it is needed, for instance to determine whether a credential presented to the system matches the original (access to the published profile may only be granted if this is the case). The seed and metadata may be hashed a random number of times, and the stored ingredients then include this random number as well.

Where the metadata comprises a device ID to the profile may only be granted if the credential is presented along with a matching device ID. Thus, use of the credential is restricted to that device for added security (if the user wishes to use multiple devices to assert their identify, they can request a separate credential for each device, each credential bound to the profile).

A receipt may be generated every time a transaction involving the profile takes place. Such receipts provide an audit trail, whereby historic activity by the entity is visible within the system. For example, the receipts can be used to isolate historic fraudulent activity by a human entity (user). Where the data item is a visual image of the user's face, this makes it easy to unequivocally link such activity back to an actual human. Preferably the profile is republished at every transaction to provide a "snapshot" of the profile as it was at that time, which is unaffected by future modifications. This ensures an accurate audit trail, whereby activity at any previous point in time can be accurately isolated.

Preferably, the profile is published upon presentation of the credential to the digital identity system e.g. by the validator so that the profile only becomes accessible to the validator when they present the credential.

For the purposes of auditing, a master receipt comprising data of each receipt may in embodiments be generated and stored in a master receipt book at the digital identity system. That is, both the first and the master receipt may be stored separately at the digital identity system. The master receipt may comprise only part of the first receipt, for instance the link and the transaction identifier, but not the credential.

Preferably the credential is a randomised one-time only use credential, which can only be used to effect a single transaction and becomes invalid thereafter. This links the credential to the creation of the profile specifically. Similar one-time use credentials will then be needed any time the entity subsequently accesses and/or modifies the profile, and or creates a new profile, so that every credentials are linked to one specific transaction.

In another aspect, a method of providing access to a digital profile comprises receiving a one-time only use credential associated with a digital profile in persistent electronic storage; validating the credential and, only if the credential is valid, publishing the profile to an addressable memory location by storing a version of it at the memory location, thereby invalidating the credential; generating a fresh one-time only use credential for the digital profile; associating the fresh credential with the digital profile; and transmitting the fresh credential to an address associated with an entity, whereby the entity can use the fresh credential once thereafter to cause the profile to be republished to a different addressable memory location.

In accordance with this other aspect, every time a current credential is presented, a new version of the profile is published and a fresh credential created.

The profile may also have a confidence value allocated to it, which is indicative of the confidence the system has that the entity does indeed have the identity which they are asserting. The confidence value is preferably made available with the published profile, for instance it may be included in and published with the profile itself to the same memory location. Thus, the validator is not simply told that the entity is who or what they say they are, but is told how confident the digital identity system that that is the case. The confidence value may be an easily interpretable metric such as a value between 0 and 1 (or 0% and 100%), 0(%) representing complete uncertainty and 1(00%) representing total certainty, though the latter is unlikely in practice. The confidence value may change over time. For instance as the user uploads more data items e.g. photos of their face ("selfies") which may in some embodiments be required to log in to the digital identity system and stored at the digital identity system each time this may assert a positive influence on the confidence value causing it to (at least in the absence of other influences) increase, provided the photos do indeed match (whereas photos for which the match is questionable may have the opposite effect). Similarly, as the entity completes additional transaction this may exert a similarly positive influence. Conversely, where the data item(s) in the digital profile are captures from, say, a real-world identify document, as the document ages this may assert a negative influence on the confidence value causing it to (at least in the absence of other influences) decrease. Many such influences may be aggregated, whereby the confidence value reflects an overall confidence.

According to various aspects of the present invention, an identity is instead asserted using a digital profile. A profile may for instance be created from data captured from a real-world identity document such as a passport or driving licence, which preferably comprises an identification photograph from the document. Once created, the profile can be used by the entity to assert their identity to a presenting entity (validator). The entity can provide the credential to the presenting entity who presents it to a digital identity computer system. Not only is the profile made available to the validator, but a confidence value associated with the profile is presented alongside.

According to another aspect a computer system comprises: electronic storage; a network interface configured to receive electronic messages; and a processor configured to execute identity management code which operates to:

receive an electronic message from the network interface, the message including at least one data item to be included in a digital profile for an entity, the data item associated with the entity an uniquely identifying the entity; extract the data item from the electronic message;

create a digital profile using the data item in the electronic storage, wherein the profile comprises the data item;

allocate a confidence value to the profile, wherein the confidence value is allocated based on at least one of a source of the electronic message and a type of the data item; and create and transmit a credential to the entity, wherein presentation of the credential to the computer system renders a version of the digital profile and the confidence value available to a presenting entity.

The confidence value is indicative of the confidence the system has that the entity, e.g. a human or a device, does indeed have the identity which they are asserting. Thus, the validator is not simply told that the entity is who or what they say they are, but is told how confident the digital identity system that that is the case. The confidence value may be an easily interpretable metric such as a value between 0 and 1 (or 0% and 100%), 0(%) representing complete uncertainty and 1(00%) representing total certainty, though the latter is unlikely in practice.

The data item may be a visual image of the entity, which may be a user. For example, two visual images of the user may be included in the message: the first an identification photo captured from a real-world identity document; the second a photo of the user's face which they have taken with a camera ("selfie"). Facial recognition may be used to determine how close a match the two data items are, and the confidence value allocated based on the comparison to reflect this. The presenting entity is thus told the extent to which the user's faces matches whatever form of identity document hey have used to create the profile.

The confidence value may change over time. For instance as the user uploads more data items e.g. selfies, which may in some embodiments be required to log in to the digital identity system and stored at the digital identity system each time, this may assert a positive influence on the confidence value causing it to (at least in the absence of other influences) increase, provided the photos do indeed match (whereas photos for which the match is questionable may have the opposite effect). Similarly, as the entity completes additional transaction this may exert a similarly positive influence. Conversely, where the data item(s) in the digital profile are captured from, say, a real-world identify document, as the document ages this may assert a negative influence on the confidence value causing it to (at least in the absence of other influences) decrease. Many such influences may be aggregated, whereby the confidence value reflects an overall confidence.

Corresponding methods are provided, which are computer-implemented. A computer program product comprising code stored on a computer readable storage medium configured to implement any method or system disclosed herein is also provided.

A version of the profile may be published to render it available. By publishing a version of the profile rather than permitting direct access to the profile, security of the profile is preserved as the underlying profile itself is never visible outside of the digital identity system.

A link, such as a Uniform Resource Indicator (URI), identifying the addressable memory location may be transmitted to the presenting device.

The link is generated from a random sequence and/or the addressable memory location is selected based on a random sequence. Random generation of links/selection of memory addresses ensures efficient use of the memory address/link space.

The data item may for instance be a visual image of the entity. For a human entity, this may be a photo of their face which captured from, or which is known to match, an identification photograph from a real-world identification document such as a passport or driving licence. This may be captured using a camera and/or wireless (NFC, Bluetooth etc.) technology if a suitable electronic chip is embedded in the document. The other entity can verify that the user is who they say they are by visually comparing the user's actual face with that in the published profile. Other data items such the user's name, data of birth, nationality etc. from the identity document may also be received and stored in the profile. Multiple profiles may be created for a user, which may be unique but nonetheless share some data items. For example, a basic profile may have only one data item (e.g. photo), and additional profile(s) may have the photo plus varying degrees of addition user data (name, name and date of birth, name and date of birth and nationality etc.).

Preferably, metadata available to a computer device sending the electronic message is included in the message. The metadata may be metadata of the device itself, e.g. a device identifier (ID) such as a serial number or MAC address of the device, or it may be related metadata such as (geo) location (e.g. GPS) data identifying a (geo)location of the device when the message was sent. The metadata can be used to generate the credential, for example as a hash of the metadata and a random sequence (seed). This may result in a credential having a large bit size, thus a significant memory saving results from storing the "ingredients" used to create the credential at the digital identity system rather than the credential itself. A copy of the credential can then be created as and when it is needed, for instance to determine whether a credential presented to the system matches the original (access to the published profile may only be granted if this is the case). The seed and metadata may be hashed a random number of times, and the stored ingredients then include this random number as well.

Where the metadata comprises a device ID to the profile may only be granted if the credential is presented along with a matching device ID. Thus, use of the credential is restricted to that device for added security (if the user wishes to use multiple devices to assert their identity, they can request a separate credential for each device, each credential bound to the profile).

A receipt may be generated every time a transaction involving the profile takes place. Such receipts provide an audit trail, whereby historic activity by the entity is visible within the system. For example, the receipts can be used to isolate historic fraudulent activity by a human entity (user). Where the data item is a visual image of the user's face, this makes it easy to unequivocally link such activity back to an actual human. Preferably the profile is republished at every transaction to provide a "snapshot" of the profile as it was at that time, which is unaffected by future modifications. This ensures an accurate audit trail, whereby activity at any previous point in time can be accurately isolated.

Preferably, the profile is published upon presentation of the credential to the digital identity system e.g. by the validator so that the profile only becomes accessible to the validator when they present the credential.

For the purposes of auditing, a master receipt comprising data of each receipt may in embodiments be generated and stored in a master receipt book at the digital identity system. That is, both the first and the master receipt may be stored separately at the digital identity system. The master receipt may comprise only part of the first receipt, for instance the link and the transaction identifier, but not the credential.

Preferably the credential is a randomised one-time only use credential, which can only be used to effect a single transaction and becomes invalid thereafter. This links the credential to the creation of the profile specifically. Similar one-time use credentials will then be needed any time the entity subsequently accesses and/or modifies the profile, and or creates a new profile, so that every credentials are linked to one specific transaction.

A computer program product comprising code stored on a computer readable storage medium configured to implement any method or system disclosed herein is also provided.

Figure 5:
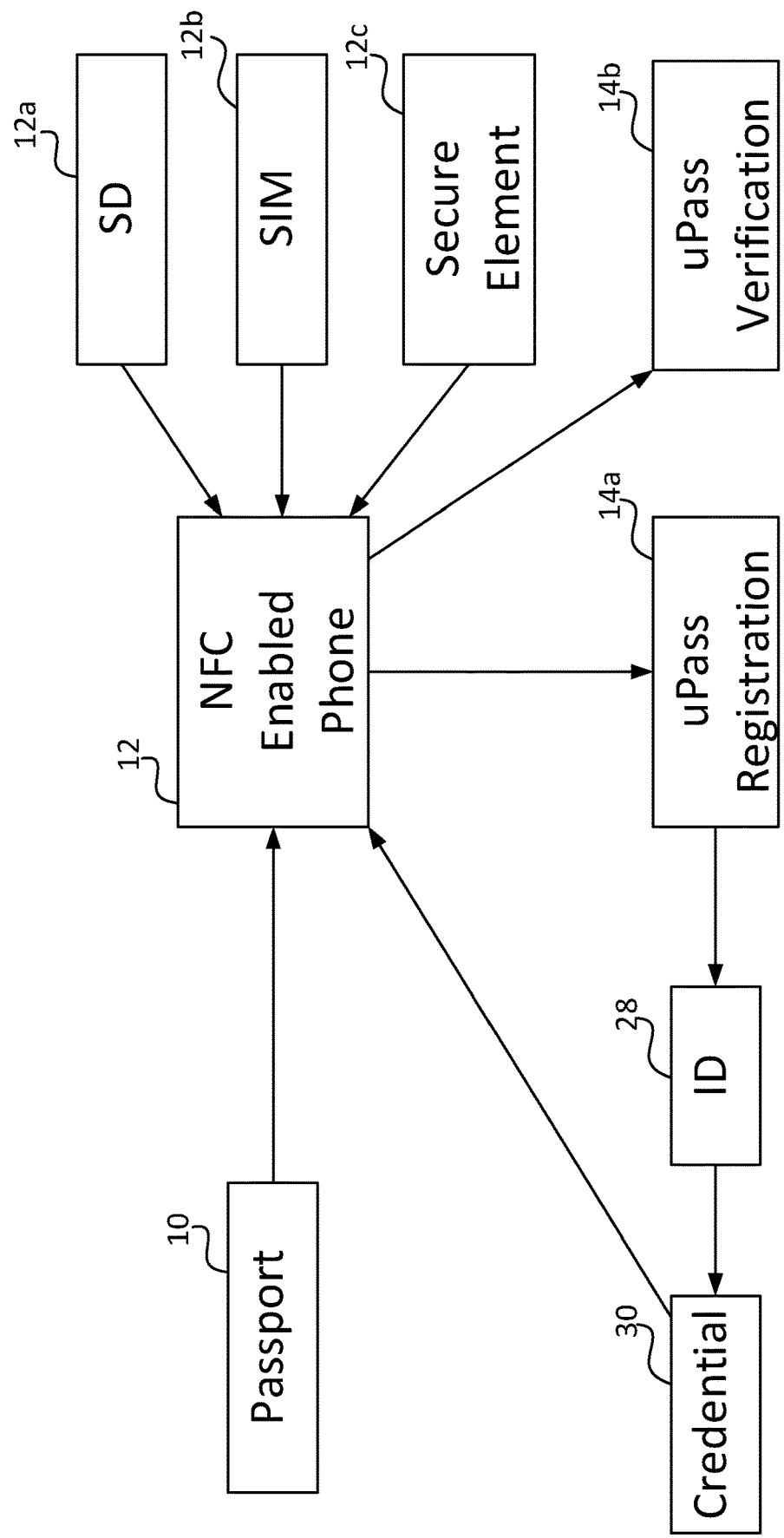
FIG. 5 is a schematic diagram of the core elements of a digital identity system.
Figure 6:
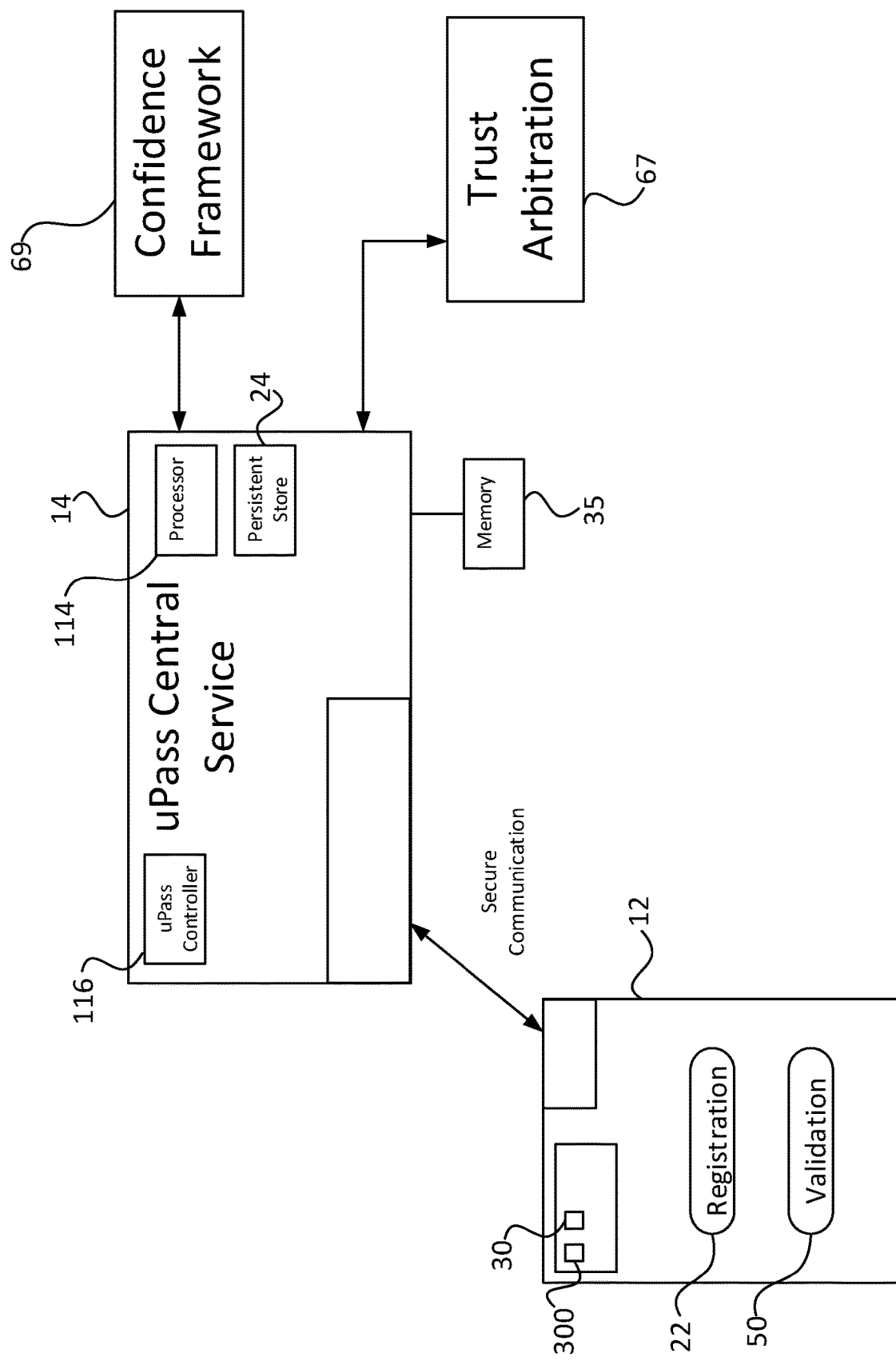
FIG. 6 is schematic block diagram of the principal components of a digital identity system.
Figure 7:
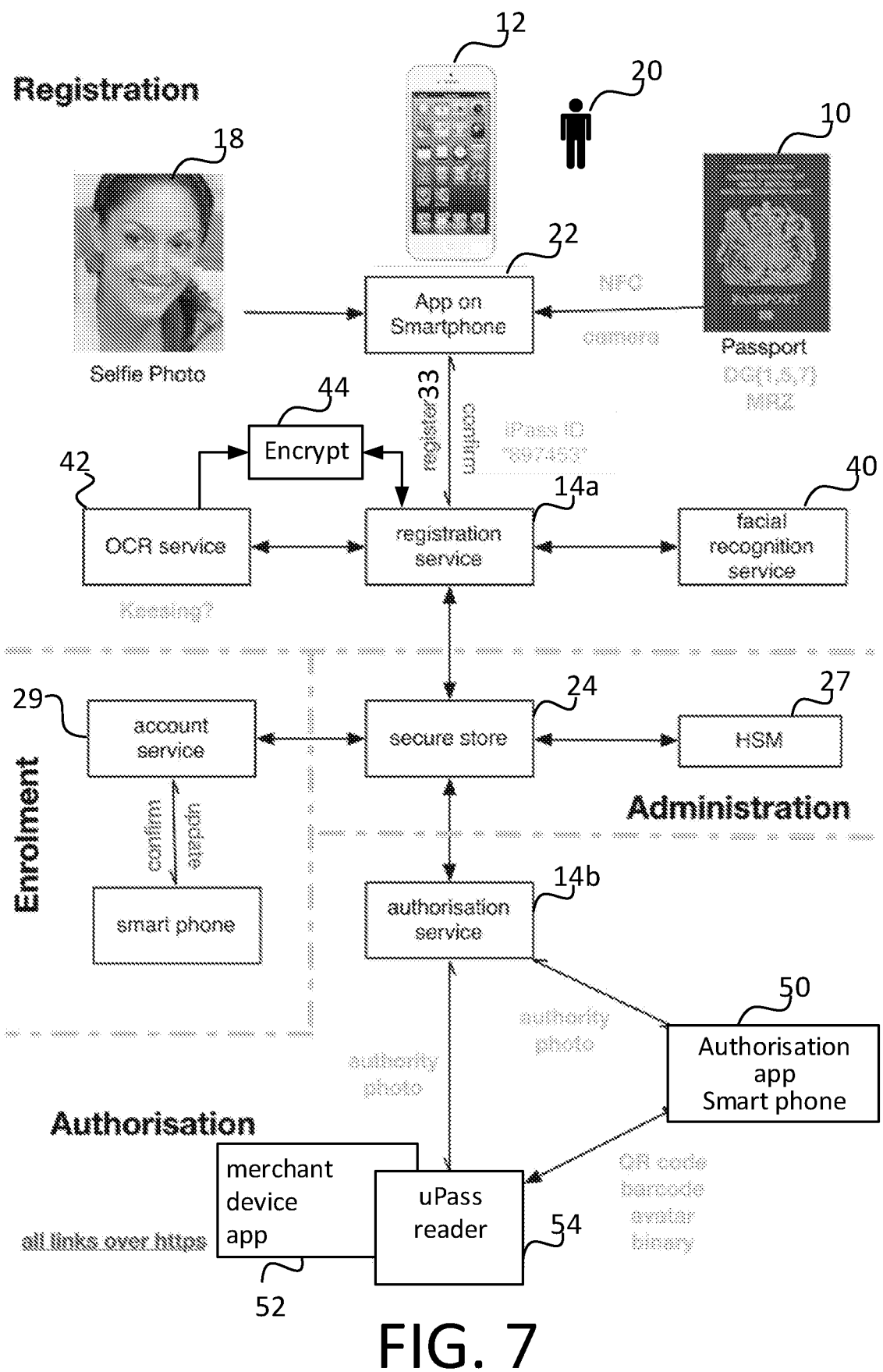
FIG. 7 is an expanded schematic diagram of functional components of a digital identity system.
Figure 8:
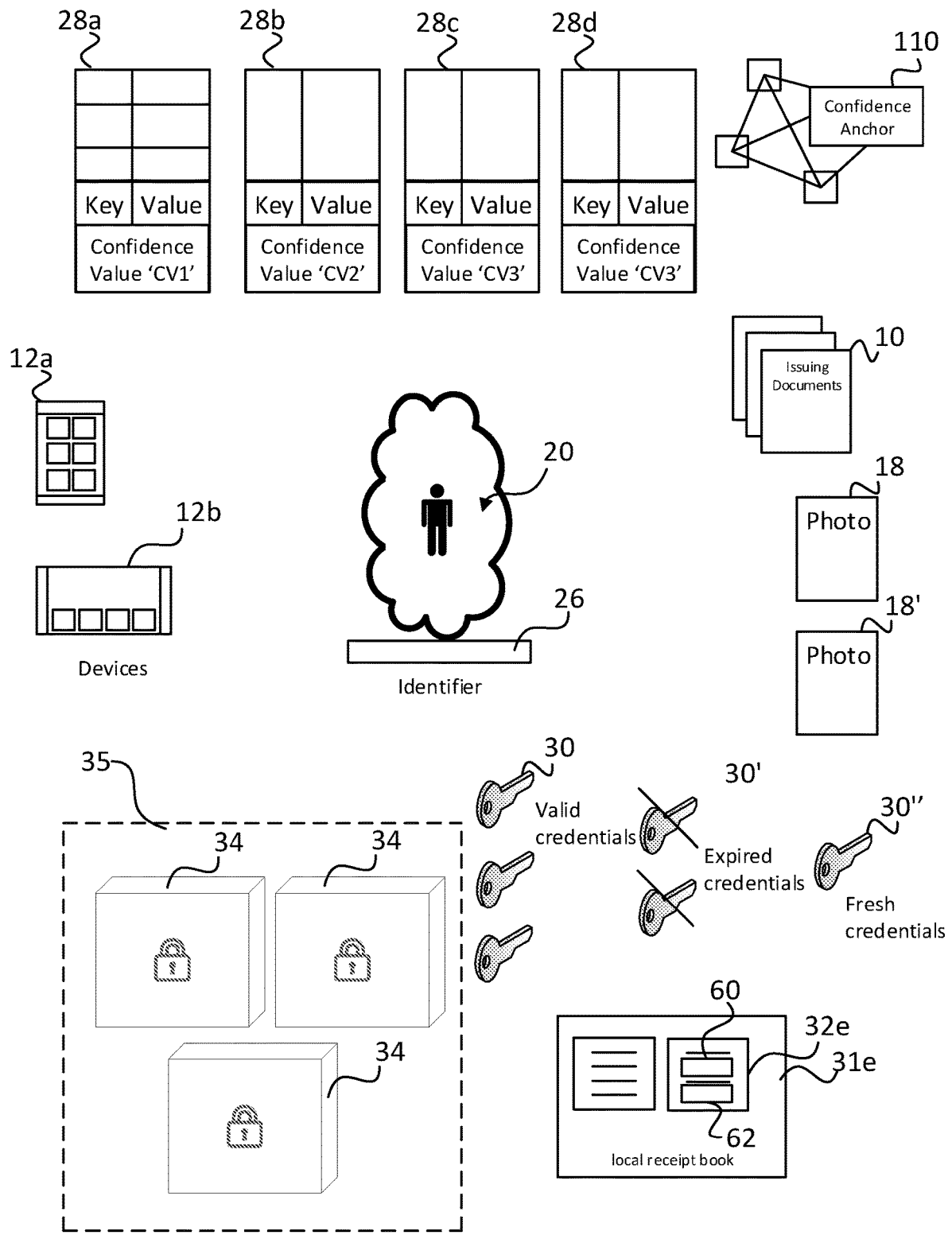
FIG. 8 is a schematic block diagram of data items stored as part of a digital identity system.
Figure 10:
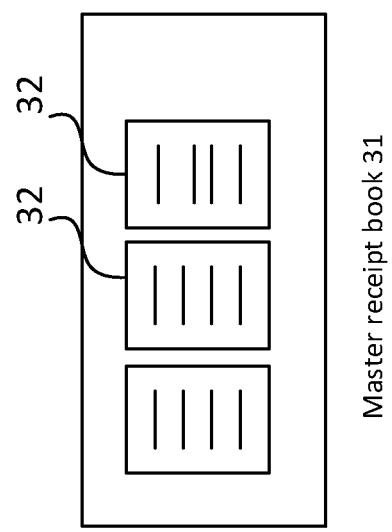
FIG. 10 shows a master receipt book of a digital identity system.
Figure 11:
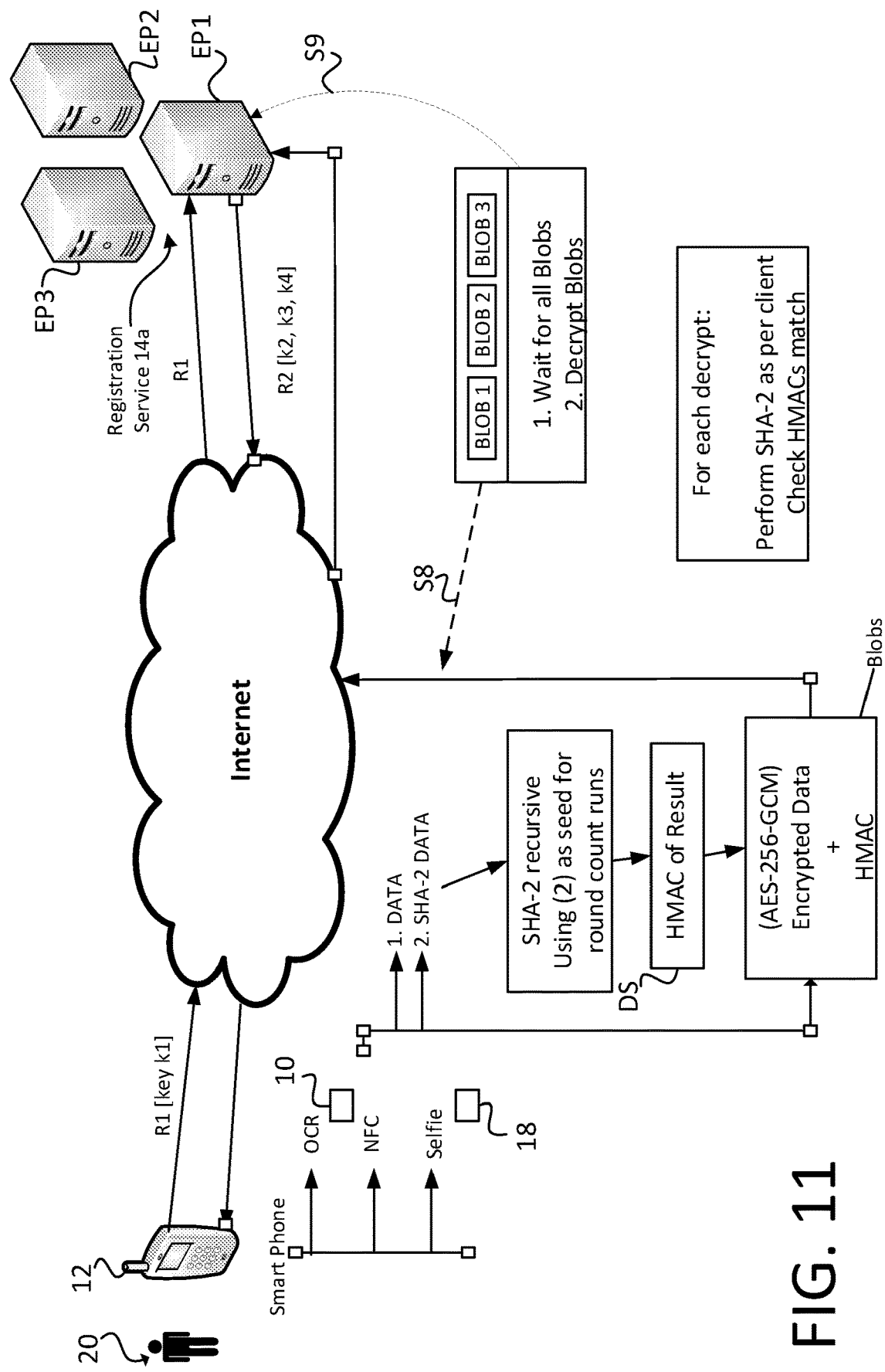
FIG. 11 is a schematic flow diagram illustrating the creation of credentials in a digital identity system.
Figure 12:
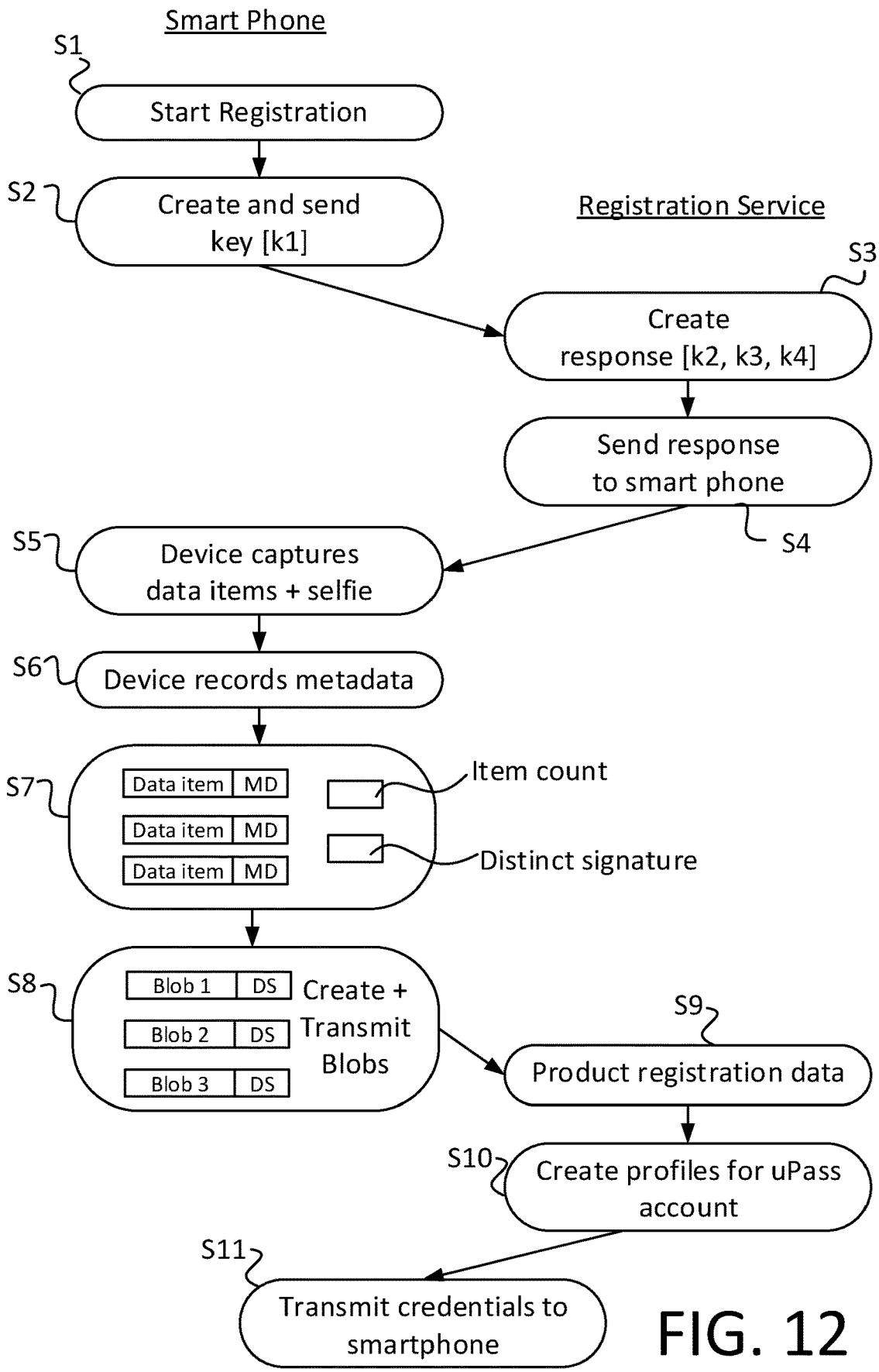
FIG. 12 is a flow diagram showing the flow conducted at a smartphone and registration service of the creation of credentials in a digital identity system.
Figure 14:
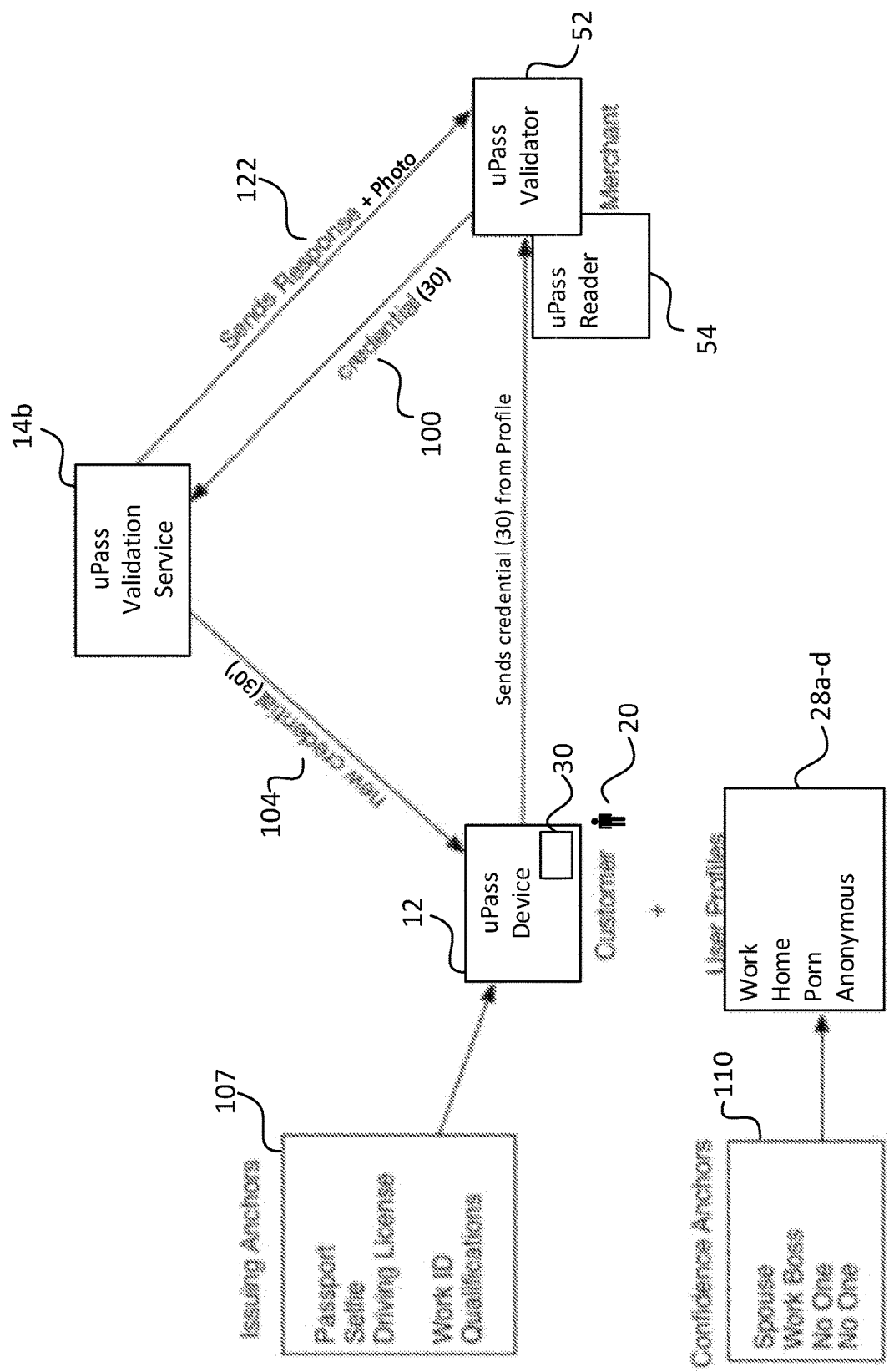
FIG. 14 is a schematic flow diagram showing an authentication process.
Figure 15:
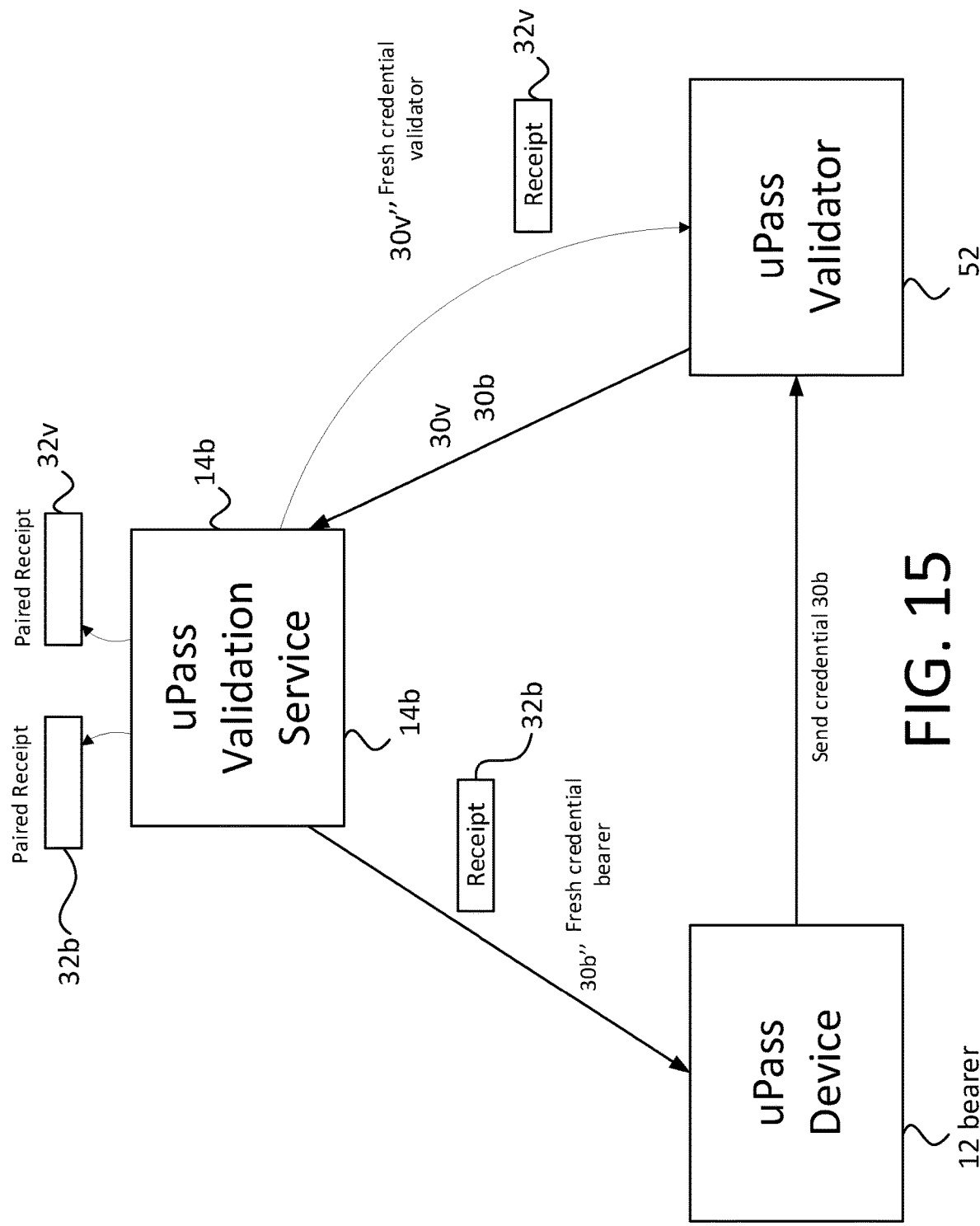
FIG. 15 is a flow diagram for an authentication process.
Figure 16:
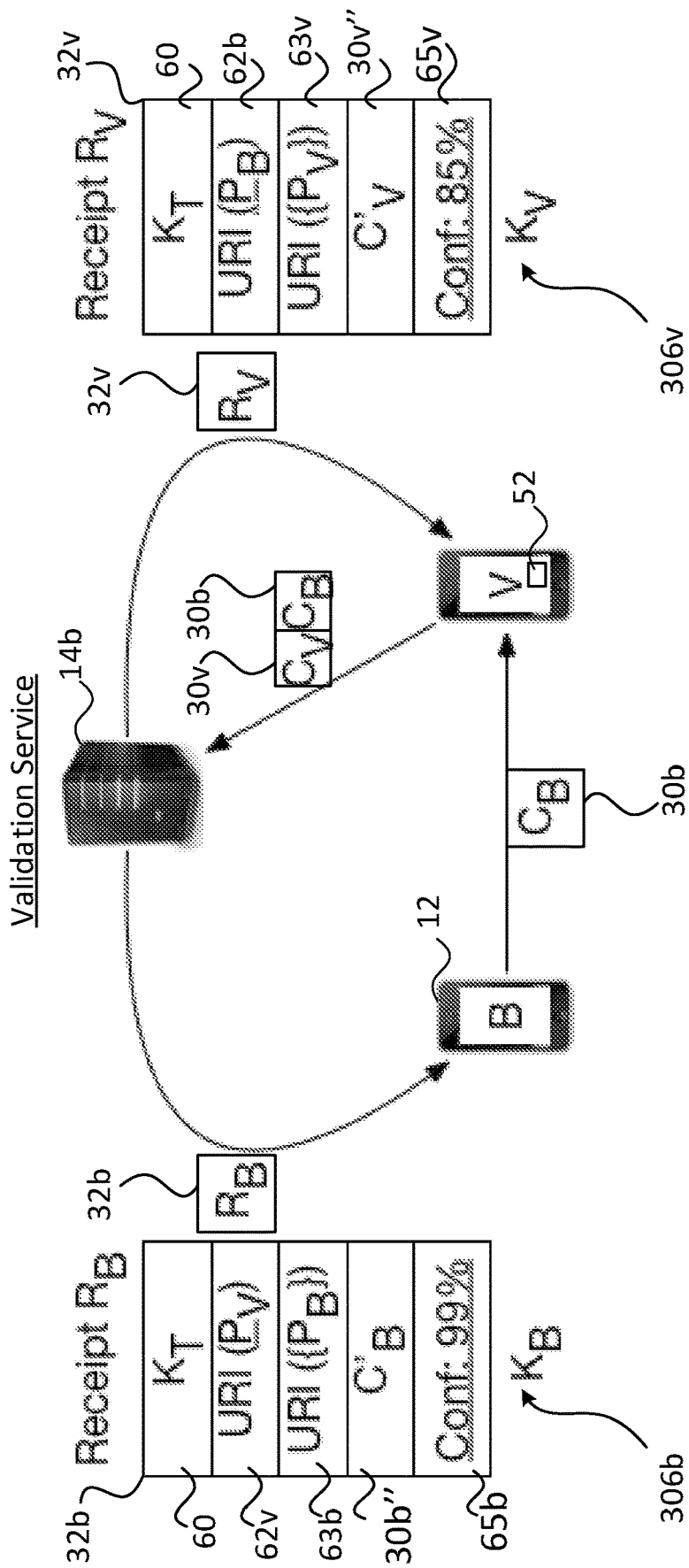
FIG. 16 shows details of receipts generated during an authentication process.
Figure 17:
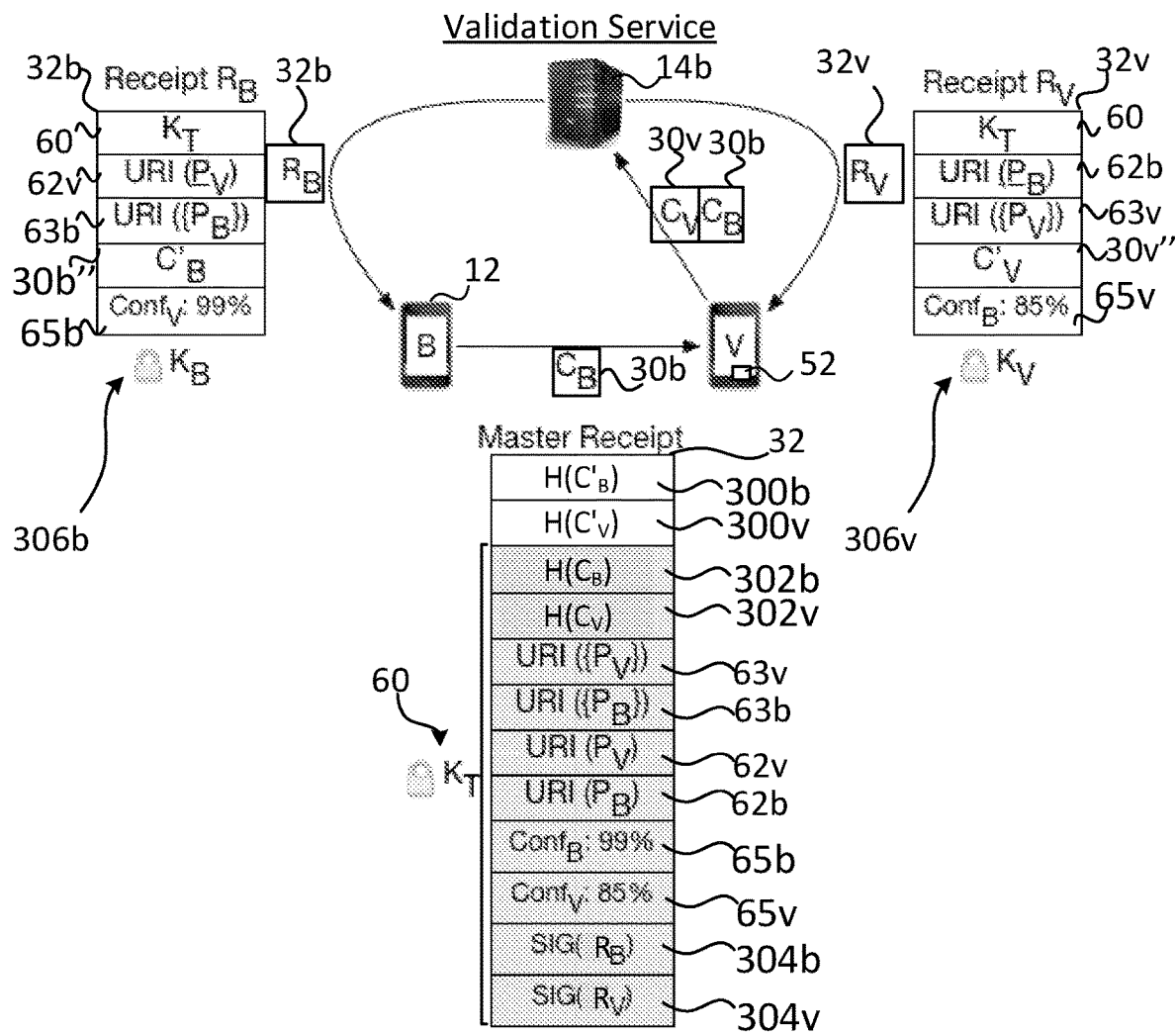
FIG. 17 shows details of a master receipt generated during an authentication process.
Figure 18:
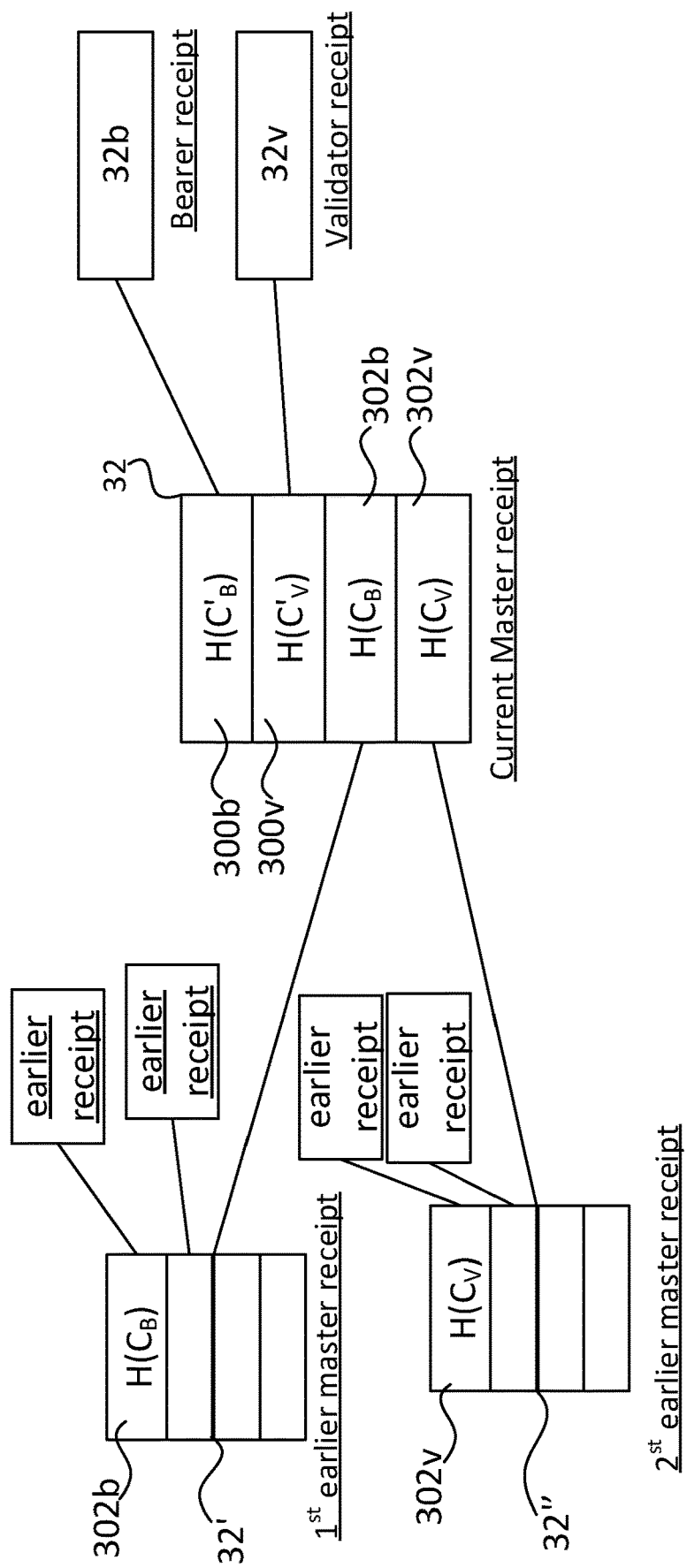
FIG. 18 schematically illustrates certain relationships between various receipts and master receipts that arise due to their content.
Figure 19:
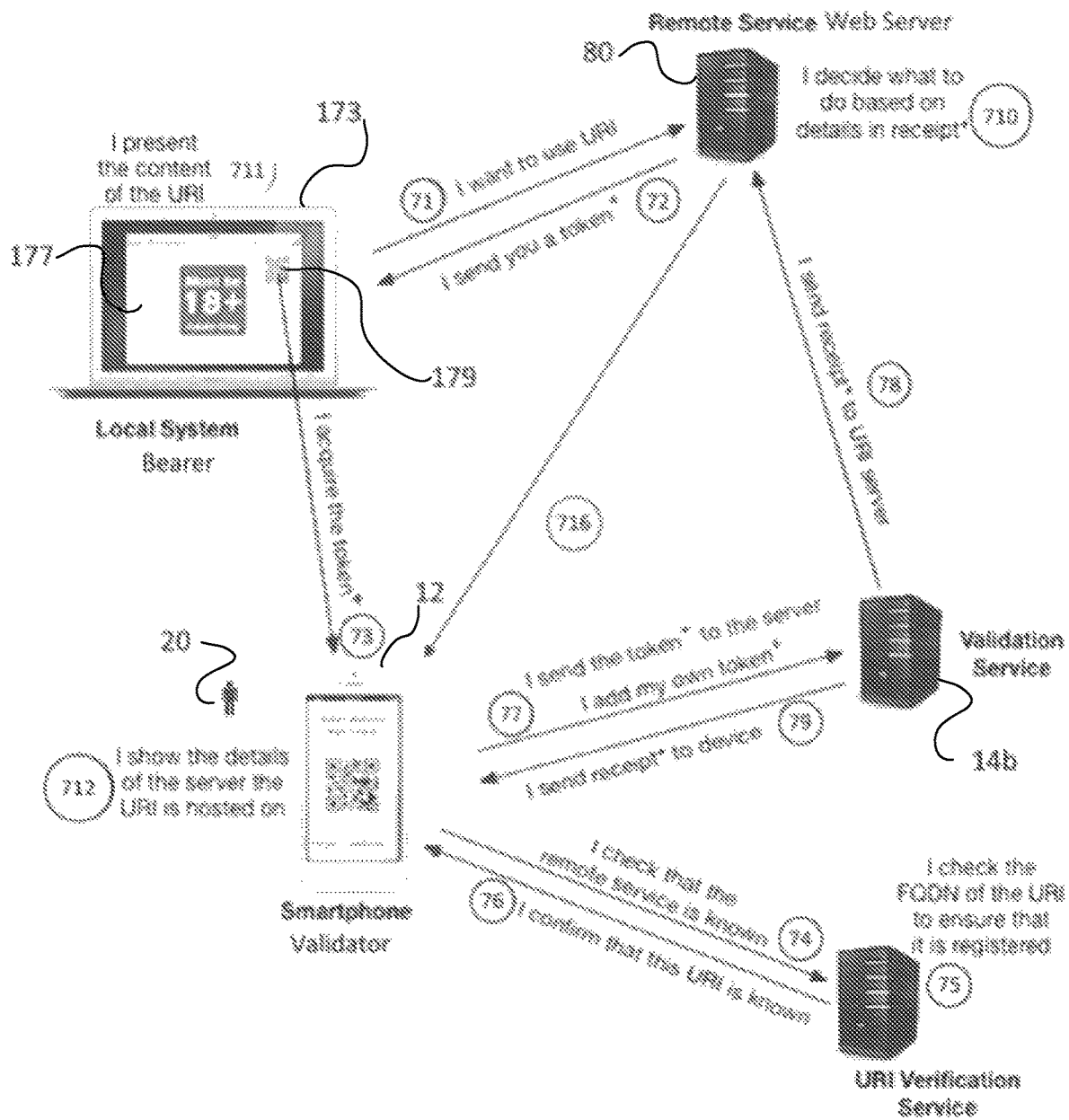
FIG. 19 is a schematic flow diagram showing an authentication process for a web service.
Figure 20:
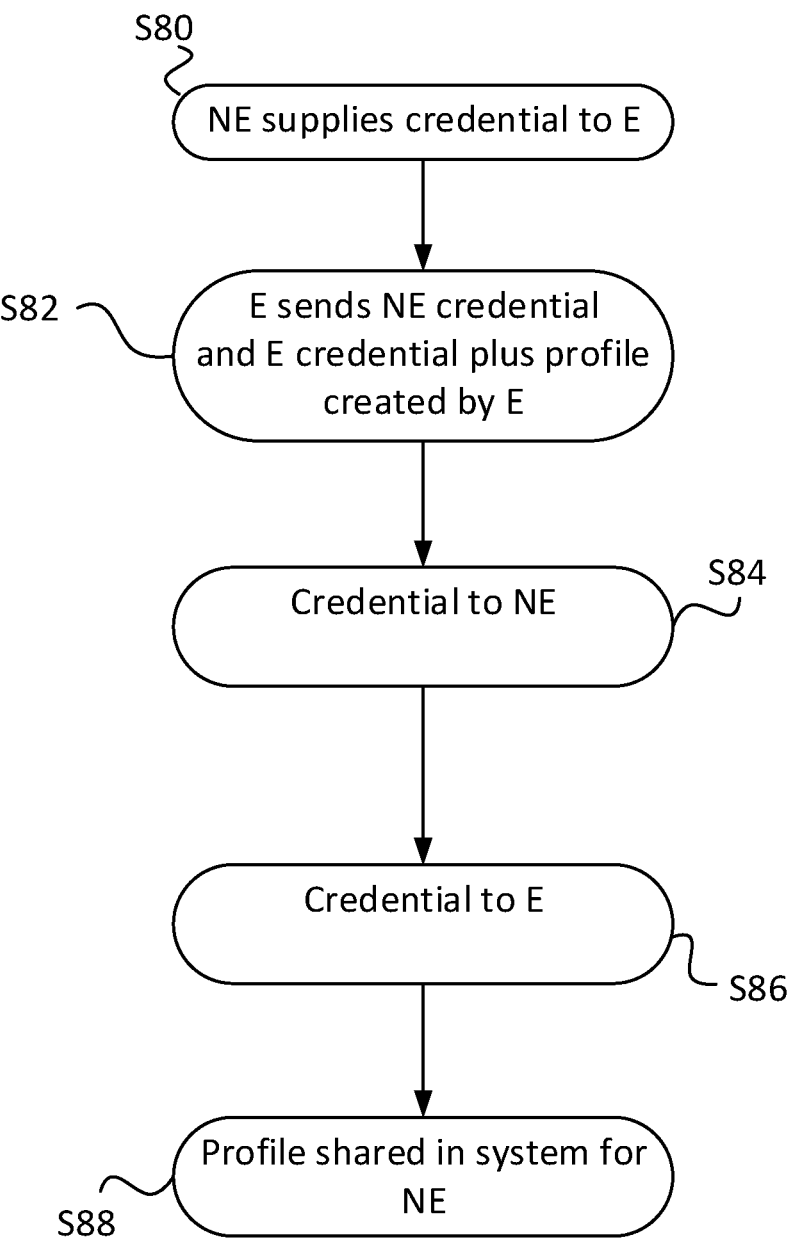
FIGS. 20 (flow chart) and 21 (signalling diagram) describe a situation where a person registered with a digital identity system wishes to have a profile assigned to them by a third party.
Figure 22:
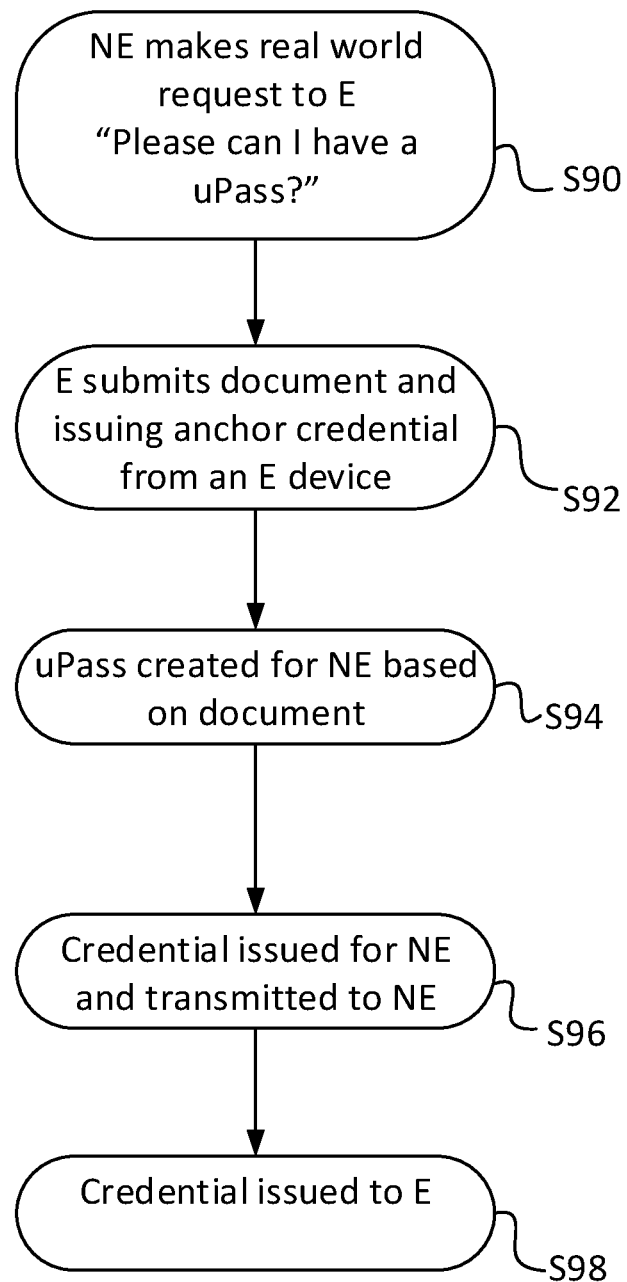
FIGS. 22 (flow chart) and 23 (signalling diagram) show a case where a person not registered with a digital identity system wishes to have a profile assigned to them by a third party.
Figure 23:
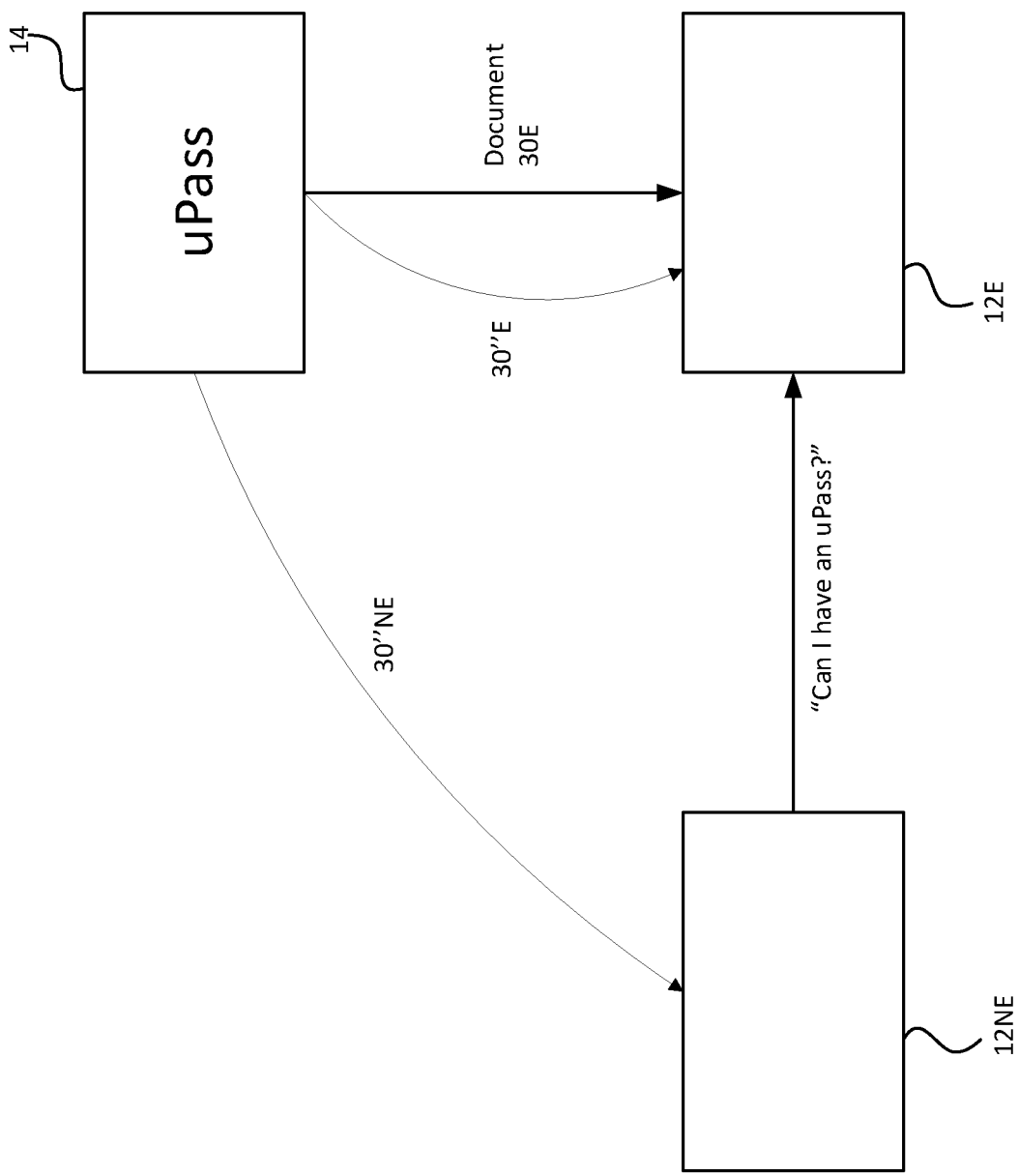
Figure 24:
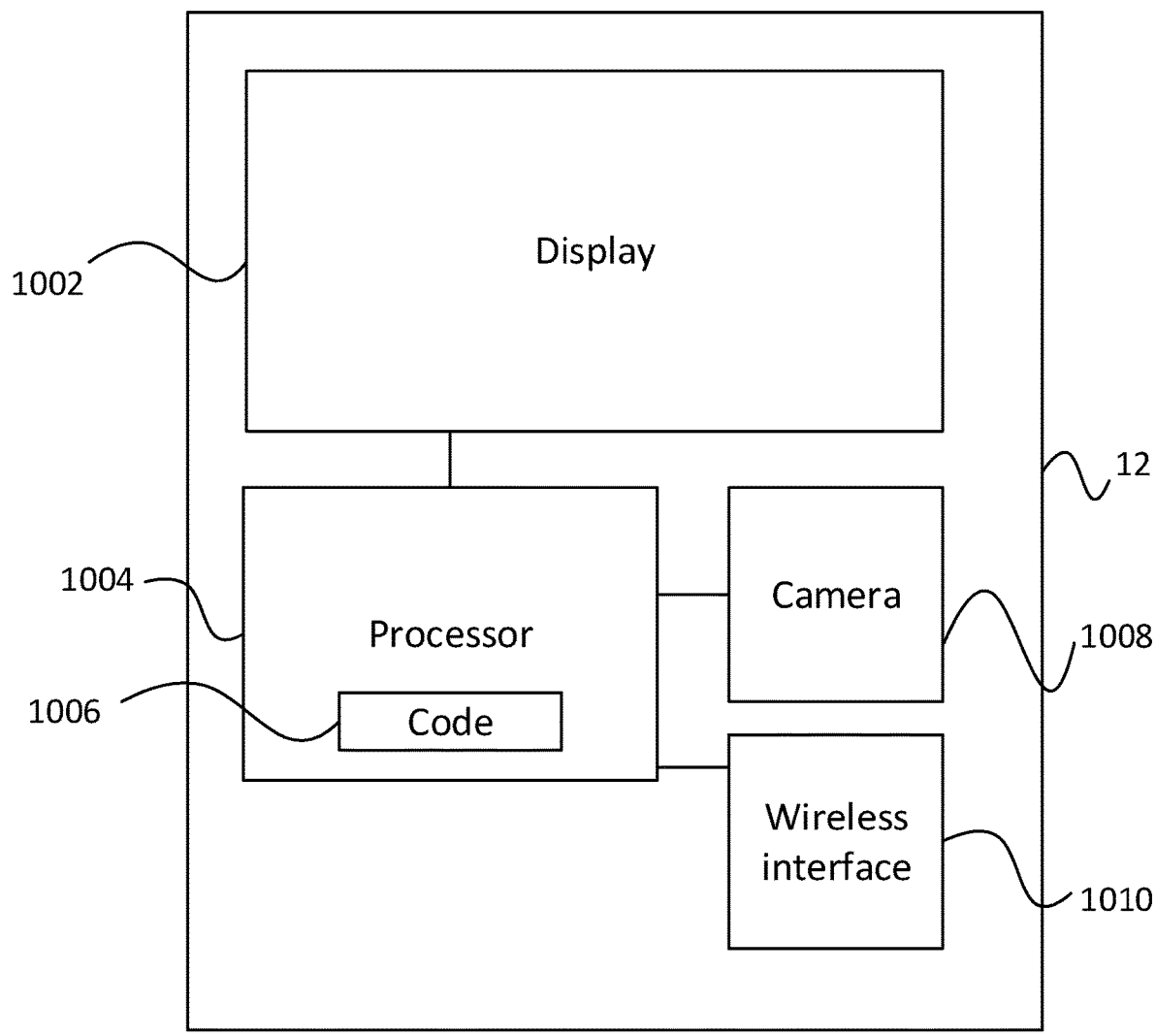
FIG. 24 shows a block diagram of a user device.
Figure 26:
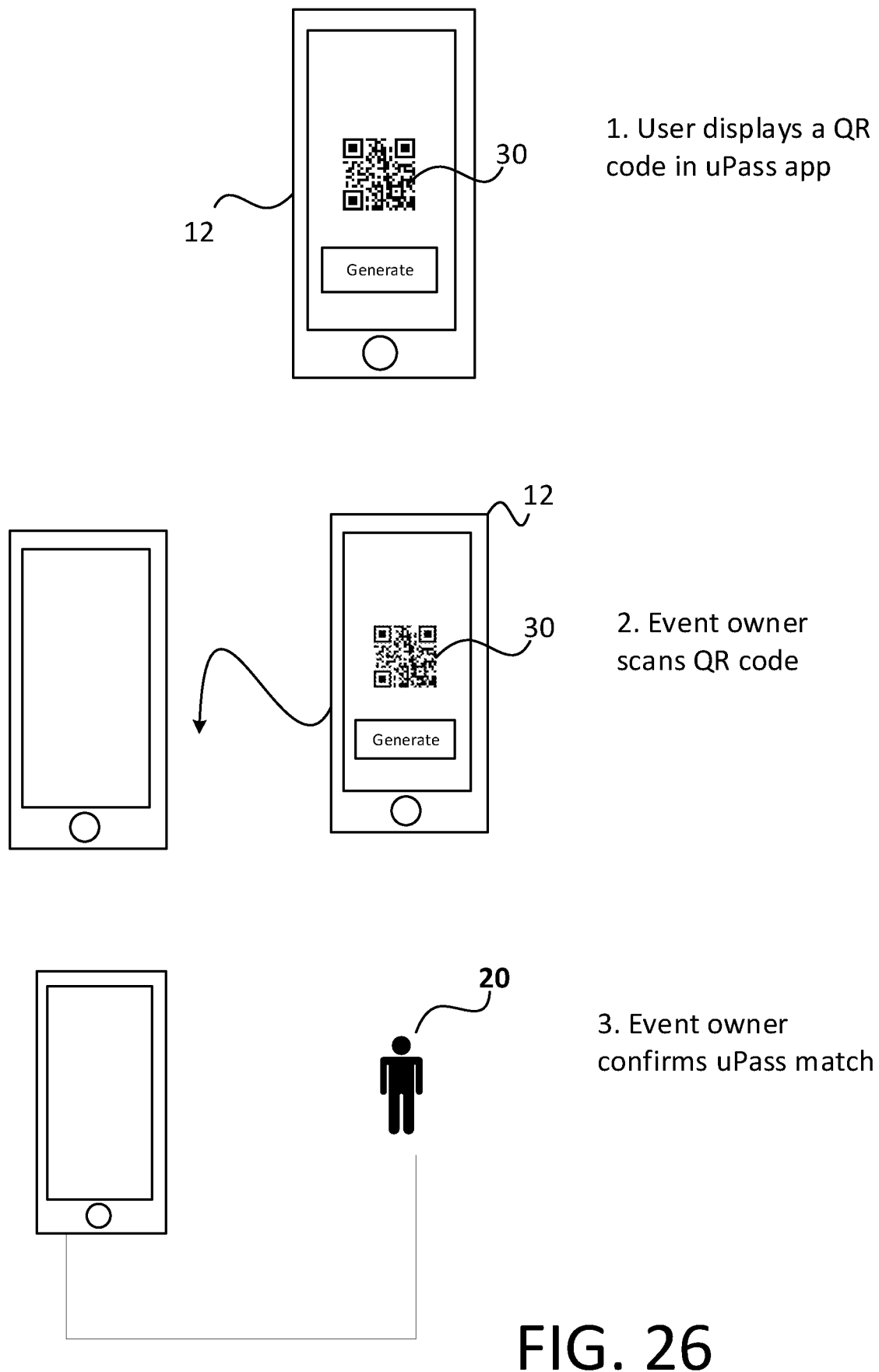
Figure 27:
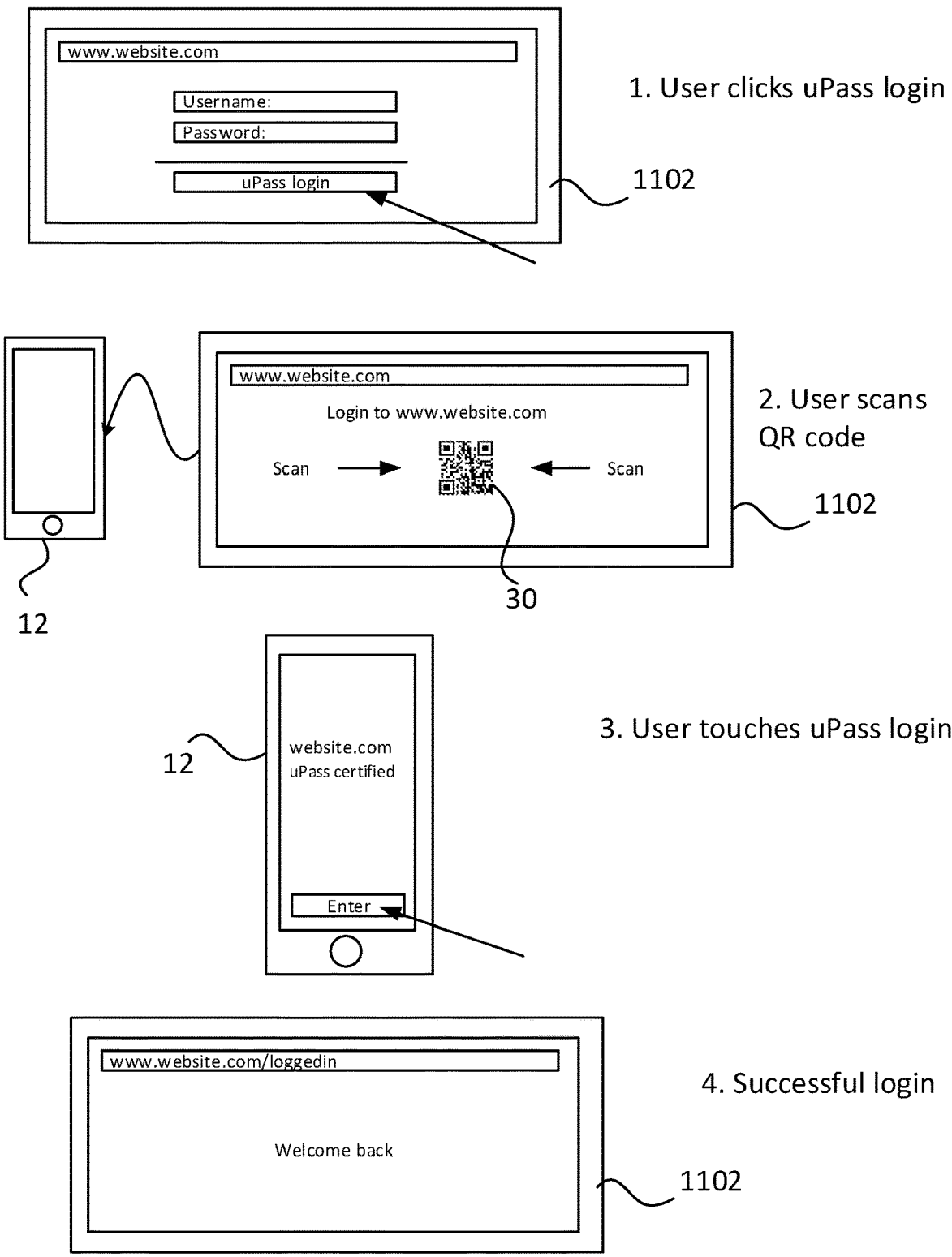

For a better understanding of the Original uPass system and to show how the same may be carried into effect, reference will now be made by way of example to the accompanying drawings in which:

FIG. 5 is a schematic diagram of the core elements of a digital identity system;

FIG. 6 is schematic block diagram of the principal components of a digital identity system;

FIG. 7 is an expanded schematic diagram of functional components of a digital identity system;

FIG. 8 is a schematic block diagram of data items stored as part of a digital identity system;

FIG. 9 is a block diagram of a database structure for a digital identity system;

FIG. 10 shows a master receipt book of a digital identity system;

FIG. 11 is a schematic flow diagram illustrating the creation of credentials in a digital identity system;

FIG. 12 is a flow diagram showing the flow conducted at a smartphone and registration service of the creation of credentials in a digital identity system;

FIG. 13 illustrates standardised passport information;

FIG. 14 is a schematic flow diagram showing an authentication process;

FIG. 15 is a flow diagram for an authentication process;

FIG. 16 shows details of receipts generated during an authentication process;

FIG. 17 shows details of a master receipt generated during an authentication process;

FIG. 18 schematically illustrates certain relationships between various receipts and master receipts that arise due to their content;

FIG. 19 is a schematic flow diagram showing an authentication process for a web service;

FIGS. 20 (flow chart) and 21 (signalling diagram) describe a situation where a person registered with a digital identity system wishes to have a profile assigned to them by a third party;

FIGS. 22 (flow chart) and 23 (signalling diagram) show a case where a person not registered with a digital identity system wishes to have a profile assigned to them by a third party;

FIG. 24 shows a block diagram of a user device;

FIG. 25 exemplifies how a digital identity may be created;

FIGS. 26 to 32 exemplify use cases of a digital profile.

Description of the Original uPass System

The following description discloses an identity registration and authentication system referred to as an uPass system.

As a basic premise, a user of the uPass system is able to upload and register copies of their identity documents and in return they receive an anchored digital ID which can be used to verify their identity to third parties without needing to present these identity documents. They are also able to specify the nature and quantity of personal information which will be made available when doing this.

Use cases for when an identity is to be registered or verified are assumed to be strongly associated with the use of mobile devices such as smartphones and tablets although the invention is not restricted to these devices. Further, registration is described which is based on identity documents which are designed to be scanned electronically, either with OCR-friendly text or with NFC-compatible embedded chips, by way of non-limiting example. It will be evident from the following that any kind of data items pertaining to identity may be utilised, and entered into the system in any appropriate manner.

FIG. 6 is a schematic block diagram of the principle components of a digital identity system.

A central service (uPass) 14 stores credentials securely and manages validations.

The central service can be implemented in any suitable way and requires at least one processor 114 executing identity management code, and electronic storage components providing secure storage. There can be multiple processors in a distributed micro processing network, or a central processing unit at a single or multiple servers. The electronic storage components can take any form and may be local or remote memory. As will be evident, the electronic storage provides both secure storage and random access writable storage 35.

A first mobile application 22 is provided for hosting on a mobile device 12. The first mobile application is for scanning data items from an identity document and transmitting them to the central service 14.

A second mobile application 50 is also provided for execution by a mobile device 12, the second mobile application for requesting a validation of credentials against the storage service 14. It will be appreciated that not all mobile devices necessarily have both applications 22 and 50. For example, some mobile devices may be equipped only to scan data items and transmit them to the central service 14 whereas other devices may be capable only of performing validation of credentials. It is likely however, that most mobile devices associated with uPass users will have both applications uploaded. The mobile applications (Apps) may be downloaded from a UPass server.

A secure architecture is provided for communication between components of the system. This ensures that privacy is maintained, in particular when considering communications between mobile devices 12 associated with uPass users and the central service 14.

A confidence framework 69 is provided for assessing the degree of confidence which can be placed in a identity profile registered at the central service 14. An automated mechanism 67 is provided for performing timely trust arbitration between users via proffered credentials (for example QR codes). Each component of the system will now be described in more detail in the following.

FIG. 5 shows basic elements of an identity system in highly schematic form. There are two basic workflows, one relating to registration of user identity documents and the other to verification of identity (authentication).

An electronic passport 10 or other identity document (e.g. driving licence) is read by a mobile device 12 (e.g. via NFC) and registration data is passed to the uPass service 14 in a secure manner via the Internet, as described later. The uPass service stores the registration of data in one or more profiles forming part of a digital identity 28.

There are three elements in a mobile device which can be used for storage; an SD card 12a or similar removable store; the SIM-card 12b and, in some devices, an internal secure storage space 12c. Such a storage element can be used to store a credential 30 (e.g. a QR code) generated by the uPass system from a digital profile and returned to the mobile device 12.

The uPass service 14 is provided by a computer system with separate endpoints (14a, 14b) for registration and verification. Partitioning of the workflow in this manner gives confidence that a fault in the registration endpoint will not necessarily compromise the verification endpoint and vice versa. End points may be physically separate computers which can communicate via a network, or virtually separate domains at the same physical location.

FIG. 22 shows a block diagram of a user device 12 (e.g. a smart device such as a smartphone or tablet). The user device comprises a processor 1104 executing digital identity software 1006, e.g. in the form of an application or "app" (uPass app/verification application), and to which is connected a camera 1108, a wireless (e.g. NFC, Bluetooth) interface 1010 and a display 1002 for outputting visual information to a user of the device 12.

Qualification for a Restricted Activity

One of the most common uses of photo ID is to confirm that a person meets the minimum legal age for a particular activity they wish to perform, such as entering a nightclub or purchasing alcohol. The uPass system is particularly well-suited to such a purpose as a client verification application 50 (see FIG. 6) executing on a smartphone or tablet can be tailored both to answer the underlying query "is this person old enough" and to provide a photo confirmation that the person presenting credentials is in fact the person these credentials belong to. In the following description, the focus is on the precision of a photo.

A number of use cases are discussed later. One example use case is of a music festival which chooses to offer ticket-less entry via uPass. In this scenario an attendee (bearer) offers their credential (the credential 30 they received from the registration process) on their mobile device and the venue operator (validator) checks this against the verification endpoint of the uPass service 14 to confirm that entry may be granted.

There are several ways in which the credential could be presented: a binary blob transferred by NFC; a barcode for scanning; an email address; or, some form of QR code.

uPass Connect

Another use case of interest is that of authenticating login to a remote system via a local device which may lack an uPass application, removing the necessity to remember user names or passwords so long as an uPass device (such as mobile device 12) is available. In this scenario a validating device associated with an uPass scans a QR code displayed on the login form transmitted from the remote system to the local device and uses this to establish a user system. This technique can be used to establish that the owner of the uPass device is permitted to log-in, but can also allow that owner to be confident that any content they receive from the remote system carries from a valid source.

FIG. 7 is a schematic block diagram of the architecture of an uPass system as functional blocks, illustrating the workflows in the system.

A registrant 20 uses an app 22 on their smartphone or tablet 12 to capture details from their passport 10 (e.g. via NFC and/or camera) and combines this with a photo 18 of themselves (a "selfie") captured with the same device to produce an electronic registration message 23. This is despatched securely to the registration endpoint 14a of the uPass system 14 which performs necessary processing (facial recognition/OCR) to extract relevant data and create an account for the registrant, as described later. Upon successful completion a confirmation message is returned to their device along with an authentication token (credential) creating a link to the new "published" uPass identity profile.

Contingent Trust

A feature of the uPass system is that a photo is provided as part of the "published" profile linked to the credential. However, the display of a photograph when a uPass credential is presented in a verification process only confirms that the registered user's claimed identity matches that of the person who registered the uPass in the first place, not that the registered identity is itself a valid and trustworthy record of the registrant's identity.

To address this an embodiment of the invention introduces the concept of contingent trust, whereby a user's identity profile has an associated profile confidence value "CV1" n for 2, 3, 4 based upon the quality and source of identity documents associated with it, and its historic usage. The way this works in practice is that the multiple sources of identity data are allowed, and for each a level of trust is assigned. Responses can then be qualified where legally required.

For the purpose of explaining contingent trust, in the following, it is assumed that the identity document to be ingested is an electronic passport with the option of either an NFC interaction, an OCR-quality scan or both. In practice, the digital identity rests on primary information data items such as name, age, nationality and photograph to minimise compatibility issues.

The hierarchy of contingent trust identifies five natural levels of confidence based on the manner in which the registration data enters the system:

presented in person to a trusted agent who confirms that it matches the presenting party;
a trusted mobile application with additional safeguards;
a trusted website;
submitted via registered post;
no registration documents The first case sets a maximum confidence level for contingent trust. The exact value assigned can be determined by statistical analysis of the risks involved, but as a rule of thumb should be no higher than 95 percent (no data should ever be considered incontrovertible). The exact number can vary depending upon the trusted agent concerned.

An uPass can become trustworthy as a result of manual verification in this manner. So "trust" is just a fixed value based on initial registration but can vary as a set of propositions regarding the registration process for each of the multiple anchoring documents.

Additional checks can be applied to improve the standing (confidence value) of an uPass such as:

endorsements by existing uPass users;
NFC data reads in a trusted environment;

random solicitation of document presentation to a trusted agent;

random direct contact via video call to confirm uPass registrant still has registration documents Confidence of the face verification changes with time. When users sign up they do so with their face and a passport. At this point in time there may be a very low confidence that they are who they say they are (though this depends on any anchoring document(s) they provide). Thereafter, image data is captured with every face login. Every time another selfie is captured it is added to an image database. These selfies are combined into a single Face Identification Record. The key here is to that they are captured over time in a variety of different lighting conditions (because they are captured on a phone or other smart device)—and when combined provide more accurate results. In embodiments, the current facial record (which could be made up of a number of the most recent selfies, e.g. a small number such as 5) with the original passport photo captured at sign up. Note that instead of full facial images data, image data may be extracted, such as a local binary pattern (LBP) or facial template.

Where a trusted anchoring document such as a passport is used at sign up, the confidence value is reasonably high but can still grow over time in this manner.

Confidence of the whole system also grows over time, due to other factors such as peer to peer verification. An important feature of the present system lies in the following combination of trust anchors:

a) phone;
b) selfie;
d) peer to peer validation.

A given confidence value is represented as a fixed point variable, to which a (variable) value between e.g. 0 and 1 (0% and 100%) is assigned.

User Profiles and Privacy

A registrant is providing personal identifying data items to allow an uPass credential to assert their identity at a later date. By its very nature this identifying data is confidential and the uPass system provides means by which it can be handled with the level of privacy which an uPass user will consider appropriate to the circumstances in which it is being used. To facilitate this an individual uPass (digital identity) has a number of profiles associated with it.

Reference will now be made to FIG. 8 to explain the nature of an "uPass" or in other words a digital identity which is created for a user and which can be verified. FIG. 8 shows diagrammatically the components which make up an uPass for a person 20. These components are stored in electronic storage of a suitable kind in the uPass system. For example, each user 20 can be associated with a database or part of a database attached to a unique identifier 26 which identifies components of the uPass for that person. For example, the electronic storage can take the form of a secure store as denoted by reference numeral 24 in FIG. 8. Thus, each person 20 is associated with a unique identifier 26 which is associated with all components of the uPass for the user 20. The digital identity comprises a set of digital profiles 28a, 28b, 28c, 28d. Each profile comprises one or more key value pair, where the key identifies the nature of a data item which is stored in the profile, and the value identifies the data item itself. For example, the key may be "photo", and the value would be a photograph of the user. In fact, the value may be an address where a photograph is stored as a separate component of the uPass (see 18, 18'). Although shown schematically as individual blocks, the profiles can be constructed from linked lists of key/value pairs and confidence values, with each item in a list pointing to its ancestor. Each time a profile is "published" (described later), a new "head" of the list is created, incorporating modifications arising from use of the profile.

Another component of the uPass are the one or more anchoring documents which have been utilised to provide data items for the profiles. An example of an anchoring document is the passport 10. Multiple different anchoring documents may be stored.

As mentioned above, on successful registration, a confirmation message 25 is despatched from the registration service to the app on the smartphone including a credential. Each time a data item is added to a profile, or an uPass profile is utilised, a new credential is created for that profile and transmitted to the owner of the profile. These credentials are stored in association with the identifier 26 in the uPass for the person 20, and are bound to a profile. A new credential is one modification arising from "publishing" a profile . . . . As the credentials are used for "unlocking" the profiles, they are shown as keys 30. In practice, each credential is a unique random digital string which keys into a database, described later with reference to FIG. 9.

Each user 20 is associated with one or more smart devices (such as a smartphone or a tablet), shown as 12 and 12a. Metadata about these devices is stored as part of the uPass for the user. Each time a transaction is conducted using an uPass, a pair of receipts is issued. This will be described in more detail later, but suffice it to say that an audit trail of receipts is stored in a local receipt book 31e as part of a user's uPass. These receipts are illustrated diagrammatically by reference numeral 32e. Each enrolled device 12a, 12b has its own local receipt book on the device or on a remote server accessible to the device.

A global master receipt book 32 (FIG. 10) holds master receipts 31, which relate to (individual) receipts 32e in the manner described below. Individual receipts issued to an entity which is a bearer or validator are labelled 32v and 32e herein respectively.

As part of the authentication procedure which will be described later, when a valid credential is presented to the uPass system 14, a profile will be published according to the nature of the credential which is presented. These published profiles are shown under reference numeral 34, and are illustrated diagrammatically with keyholes which represent that a key corresponding to a credential can be utilised to unlock these profiles for publication. A profile is published by being made accessible in an addressable storage location in a memory 35 (e.g. a cache) having an address bound to the credential.

A generated credential can be stored at the uPass system, which is appropriate if it is entirely random. The stored credential is compared against a presented credential, and the profile to which the credential is bound unlocked only if the stored credential matched the presented credential. However, when the credential is generated using certain "ingredients" (such as a random sequence, random number and device metadata, such as a device identifier), it is generally more efficient to store the ingredients instead as these generally have a lower bit-size than the credential itself. The ingredients can be used to generate a copy of the credential for such comparison. For example, the credential can be generated by hashing a random seed and device metadata (e.g. which is or comprises a device identifier) a random number of times—the uPass system can store the metadata, seed and random number to create another copy later.

At the time of registration three (or four) default profiles are created:

an anonymous profile 28*a* which asserts uniqueness of identity and presents a photo for visual inspection;

a photo ID profile 28*b* which also presents the name as listed on the registration document;

a majority profile 28*c* which adds date of birth to the photo ID;

(and an optional fourth) a nationality profile 28*d* which add nationality to the photo ID Additional profiles can be created for the user which allow them to have additional personal information added or present their personal information in different ways.

These profiles can be attached to them by any other user as a result of a valid uPass transaction. A profile solicitation application is used to allow for an uPass user to get another user to publish a profile on their behalf. No one can create a profile on their own behalf. Note in this respect that the uPass system comprises a controller 116 which acts as a third party to issue uPasses based on anchoring documents.

When new personal information is entered into a profile without the support of a registration document that profile is given the lowest level of contingent trust. For example, a third party could be an employer who enters data items into a profile solicitation application for an employee. A credential is created for the employee based on information provided by the employer, the credential is bound to the profile, and provided to the employee. To improve upon the level of contingent trust, the system allows for the uPass user to have the profile validated by other uPass users, creating a web of confidence which can be inspected. This occurs each time the owner of an uPass uses his credential in a validation procedure. The web of confidence for each profile is a social graph in which each node represents a confidence anchor. These are discussed later. The level of contingent trust placed in the document will be a function of the number and quality of validations the profile receives.

Figure 21:
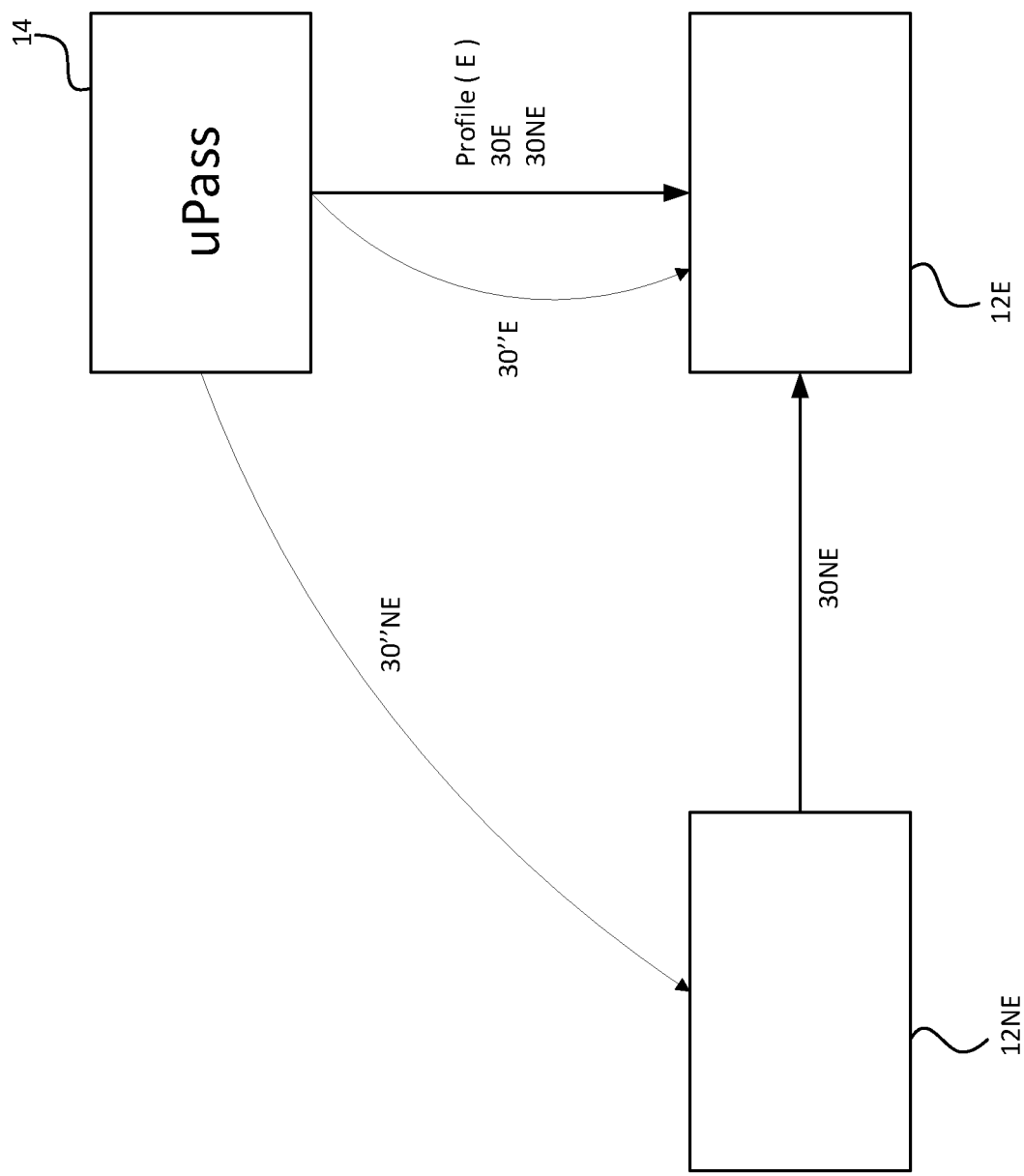

Reference is made to FIGS. 20 and 21 to describe a situation where a person wishes to have a profile assigned to them by a third party. In the particular example which is given, the person is a new employee, and the third party is his employer. The new employee wishes to have a profile assigned to him by the employer. There are many other situations however where a person may wish to have a profile assigned by a third party. In the circumstance of FIGS. 20 and 21, it is assumed that both the new employee NE and the employer E are already registered in the uPass system and have active credentials. In Step S80, the new employee supplies his credential 30 NE to the employer. In FIG. 22, the new employee device is labelled 12NE, and the employer device is labelled 12E. In Step S82, the employer sends the new employee credential 30NE and his own credential 30E to the uPass registration service 14. In addition, the employer sends in that message a profile which he has created for the new employee. The uPass service checks that the new employee and employer credentials are valid, and if so, creates a profile for the new employee based on the information provided by the employer, and finds a new credential 30"NE to that profile. That new credential is then sent (Step S84) to the new employee device. The uPass service 14 also sends a replacement credential 30"E to the employer device, because the employer has now used up his one-time only valid credential when he sought to assign a profile for the new employee.

The profile is then stored in the uPass system (Step S88). It will be appreciated that although shown in sequence, Step S84, S86 and S88 can be carried out in any order or in parallel.

FIGS. 9*a* and 9*b* show the case where the new employee is not already registered with the uPass system. In this case, in Step S90 the new employee makes a "real world" request to the employer "Can I have an uPass?" This could be done in person, by email or text, or in any way. The employer submits to the uPass registration service 14 a document which is going to be used to anchor a profile for new employee. In addition, the employee sends his credential 30E. In this case, it may be necessary to determine the authorisations attached to that credential, and to confirm that the employer has a credential which allows him to create uPasses for a third party. Note that this is one level higher in authorisations and assigning a profile to someone who already has an uPass. The assignation of a profile does not imply any particular validity to the uPass itself. However, creation of an uPass does imply a certain validity, although of course the confidence level which is attached to the uPass can be varied depending on the issuing anchor (in this case the employer). In Step S92 the employer submits the document and his credential to the uPass registration service 14. The uPass service creates an uPass profile for the new employee, using the document as the issuing document and with a confidence level associated with the issuing anchor. A credential is bound to each profile associated with this uPass, and the credential associated with the anonymous profile is sent to the new employee as shown in Step S96. If the new employee device has not been enrolled and is not known to the uPass, some appropriate arrangements are made to supply the credential 30" to the new employee device. In Step S98 a replacement credential is issued to the employer.

FIG. 7 illustrates an account service 29 which provides a means of managing an uPass, including enrolment of devices and specification of user authorisation profiles.

Authorisation Profiles

As outlined earlier, an uPass profile consists of personal data and a photograph which can be used together as a cohesive identity. Each uPass credential is anchored to a profile and an uPass user can have more than one credential active at any time. However, only one credential can be active at any specific time on any given device.

Each profile available for use with an uPass account must be assigned to it by a third-party Document Issuing Authority, of which the uPass system controller itself is an example. When an uPass account is created it has at least three profiles assigned to it by the uPass system:

1. an anonymous profile 28*a* which can be used to assert identity but reveals no information;
2. a majority (age check) profile 28*b* which reveals the uPass user's date of birth;
3. a name profile 28*c* which reveals the uPass user's name as presented on their registration documents.

Whenever credentials are transmitted to a device they are always bound to a specific profile in the database in FIG. 9 and the anonymous profile is the default profile for interactions unless otherwise specified by the uPass user.

To change profile credentials the uPass user must perform an enhanced authentication with their current credential against the uPass enrolment service to acquire a list of currently available profiles for their account. This does not need to be done for every change of profile as the information might be cached locally in an uPass application, so that the list only needs to be regenerated when new profiles are attached to the uPass account or the old profiles are removed.

Once a list of profiles is available then changing between these profiles can be performed using a standard authentication with an existing credential, which is replaced with a new credential bound to the desired profile.

All changes of profile result in security logging in the uPass system.

Profile Structure

As shown in FIG. 8, a profile consists of a set of key value pairs. Either can be considered an arbitrary binary field. A set can be one or more key value pair.

Recognisable Anonymity

The base on which all other profiles are constructed is the Anonymous Profile 28a which confirms that its bearer is an uPass user and provides as its data item a current photograph. When the profile is published to a third party, it allows the third party to confirm by visual inspection that the bearer of the uPass is indeed the person for whom it is valid. A profile is published in the validation procedure described later.

The idea of querying an anonymous credential to ascertain identity may seem strange, however in an embodiment of the invention the uPass system accompanies the assertion with a receipt allowing the validating party to indirectly and anonymously reference the uPass which has just been validated.

Assigned Profiles

The power of an uPass lies in the ability of its owner to present different views of their identity or rights in different circumstances. To avoid abuse, several restrictions can be imposed:

1. profiles for any uPass account can only ever be created by third parties, noting that the uPass controller 116 is a third party in this respect;
2. when a profile is being created it must be created for a specific uPass account;
3. the assigned profile is bound to a specific profile in the creator's account (in this way, a creator's profile becomes a confidence anchor 110);
4. and is assigned a characteristic tag by the creator;
5. once created the profile cannot be edited;
6. however it can be deleted or replaced by its creator;
7. and when used the creator of the profile is always announced to the validator;
8. which allows the chain of trust right back to the uPass system to be interrogated.

The characteristic tag can be used to distinguish profiles from one another. For example, each tag could call a visual indicator to be displayed on the mobile device.

Profiles and Privacy

Once a profile has been assigned to an uPass account the owner of that uPass account must actively choose to use the profile in a validation for it to be available to another user. That is, the credential created from that profile must cause a link to that profile to be sent to a validator. A user can have more than one profile, hence more than one credential, stored in the same or different devices, i.e. there is only one credential per device per person. [where there is more than one profile, a user can distinguish between them by the visual indicators of the characteristic tags.]

The creator of the profile may explicitly require the use of that profile when performing a validation, in which case if any other profile is used the validation will fail. This ensures that for as long as the assigned profile exists, the uPass user can only validate their identity with that profile and that use of any other profile will be rejected. This is described later in connection with uPass Connect.

There is no way for a third party to enumerate all the profiles associated with an uPass account.

Profile Storage

Profile information lives in two places. The underlying data is versioned and retained in the secure store 24 whilst the current state of profile data is published in a secure key-value cache 35. This is an important underlying security premise of the Upass system—third parties are not given any access information to the secure store 24 itself.

Profile Publication

A profile contained in the secure store 24 is published (at a location in memory 35) whenever a credential is bound to it. The published profile has certain properties:
 expiry time (and/or publication time stamp);
 Photograph or a link to a photograph;
 Encrypted profile content (key/value pairs etc.);
 Random symmetric key;
 A URI resolving to the encrypted profile content;
 A URI resolving to the creator of the profile Every time publication occurs the profile content is encrypted with a different randomly generated symmetric key 60, and then stored at a location in memory 35 accessible via a generated URI 62.

Vouchsafing

Each uPass account is capable of attaching profiles to other uPass accounts, allowing people to annotate each other with nicknames and other social information as well as vouching for the reliability of that information. As such each uPass itself is an example of a Document Issuing Authority with low confidence of reliability.

When an uPass user attaches a profile to another uPass user, the attachment is anchored against an existing profile (confidence anchor 110) on their own uPass account.

Aside from attaching a profile to an uPass account, uPass users can vouch for the veracity of a profile attached to another account at the request of either the profile creator or the profile recipient. As the number of uPass users willing to vouch for an assigned profile increases, so too does the confidence which can be placed in the information contained in that profile.

Document Issuing Authorities

Vouchsafing provides a means by which uPass accounts can be annotated with profiles, however, these are potentially low-quality sources of gossip rather than anchored identity statement. An authorised Document Issuing Authority is a recognised source of high-quality identity information anchored to real-world documents.

Once an uPass user becomes a Document Issuing Authority they are allowed to solicit information from an uPass user and use this to annotate uPass accounts at a higher level of confidence than that afforded by the standard vouchsafe mechanism.

Lifecycle

Whilst uPass credentials are anchored by a passport 10 they can be caused to expire when the passport expires. This requires that uPass users be advised to update their registered documents as soon as their new passport is issued to ensure continuity of service.

An eight week notice period can be provided when the registered passport is due to expire to allow for the variable turnaround time.

When support is implemented for other identity documents the situation will become more complex. Each document will contribute to the contingent trust of the uPass and whilst this is above a certain level the uPass will remain active with regular warnings to the user regarding pending and actual document expiry.

Use

The initial scenario for uPass usage revolves around face-to-face encounters where a passport or equivalent document would be used to support identity.

Whenever an uPass bearer wishes to authenticate their identity they must present a credential (e.g. a QR code) generated from a unique random identifier provided by the uPass system. The recipient of this credential is an uPass Validator who authenticates themselves to the uPass validation service each time they validate the information received from a Bearer. Following validation the Validator decides how to proceed.

Deletion uPass users may wish to delete particular profiles or their entire uPass identity and this is supported by the enrolment service. This involves the deletion of all personal data and device identifiers and the expiring of all issued keys.

There may be a legal requirement to maintain the auditing metadata associated with an uPass identity for a specified period of time, so deletion may involve a deferred component.

Suspension

When an uPass user sees misuse they can report the offending user and a suspension of the account will be imposed whilst the matter is investigated. The uPass system can provide a 7-14 day uPass suspension. When suspended, an uPass should return that the uPass identity has been suspended.

Suspension cannot occur without audited intervention and an investigation into the reasons for the suspension may be performed. Mechanisms and procedures for this are outside the scope of this document but should clearly be proportional and designed to minimise or prevent malicious suspension.

Revocation

When there is the suspicion of serious misuse, an uPass may be revoked. Revocation is similar to deletion but there may be a need to record additional information about the user to prevent them from re-joining uPass within a set period of time.

Expiry

At certain infrequent time periods (governed by expiration time 68) an uPass User may be asked to create a new uPass.

If all of the anchoring identity documents for an uPass user expire, this should automatically trigger a request to issue a new uPass.

Multiple uPasses

Users may have more than one uPass account at a given time however the implementation of multiple profiles within an uPass should reduce the extent to which this occurs. For example a married woman who wishes to use an uPass in both her maiden name and married names could do this with multiple profiles on a single uPass rather than needing multiple uPasses.

Device Enrolment

Each account may have one or more devices 12a, 12b associated with it at any given time. To enroll new devices into an uPass account, an audited validation transaction must be performed between this device and a device which is already enrolled for the uPass user's account.
1. Take a selfie;
2. Standard credential swap between the two devices (this means the validation app 52 on one device scans in the credential 30 offered by the other device, and vice versa);
3. When a new device goes online, server asks if the credential is valid;
4. If the credential is valid then the new device is enrolled.

Device Re-Enrolment

If the uPass account has at least one other associated device with a valid credential then re-enrolment follows the process outlined above for device enrolment.

uPass Account Recovery

If the uPass user still has possession of a device which has been enrolled then account recovery is performed the same way as device re-enrolment with invalidated credentials. Otherwise, the uPass user can re-register using any registration document associated with the account.

Device Revocation

An uPass user may revoke authorisation for any device currently enrolled for their account. This will invalidate any credential they currently have associated with the revoked device.

Device revocation does not necessarily result in uPass suspension.

Two Factor Registration

As mentioned earlier, each digital identity has data items derived from identity documents in a registration process. When obtaining data items from registration documents, one might assume that transmitting both the NFC (near field communication) and OCR (optical character reader)-quality data would be sufficient to confirm that the passport data is valid, however the acquisition of both sources of information via the same device leaves no way to confirm that the data has not been tampered with prior to transmission. To do that a second transmission vector may be utilised preferably involving a trusted agent and/or data acquisition device, and some form of standardised registrant signature which can be audited.

In one embodiment of the registration process, the registrant submits a photograph of the registrant taken with the same device used to capture registration data, time-stamped and tagged with metadata comprising device type, operating system, geolocation and network address. The same metadata will be captured for each item of registration data captured using the device.

This photograph and the associated metadata provides an audit trail which can be used to help identify fraudulent registrations. A percentage of registrations are manually checked at the time of submission to ensure a visual match between the photograph and the photographic element of the registered identity document (e.g. passport photo).

Preferably, a facial verification service 40 compares these photographs in all cases and where there is a low level of confidence that the photos depict the same person this will also be flagged up for manual visual inspection. Rather than a single static photograph, frames taken from brief video clips can be used to capture a sense of liveness. In some embodiments, only a single frame is taken as it has been found that using multiple frames does not improve the accuracy of the face verification software.

Data captured by the device camera is subject to OCR processing 42 when it reaches the registration service 14a at the uPass server, to extract data items from the identity document.

A digital signature is generated on the sum of unencrypted data. Each captured data item is encrypted by encrypt block 44. The digital signature is used to annotate each separate encrypted data item before it is submitted to the registration service. These encrypted data items are decrypted by the registration service and the digital signature checked, ensuring the integrity of the entire registration submission.

In one embodiment, to further strengthen integrity the distinct registration data items are transmitted to separate end points identified by the registration application 22 and encrypted with separate symmetric keys. As with all symmetric keys issued by the system these are one-time pads—keys used only once and therefore known to be unique.

To implement the two-factor authentication system the registrant requires a smartphone 12 with Internet access, which is capable of communicating over HTTPS and includes a camera of reasonable (say 5 MP) quality. NFC capability is a useful optional extra.

The Registration Process

The registration process will be described with reference to FIGS. 11 and 12 based on the use of mobile device 12 such as a smartphone or tablet with a native application. This application will acquire the necessary photos, NFC and metadata for packaging and submission to the registration service. The registration workflow comprises the following steps:

S1/S2. Registrant 20 initiates a registration transaction by activating an icon on the smartphone 12, which creates (S2) an electronic message R1 containing a random symmetric key k1, of at least 256-bit, to be sent over HTTPS to the uPass registration service 14a. The preferred symmetric algorithm is AES-256 operated in GCM mode.

S3/SS4 The registration service 14a sends a response R2 encrypted with the registrant's key:
 1. three unique 256-bit symmetric keys k2, k3, k4;
 2. three distinct round-counts.

A round-count is a positive integer which tells the client how many times to iteratively perform a function seeded with a data value of interest. In this case we use the round-count to specify how many iterations to perform when generating a SHA-2 hash value which is a defense against rainbow table attacks.

This response R2 is packed in a cookie marked with the HTTP only and HSTS flags;

S5. The registrant uses their device 12 to capture data items for a registration request:
 1. device performs optional NFC chip read;
 2. camera captures:
  1. scan of identity document;
  2. photo of registrant (selfie).
S6. Metadata comprising timestamp, IP address and geolocation is recorded;
S7. This is then appended to each data item to be submitted along with the item count;
 a digital signature DS is generated for the registration request using HMAC.
S8. Each data item is encrypted with one of the symmetric keys k2, k3, k4 to create a respective BLOB;
 the distinct signature is appended to each encrypted item;
 the registrant agrees to the uPass Terms and Conditions of Service;
 each encrypted item is despatched to a separate network endpoint EP1, EP2, EP3. [
S9. BLOBS (registration items) are collected in the registration service 14a; geocodes and IP addresses are checked for each data item;
 if all checks pass then the registration data is processed (see FIG. 13 for a digital passport format):
 1. passport scan passed to OCR service to extract MRZ, photograph and signature;
 2. NFC data provides DG1, DG5 and DG7 (MRZ, photo, signature);
 3. extracted photos are compared to the registrant selfie by the facial recognition service 40.
S10. If everything matches then an uPass account may be created with:
 1. an anonymous profile 28a;
 2. a photo ID profile 28b;
 3. a majority (age indicating) profile 28c;
 4. a nationality profile 28d.
 In some cases, only the anonymous profile 28a may suffice
S11. uPass credentials are provided to the registrant application for the anonymous profile (the default profile). A credential is a random digital sequence valid for one time use only—it can be embodied as a QR code 16 for example.

The registration service 14a is supported by an in-memory cache 24 in the secure store which contains a working-set of data elements related to current active registration for transactions, including:
1. for the IP address of each active client registration
 1. device ID;
 2. symmetric key;
 3. registration data [k1]:
  a. registration symmetric keys [k2, k3, k4]
  b. encrypted registration data items received;
  c. decrypted data items.
 4. account creation message;
 5. account credentials For enhanced security, there may be a requirement imposed that the data is transient and must never be stored to disk.

Each service-provided key is generated by the secure store 24 which ensures that all keys issued are unique. Forging registration transactions is impossible as keys provided by the registration server are randomly generated and cannot be predicted, therefore there is no way to use the keys from one transaction to guess the keys being used by another transaction. The guarantee of uniqueness ensures that attempting to reuse a prior set of keys will trigger a security event.

Once all expected data items for registration have been received and decrypted, the decrypted passport scan is sent to OCR service 42 and the returned data is used as the basis for an account creation message. This is checked against any NFC data received to confirm that the two data sources present the same identity, and if this is the case then the embedded photographs are compared with the registrant's confirmation photograph in the facial recognition service 40 to ensure a visual resemblance.

A percentage of incoming registrations can be manually checked at this stage to ensure that the OCR and facial recognition processes are working correctly, though this is not essential.

If the registration data passes these tests then the account creation message is passed to the secure store 24 where its uniqueness is confirmed. A data store is created for the account containing identity statements, each anchored to its source document, and the three or four initial profiles 28a, 28b, 28c, 28d created for this account. Alternatively, identity statements could be achieved to the digital signature of source documents An appropriate credential 30 is then generated for the registrant's device using the default (anonymous) profile. The credential is stored at registrant's device and allowed access to the profile. The secure store 24 now contains profile records which can be accessed using this credential.

After successful registration the device metadata, e.g. a combination of recorded device type and operating system is used to provide download links for appropriate uPass applications from the user's profile page.

To satisfy some use cases where a merchant seeks verification of a user, the merchant themselves must be registered.

The merchant registration process is similar to the standard user registration process, but using different primary documents.

For the UK jurisdiction a merchant might comprise any of:
registered corporate entity;
sole trader;
partnership;
registered charity;
club;
society.

As a merchant registrant is an organisation, not an individual, there is a requirement to make a distinction between who owns the uPass (the merchant) and who is nominated as an administrator (one or more individuals).

A graphical illustration exemplifying the registration process is shown in FIG. 25

Confidence Anchors

An important facet of the uPass system is the self-validating nature between uPass holders. That is, uPass holders may assert their confidence in each other's identity. Each uPass can act as a confidence anchor 110 for the individual profiles of other uPass users.

Internally any data item added to a profile gains a contingent trust which is a function of both the number and quality of validations performed by other uPass users to establish it.

Once entered into a profile these data items can be used in other profiles as well, but where they are, the contingent trust associated with these profiles becomes that of the least trusted data item in the profile. This way there is always a degeneration from the contingent trust represented by source registration documents which can only be offset by a statistically significant number of validations by other uPass users under profiles with a high level of contingent trust.

Third-Party Profiles

Registration documents provide one means by which identity can be asserted with a high level of confidence. However, there are use cases where the identity which an individual might need to present does not derive from such a source but rather from their employment or membership in a particular organisation.

To allow for this an uPass can have profiles assigned to it by third parties and the contingent trust of these profiles is that mandated by the authoring party. None of the data items associated with an assigned profile is added to the set of data items available for use in creating additional profiles or modifying existing profiles, and the assigned profile can only be modified by the authoring party. To assign a profile, a third party must be an uPass user with a valid credential. He presents this credential and provided it is valid, receives a form to enter data about the new uPass profile. This is registered as before and a credential is generated and returned This can be passed to the owner of the new profile.

An assigned profile continues to exist until the authoring party cancels it, or until it passes a pre-assigned expiration date.

Social Graph Privacy

The uPass system contains a number of social graphs which effectively pinpoint an individual in relation to employment, friends, official documentation, transactional relationships and location. Full access to these graphs is private to the uPass system.

A primary exception is when an uPass user performs a validation based upon an assigned profile. In this case details are provided for the authoring party of the profile as an additional safeguard to the transacting party.

One application of the uPass system is to broker trust between two users of the uPass system, one an individual seeking to assert their identity and the other interested in using that assertion to validate eligibility for some service or interaction. This can be seen as a single transaction comprising authentication of the parties' identities.

This trust transaction requires two separate application modes, one on a user's mobile device for asserting their identity (app 50), the other on a merchant's device (app 52) for verifying assertion and then determining if the user is authorised to undertake a particular action.

To assert identity requires the presentation of an on-device credential 30 either in a visual form such as a QR code or barcode, or as a transmittable binary blob for use with NFC or similar technology. The uPass authentication app presents an appropriate credential 30 to an uPass reader 54 in app 52 which then despatches this to the authorisation service 14b for authentication. If this authentication operation is successful, the uPass reader app 52 will receive access to one or more uPass profiles and the user can then confirm his identity based on data items in the profile he can now view, such as a photo.

When a fresh credential is generated, it is bound [to an individual profile associated with the uPass user (see database in FIG. 9). When the credential is used the information in this profile then becomes available to the validating party in the trust transaction.

For added security, the profile contains no linkage to the uPass user. This precaution ensures that gaining access to a specific profile does not provide a means whereby all of the profiles associated with the uPass user can be accessed. Only the information provided in the profile associated with the credential used is exposed to the other party, along with any information which they have published on the validated uPass in the form of a series of assigned profiles.

As an added safeguard issued credentials can be bound to the device's network address 64, so if the device changes network address the credential is also invalidated.

At no point is the asserting party's digital identity identifier 26 exposed. This is essential to the integrity of the system, even for casual use cases. Likewise, no personal information regarding the asserting party is revealed beyond that necessary to broker trust.

Summary of Credential Creation Process

This process is carried out by the identity management code executed by processor 114 (or by any suitable computer mechanism) at registration of a new profile, and at each occasion the profile is used.

1. determine the device identification number of a new device when it is registered;
2. calculate the SHA-2 HMAC of this device identification number;
3. store this device identification number securely;
4. for each credential generated:
    1. create a random salt value (preferably at least 8 bytes in length)
    2. combine this with the stored device identification number to create a unique credential number;
    3. perform SHA-2 hashing iteratively with the stored credential number as the seed value;

4. the number of iterations is chosen randomly within specified bounds;
5. the resulting token is the credential passed to the device.

5. a database entry is created keyed to the generated credential 30 which contains (see FIG. 9);
   1. a random reference key 60 specific to this credential;
   2. a URI 62 capable of providing the profile to which the credential is bound;
   3. the network address 64 of the device for which the credential is valid;
   4. a link 66 to the uPass user for which this credential was generated;
   5. the expiration time 68 of the credential;
   6. other metadata 70 related to the credential lifecycle Credentials are "single use" and "restricted". Each generated credential is specific to both the device and the uPass profile.

Single Use Credentials

A feature of the uPass system is to allow a user to present a smartphone/tablet, etc. to validate their identity. One possibility is to use as an on-device credential its device identification number. However, this has the drawback that once assigned it cannot easily be changed and also reveals information about the device which could be used by an attacker. An improved alternative is to use a key which is generated based upon the serial number using a hashing algorithm such as SHA-2 iteratively. This involves creating a hash for the serial number and then creating a sequence of salted hashes with this value as the starting point.

Only the HMAC of the initial hash value is ever stored, enabling the identity of a device to be described without knowing its precise device identification number and thereby preventing anyone with physical access to the secure store 24 from reversing the process to determine the device identification number and use this information maliciously.

To capture credentials from a device an uPass application either scans a generated QR code containing the credential or receives the credentials via some other means, such as NFC, iBureau, barcode, etc.

Restricted Credentials

Each generated credential is specific to both a device and an uPass profile. This prevents credentials being transferred between devices and means that any given device is only able to present one profile at a time.

Credentials are generated by creating a random salt value and combining this with the device identification number. The result is then used as the initial seed value for an iteratively generated SHA-2 hash value with the number of rounds of iteration being determined at random.

Transaction Receipts

Whenever a validation transaction occurs two receipts 32*e* are generated, one sent to the validating party (i.e. the merchant—VALIDATOR) and one to the validated party (e.g. the uPass user—BEARER). A receipt contains four pieces of information:
   1. the random reference key 60 associated with the specific credential used;
   2. the profile URI 62 to which the credential presented by the other party was linked;
   3. the URI of a list of all profiles currently assigned by the recipient to the other party.
   4. the timestamp The random reference key 60 acts as a transaction identifier which is associated with a specific pair of receipts and thus a specific pair of credentials.

When a receipt is generated the relevant profile is encrypted with the symmetric key and published to a Published Profiles Store 35 at a randomly generated URI. Both receipts generated for a transaction thus use the symmetric key to encrypt their associated profiles.

These transaction receipts provide the basis for applications to interact with an uPass as will be explained subsequently in the discussion of uPass profiles.

Each device contains a receipt book 300 (FIG. 6) which holds an arbitrary number of receipts from prior transactions. When a user wishes to prove that a transaction has occurred they can present the receipt as a QR code, etc. which contains only the random reference key 60 for the credential used. This can then be reconciled by a merchant or other uPass user with their own receipt book.

A copy of the receipt is maintained online in the master receipt book 31 which contains all receipts generated to date.

Authentication

A client device must be pre-registered and authenticate itself to perform an uPass validation for a given profile.

Standard Client Authentication

Each registered device contains a single one-use credential for each uPass user that it is registered to. Submitting the credential performs an implicit authentication, which is deemed to fail if the credential is unknown, expired or invalidated. There is also a small probability that a valid credential will be invalidated (as a randomised additional security check) on receipt to force an authentication failure for security purposes.

An enhanced authentication can be conducted when the standard authentication interaction fails, or where the use case requires it.

Enhanced Client Authentication

Some transactions require a higher level of confidence than the norm. For these a full-face photo is captured and facial recognition is used to identify potentially questionable transactions. Because facial recognition is never 100% accurate standard authentication based on facial recognition failure is not prevented if credentials are otherwise valid but enhanced authentication requests are prevented.

The enhanced client authentication mode also exists to secure administrative operations and to allow an uPass user to re-authenticate after an authentication failure.

The enhanced client authentication captures a photograph of the device user which is compared to the facial recognition database for the uPass user to whom the device is registered, and if the recognition fails then a security event is triggered and logged.

Credential Lifecycle

Credentials have a lifecycle which involves: their creation which binds them to an uPass profile; their distribution to a specific device; and their revocation or expiration.

This lifecycle is managed solely within the validation service.

When a credential is created it is recorded in the secure store and tagged with the following metadata 70 to be used as part of managing its lifecycle:
   the uPass profile for which it is valid
   the time at which the credential was requested
   the time at which the credential was issued;
   the geo- and network-locations of the requesting device at time of issue;
   the expiration time (if any);
   the device details for the validation causing the credential to be issued;
   whether or not the credential has been revoked.

When the credential is subsequently received all of this tagging data can be checked to confirm if the credential is being used correctly. The record is then used to create auditing and security action records elsewhere in the secure store and then invalidated.

A credential may be revoked at any time. When revocation occurs the credential's record is flagged as revoked in the secure store but the record is not processed at that time. This allows the uPass system to monitor the use of revoked credentials and use the resulting metadata to assist in fraud analysis and prevention.

Once a credential is revoked or invalidated it cannot be reinstated as valid.

Garbage collection of expired and revoked credentials may occur in one of two ways:

when a validation query occurs for the credential;
via a background garbage collection task which reaps expired credentials.

Handling Invalidated Credentials

When a credential has expired or been revoked its use (i.e. someone attempting to reuse an invalidated credential for a valid use) may indicate that the device to which it has been bound has been stolen or otherwise compromised. This represents a serious fraud risk.

In these circumstances we cannot issue a new credential to the device until it has been confirmed that it is still in the possession of the uPass user for whom the invalidated credential was originally created.

To confirm this we treat the device as if it is a new device being enrolled for the first time, a use case covered in the section on Enrolment.

Validator Authentication

The uPass validator device is built on the same principles as a standard uPass device. To perform a validation the validator device must present a valid credential for its associated uPass device. This ensures that only users of the uPass system can run queries against the uPass trust network.

The validator credential is sent as part of the request.

Bearer Authentication: Asserting an Identity

By limiting authentication to a single authorisation query rather than an ongoing transactional relationship uPass can be used to create a simple proof of identity system. More complex use cases based on event ticketing such as guest lists or digital festival passes can be built on top of this by allowing the merchant to assign a profile to an uPass user with an appropriate expiration date.

FIG. 14 illustrates a bearer only authentication process.

When a bearer-only authentication occurs the uPass reader 54 will send the credentials 30 proffered by the customer 20 in a message 100 to the authorisation service 14b. The user's credentials are then tested for validity before being marked as used and a response 122 is returned to the uPass reader along with a link to a profile which holds a photograph to allow visual confirmation of identity by the merchant.

FIG. 14 illustrates schematically a validation in its full context where the credential 30 on a device is backed both by a series of issuing anchors 107 which indicate the quality of registration documents 10 and confidence anchors 110 which indicate the extent to which the profile has been vouched for by other uPass users.

Because a credential 30 is single-use and potentially restricted it is possible that when proffered it will no longer be valid. When this is the case a fresh credential 30" may be automatically generated by the service 14b and pushed (104) to the bearer's device and from there to the validator, or the uPass user may be required to re-enroll the device.

The bearer authentication process is as follows.

1. uPass reader 54 requests credentials for authentication;
2. (optional if the uPass user has multiple profiles) the uPass user selects a profile be validated (note that validation will cause a new credential to be bound to the profile and their uPass device);
3. uPass user presents credentials to uPass reader:
4. credentials are bound to an uPass profile.
5. the credentials is despatched to the authorisation service 14b;
6. if a credential has expired, then the authorisation service:
   1. in the case that the uPass user has presented a valid identity:
      1. despatches a fresh credential 104 to the uPass user's registered device;
      2. sends a retry message to the uPass reader.
   2. otherwise:
      1. send an authorisation failure message to the uPass reader.
7. if the credential is valid:
   1. the uPass user's credential is invalidated;
   2. send message 122 to uPass reader comprising a link to a profile with a photograph (or the photo itself?)
8. in all other circumstances the authorisation service sends an authorisation failure message.
9. new credentials are generated and transmitted respectively to each uPass device 12.

This whole process must be repeated to perform additional authorisations, each time authenticating the uPass user's credentials against a specified profile and leading to a cascade of credential publication.

FIG. 15 shows a validation process in which both the credential of the bearer and the credential of the validator are validated, and in which receipts are issued. This a more complete description of the bearer authentication process described above with reference to FIG. 14. The user of the uPass device selects a profile. The uPass device 12 of the bearer sends the credential 30b bound to that profile to the uPass validator 52, e.g. as a QR code. The uPass validator reads the QR code, selects a profile to use and supplies the bearer credential 30b and its own credential 30v to the uPass validation service. The uPass validation confirms that the credential 30v is valid, and if so goes on to process the credential 30b. If the credential 30b is valid, it returns (message 112 in FIG. 14) a link to the profile bound to the credential 30b to the validator 52. It also issues a new (fresh) bearer credential 30b" to the bearer device 12 and a new validator credential 30v" to the validator 52. Each fresh credential is returned with a receipt which is denoted 32v for the validator and 32b for the bearer. The generation of the fresh credential in each case is associated with the issuance of a pair of non-matching (individual) receipts. In each pair, one receipt is sent to the bearer and comprises a link to a newly-published published profile of the validator and the fresh bearer credential for later use by the bearer, and the other receipt of the pair is returned to the validator and comprises a link to a newly-published profile of the bearer and the fresh validator credential. Thus, in the embodiment of FIG. 15, a pair of receipts is issued for the creation of the fresh credential for the validator, and a pair of receipts is issued for the fresh credential for the bearer. The two receipts 32e, 32v comprise matching transaction identifiers identifying the transaction in which they were created and tying them together. A corresponding master receipt 32 comprises the same transaction identifier (which links it to the corresponding receipt pair) and both links but not the credentials.

The receipt 32v can include the link to the photograph for the bearer in the relevant profile.

At any time between transactions a user can choose to acquire credentials for a different profile. However, they can only ever have one credential on their device for a given uPass user.

FIGS. 16 and 17 show additional details of the receipts 32b, 32v that are generated in the validation transaction of FIG. 15. Each of the receipts 32b, 32v comprises the same transaction identifier 60, which is a symmetric encryption key for the transaction. The bearer receipt 32b comprises a link 62v to the version of the validator's provide published in the validation transaction, and a confidence value 65v associated with the profile that the bearer has just presented (i.e. to which the link 63b in the validator's receipt 32v points). Similarly, the validator receipt 32v comprises a link 62b to the published version of the bearer's profile, and a confidence value 65b associated with the profile the validator has just presented (i.e. to which the link 63v in the bearer's receipt 32b points). Each of the bearer and validator receipts 32b, 32v also comprises a respective link 63b, 63v to a list of all of their profiles currently assigned to the other of the bearer and the validator.

As noted above, in addition to the bearer and validator receipts 32b (i.e. C'$_B$), 32v (i.e. C'$_V$), a master receipt 32 is generated for the transaction, details of which are shown in FIG. 17. The master receipt 32 comprises a hash (e.g. HMAC) of the fresh bearer credential 300b, i.e. H(C'$_B$), and a hash of the fresh validator credential 300v, i.e. H(C'$_V$), where H denotes a cryptographic hash function (e.g. HMAC) that is applied to that credential thereby generating a hash of that credential. That is, the master receipt 32 comprises hashes of both of the fresh credentials 30b'', 30v'' that are issued at the end of the validation transaction. The credentials 30b'', 30v'' cannot be obtained from the hashes 300b, 300v alone. However, the credentials 30b'', 30v'' issued to the bearer and validator respectively can be used later to locate the master receipt 32, even after they have been used or have expired. In other words, the hashes 300b, 300b are first and second indexes of the master receipt 32 respectively, which can be used to located it in the master receipt book 31 when (and only when) one of the credentials 30b'' or 30v'' is rendered available to the uPass system. The master receipt is locate by hashing the available credential to generate a search index, which will match the corresponding index of the master receipt 32. The master receipt book 31 can be implemented in any suitable manner that allows these indexes to be searched, for example as a distributed data store.

The master receipt 32 also comprises both of the links 62b, 62v to the published profiles, their associated confidence values 65b, 65v, and both of the links 63b, 63v to the profile lists—all of which are encrypted with the transaction identifier 60. Alternatively or in addition, the published versions of the profiles to which the links point may be encrypted with the transaction identifier. In embodiments, the transaction identifier 60 is not included in the master receipt 32, nor is it stored within the uPass system. Thus, the contents of the master receipt 32 can only be accessed by the holder of either of the receipts 32b, 32v in such embodiments.

The master receipt 32 may also comprises data that matches at least part of the two previous master receipts for the bearer and validator respectively—32' and 32'' in FIG. 18, respectively. This data is in the form of a hash of the now-used bearer credential 302b, i.e. H(C$_B$), and a hash of the now-used validator credential 302v, i.e. H(C$_V$). The hash 302b of the now-used bearer credential 30b matches the corresponding index of the earlier master receipt 32' that was generated in the transaction in which the bearer credential 30b was first issued (first earlier master receipt) and the hash 302v of the now-used validator credential 30v matches the corresponding index of the master receipt 32'' that was generated in the transaction in which the validator credential 30v was first issued (second earlier master receipt). These indexes are public, in that they are not encrypted with the transaction identifier 60. These two earlier master receipts 32', 32'' can thus be located using the hashes of the bearer and validator credentials 302b (i.e. H(C$_B$)), and 302v (i.e. H(C$_V$)) respectively. Because the earlier master receipts 32', 32'' have been generated in the same manner as the master receipt 32, one of the public indexes of the first earlier master receipt 32' will match the H(C$_B$) from the current master receipt 32—that index having been generated in the earlier transaction when C$_B$ was issued to the entity who is the bearer in the current transaction (but who may have been the bearer or the validator in that earlier transaction); likewise, one of the public indexes of the second earlier master receipt 32'' will match H(C$_V$) from the current master receipt 32—that index having been generated in the earlier transaction when C$_V$ was issued to the entity who is the validator in the current transaction (but who may have been the bearer or the validator in that earlier transaction). In turn, those indexes of the earlier master receipts 32', 32'' relate, in the same manner as the current master receipt 32, to receipts issued to the entities in question in the earlier transactions (as do their other indexes).

These two additional hashes 320b, 302v may also be encrypted with the transaction identifier 60. This allows those earlier master receipts 32', 32'' to be located in the master receipt book 31 from the current master receipt 32 only when the transaction key 60 is made available from the bearer or validator receipt 30b, 30v. Moreover, the content of the each of the earlier master receipts 32' 32'', and/or the published profiles to which it links, is encrypted with its own respective transaction identifier i.e. the respective transaction identifier of the earlier transaction in which it was created (which is different from the current transaction identifier 60), and can thus only be accessed with the bearer or validator receipt created in that earlier transaction.

The master receipt 32 also comprises first and second digital signatures 304b, 304c, generated from at least a part of the earlier master respects 32', 32'' respectively and/or hashes thereof. Preferably, the signatures and/or the hashes are generated from all of the data of the master receipts, including their public indexes. That is, as SIG(32') and SIG(32''). The signature can be generated using a private key known only the uPass system, and can be verified using a corresponding public key to verify the receipt is authentic. The signatures 304b, 304v are also encrypted with the transaction identifier 60.

The bearer and validator receipts 30b, 30v are encrypted with keys 306b, 306c previously registered with the uPass system by the bearer and validator respectively. (a user can deposit a public or symmetric key with the service if they want to, and then the system can use it for communicating with them securely). This means that only the bearer and the validator can access their content respectively.

It's also possible to have multiple signatures in a master receipt generated by different means, and to allow a master receipt to be split into more than two receipts by including additional credentials and signatures in the master receipt.

Enhanced Validation

Some transactions require a higher level of confidence than the norm. For these an enhanced validation process can be adopted.
1. The bearer sends an out of band facial image to the uPass server, accompanied with their current credential and the time that the selfie was taken.
2. The bearer sends to the validator their credential and the facial image for bearer.
3. The validator adds their credential to the message and sends this to the uPass server.

The uPass server validates the message and compares the image data which was sent from the bearer to the validator with the image data that was sent in an outer band communication between the bearer and the uPass server. If the selfie has not arrived when the validation is performed, the uPass server may compare the image data which has been sent to the validator to the bearer's previous entry in their facial image database.

The image data which is sent from the bearer to the validator can be an LBP extract from the facial image.

Note here that a selfie is a facial image captured by the bearer using the camera on their mobile device, for example.

Mutual Authentication Peer-to-Peer Trust

One useful feature of the uPass system lies in its ability to establish mutual trust between two parties, allowing a broader range of interactions than those permitted by the bearer authentication mode. In this case each party presents credentials to the other for authentication by the authorisation service and an ongoing transaction is established.

The advantage of a transactional model is that transactions cannot overlap, therefore any device can only be engaged in a single transaction at any one time. If a device attempts to start a new transaction the previous transaction can be automatically terminated.

When a mutual authentication occurs each party captures a credential from the other party and despatches this to the authorisation service for authentication. If both sets of credentials authenticate then a transaction is established and each party is issued a unique symmetric key which is used to encrypt their ongoing communication with the server. These keys are time-limited (for example, a limit of approximately 5 minutes) and if the transaction is ongoing will be replaced when they expire.

A transaction can remain active for an indefinite period of time, but to do so both parties must send a keep-alive message to the authentication service when their keys expire. If either party fails to provide the keep-alive message then the transaction is terminated.

As an added security measure each transaction can be tied to the specific devices used to initiate it, and to a specific profile for each party.

Once a transaction is initiated either party can test authorisation propositions against the active profile of the other party for the duration of the transaction.

Anonymous Authentication

The uPass system ties authentication to a specific profile (28a . . . 28d) but leaves the uPass user in control of how much information they reveal to the other uPass users via their profile selection. It is therefore practical for two uPass users to broker trust for a given purpose without revealing any personal details to each other—only to confirm their physical appearance. To facilitate this every uPass user has an associated anonymous profile 28a.

Profile Avatars

A second possibility for credentials is the use of a characteristic avatar (an image, movie clip or audio file), which is issued by the uPass system with a credential embedded in the data. Profile avatars with company logos can be used to embed a credential. The avatar image can then be submitted to a website or via NFC to a mobile device with the recipient authenticating it against the uPass system and receiving back the source data which can be used to confirm the identity of the user.

The avatar acts as a container for credentials which aside from the need for embedding and extraction are handled in exactly the same way as any other uPass credentials.

Each avatar is bound to an uPass profile. In some circumstances there may be a limit on the number of avatars allowed per profile, as yet to be determined.

Web-Based Authentication

In the above description, it is assumed that uPass credentials are stored and read by mobile devices using proprietary applications. Another use case which needs to be addressed is that of conventional web applications running inside desktop browsers.

This is referred to herein as uPass Connect and is illustrated in FIG. 19.

uPass Connect uPass Connect provides a protocol whereby the user of a network system wishing to login to that system can do so using their uPass credentials on a trusted device such as a phone or tablet. One use case is for websites and applications, however uPass Connect should be usable with any client/server system capable of presenting a unique token to the uPass user.

In this situation there are two trust queries being performed:
the uPass user 20 is seeking to confirm the identity of the system (web server 80) to which they are providing a credential;
the system (web server 80) is seeking to confirm the identity of the uPass user 20.

There are actually three actors involved in this transaction as the local device 173 (e.g. a PC) being used to login to the system needs to acquire the trust which is being mediated between the uPass device 73 and the remote system 80.

Server Enrolment uPass Connect brokers trust between a server 80 and a client device 12. The client device 12 is already enrolled for the prospective user 20 and has a credential 30 bound to a profile. However, for the server to interact with the uPass system it needs to be enrolled as a device. This process binds (in the database of FIG. 9) an uPass profile 28 for the server operator to a credential 30 to allow interaction.

Once enrolled the server is able to create virtual devices which can then be used to manage login and registration initiated by prospective users of the server.

Virtual Devices

The uPass validation transaction requires that each uPass credential is uniquely bound to both a profile and an enrolled device. Whenever a network system establishes a session by presenting a login or registration form 177 to a visiting uPass user via a client application, it needs to uniquely identify this session to the uPass system. Which introduces the need for a transient virtual device. A transient virtual device is created as part of the session establishment procedure, triggered by step 71 "I want to use URI". This device is enrolled using a standard uPass validation and assigned a unique device identifier. This device identifier needs to be unique for the uPass user providing the uPass Connect session. The same device identifier can be reused across different uPass users.

Once the virtual device has been enrolled, a credential 30 is issued to it, which is transmitted (step 72) in a webpage and forms the basis for a QR code 179. Which will be displayed in the updated webpage 177 issued after enrolment of the virtual device. The native app on the smartphone 12 can scan in this QR code and transmit it to the uPass validation server 14.

Inversion of Trust

In the standard uPass validation scenario described in the preceding sections, a validator requests that a client (bearer) wishing to engage with them to provide an uPass credential which can then be checked against the uPass validation server. The uPass Connect system does not take this approach as there is no guarantee that the client application will be running on a device capable of soliciting a credential from the uPass user seeking to use the network service.

To get around this, the uPass validator presents the credential in visual form (such as the QR code 179) via the client application and the uPass user 20 seeking access scans this (step 73) into their own uPass-enrolled device 12. As an alternative to the QR code, the scan could be by NFC, Bluetooth, Wi-Fi, audio, or any other data transmission mechanism. This flexibility allows uPass Connect to support Internet of Things embedded use cases.

In step 74, a check is performed to a URI verification service to check that the FQDN of the URI is registered (step 75), a confirmation is returned to the smartphone (step 76). An optimal additional step for enhanced security can be conducted, wherein in step 77 the device 12 sends a receiving address with the acquired token and its old token. This receiving address is used to open a back channel, step 716. The remote service confirms validity to the smartphone 12, step 716.

This scenario can play out in one of two ways. In the most common case the uPass bearer 20 is using their mobile device 12 to gain access to a web site via a browser session running on a desktop or laptop device 173 scanning the QR code displayed in the client application.

There is however a second possibility in which the uPass user wishes to connect to the website from a browser or application on the device hosting their uPass credential. Where this is the case the QR code will be transferred from the browser application to the uPass application and thence transmitted to the validation service.

Once acquired, this credential (which is annotated with the URI indicating the system to which the client application is attempting to connect) is passed (step 77) to the uPass validation service, which then determines if the URI is valid and known, by looking up the credential in the database of FIG. 9. To simultaneously validate the user of the device 20, his credential is added to the message in step 77.

Assuming the credentials are validated, a receipt is sent to the URI server 80 (step 78) which determines what to do (step 710) based on the validated identity presented in this receipt. A receipt is also sent (step 79) to the device 12 with details of the server hosting the URI, for display (step 712) to the user 20.

Requiring a Specific Profile

A server supporting uPass Connect may wish to only ever receive profiles it has assigned. This can be reflected in the credentials used by its virtual devices.

Registration Completion

When an uPass user wishes to register with a service supporting uPass Connect they have the option of performing an uPass validation. This provides the server with their current profile (providing details information for a registration form) and a link back allowing a profile to be published against their uPass account.

Business Case: Online Age Verification

One of the key problems uPass Connect solves is the need to certain web-based industries to restrict access to their services in response to minimum-age legislation. This applies to sites operating in the online gambling, pornography, video and general retail sectors.

Site operators can require an uPass age-check profile to determine the legal eligibility of a visitor to access their content and take appropriate action based upon this. Performing this validation also creates an audit trail so that the site owners can subsequently demonstrate their compliance with the law.

Business Case: Virtual Cookies

When a site uses uPass Connect to control access to its content, it gains the ability to annotate users' uPass accounts with site-specific profiles which can be queried on subsequent visits. These can be used to store arbitrary information and therefore have a similar role to browser-based cookies, only without the inconvenience of storing them on a user's system.

Business Case: Restricted Site Membership

Many websites enforce a paywall around their content and maintain proprietary membership lists to control access through this which necessarily also require profile systems to allow user customisation. With uPass Connect both membership access and profiles can be managed via the standard uPass mechanisms.

Business Case: Embarrassing Services

There may be cases where the nature of the service being accessed is such that an uPass user would not want their photo shared with the service for quite legitimate reasons of personal embarrassment.

Referring to FIG. 7, the secure store 24 is a secured, privacy-preserving data store which contains user credentials and related metadata. It is an aim of the system design that an uPass operator should have the bare minimum access to the personal information associated with any given uPass user.

If this data store is ever compromised, so potentially are the identities of all the users.

Therefore the secure store is placed on a separate internal network segment isolated from the outside world with multiple layers of hardware security to ensure this. The data link between the uPass service and the store is secured at a protocol level to further reduce the risk of internal threats.

Within the data store 24 are contained (see FIGS. 8/9):
the registered identity documents 10 for each individual;
details of their authorised mobile device 12a, 12b;
currently issued credentials 30;
all previously issued and now invalid credentials 30';
identity statements and their confidence anchors 110;
identity profiles 28a . . . 2b.

This content is stored in an encrypted form.

An encrypted database also needs a search facility and this is implemented in one embodiment by storing characteristic cryptographic hashes for each indexable data item. These have the advantage of being irreversible making it impractical to use them as a means of recovering the source data in the event that the secure store is compromised, whilst at the same time having a very low probability of collision making them good index keys.

Whenever an incoming request for identity assertion is received the uPass system first checks to see if the device is authorised to make the request. If it is, then receipts will be generated for both parties which are stored in the Master Receipt Books using their provided public keys.

Facial Recognition Database

For each user, a separate facial recognition database is maintained trained on that user's photos.

Offline Usage

The standard uPass mechanism described above are predicated on the availability of network access for both uPass bearer and uPass validator.

Credentials

An uPass credential is one-use and requires validation by the uPass validation service. Therefore credentials cannot be used reliably for offline usage.

Receipts

Receipts are statically published identifiers which always correctly resolve to a published profile and to a consumed credential.

Many offline use cases can be modelled in terms of a locally deployed cache of transaction receipts. The local database of transaction receipts is effectively an offline identity cache with visual user validation supported by a photo for each receipt.

The transaction identifier in the receipt will never change so this can be presented as a printed QR code, barcode or binary blob in an NFC tag.

It is the responsibility of the uPass validator to ensure that relevant profile data is successfully acquired before their access windows expires, and that charged items are properly accounted for during the event.

Receipt-based usage can be reconciled later via an online mechanism to provide a concrete audit trail.

e-Wallet

Another possible application of uPass is a digital wallet which allows a sum of money to be associated with a particular device and used to purchase goods or services. This is essentially an extension of the qualification use case which adds a transactional exchange, requiring confirmation to the vendor that a payment has been successfully made along with the actual transfer of money between the two parties.

Confidence Values—Vouching

A transaction can be performed with the particular intent of increasing the confidence value assigned to a target entity's profile, in which a vouching entity vouches for the target entity. The vouching entity collects a credential from the target entity and presents it to the uPass system with their own credential in an electronic vouching message. The vouching entity's credential is bound to a profile of the vouching entity to which is allocated a relatively high confidence value (relative to the target's profile as bound to their credential). On the basis of that higher confidence value, the transaction causes the confidence value of the target entity's profile to be increased. Being a transaction, this uses up the vouching and target entity's one-time use credentials and fresh credentials, bound to the respective profiles, are issued accordingly.

When the target entity's profile is later made available to a validator through presentation of the target's fresh credential, the uPass system may in addition to revealing the (now higher) confidence value of the relevant profile, identify the vouching entity as the source of the high confidence value to the validator. For example, the validator may be a business, the vouching entity a well know customer of that business, and the target entity a new customer of that business. The profile may be a profile created specifically for the benefit of that business, whereby the initial low confidence value of the target's profile is indicative of the fact that the target is an unknown customer.

Use Cases—FIGS. 26-32

In each of the use cases of figured 26-32, a validator captures a credential from a bearer. In some cases the user is a bearer and the validator a device, in others vice versa. Sometimes both are humans. Each use case is based on a uPass transaction, in which the validator captures a bearer credential 30, and present's it to the uPass system with his/her/its own credential. Both credentials are one-time only use and bound to bearer and validator profiles respectively, which may be profiles specifically created for the sype of transaction in question. Subject to both credentials being valid, a version of the validator (resp. bearer) profile is published and a link to the published version provided in a receipt sent to the bearer (resp. validator). This uses up the credentials so fresh validator and bearer credentials are also issued in the validator and bearer's receipts respectively.

A user 20 can verify their identity to an event owner (FIG. 26) by showing a valid credential 30 bound to e.g. a profile specific to the event on the display as a QR code. In this scenario, the user is the bearer. The creation of the event profile may be conditional on the user having paid an appropriate admission fee or some other predetermined admission criteria. A validator (event owner) captures the credential and presents it to the uPass system. The system publishes the relevant profile so that it is accessible to the validator. The profile may simply be a phot of the user's face 20. The validator can compare the photo to the user and thereby verify that the user 20 does indeed have a profile for the event (because they match the photo) and admit them to the event.

A credential outputted by a web page (FIG. 27) on a separate device 1102 can be captured by the mobile device 12 can be used to simultaneously verify the website to the user 20 of the device 12 and the user to the website. In this scenario, the user is the validator and a Web server is the bearer. The user wishes to log in on a separate device, and captures the website's credential 30 from the separate device using their mobile device 12. That is, the credential is received at the mobile device 12 from the Web server via the separate device 1102. The user presents their own credential and the captured credential to the uPass system. Subject to both being valid, the uPass system verifies the user to the Web server (by publishing the user's relevant profile to a location accessible to the Web server and sending a receipt with a link to that location), and the Web server to the user (by publishing the relevant profile of the Web server to a locational accessible to the user device 12 and sending a receipt with a link to that location). The web site can grant access to the user accordingly, and the user can proceed safe in the knowledge that the website is genuine. Both the Web server and the user have now used up their one time credentials for their respective profiles so fresh credentials are issued with the receipts. FIG. 28 shows a similar scenario, in which the website is instead accessed on the mobile device 12 directly. Here, the credential 30 (not shown in FIG. 28) comes straight to the mobile device 12 from the Web server via the Internet or other network. The underlying mechanism is otherwise the same.

Figure 29:
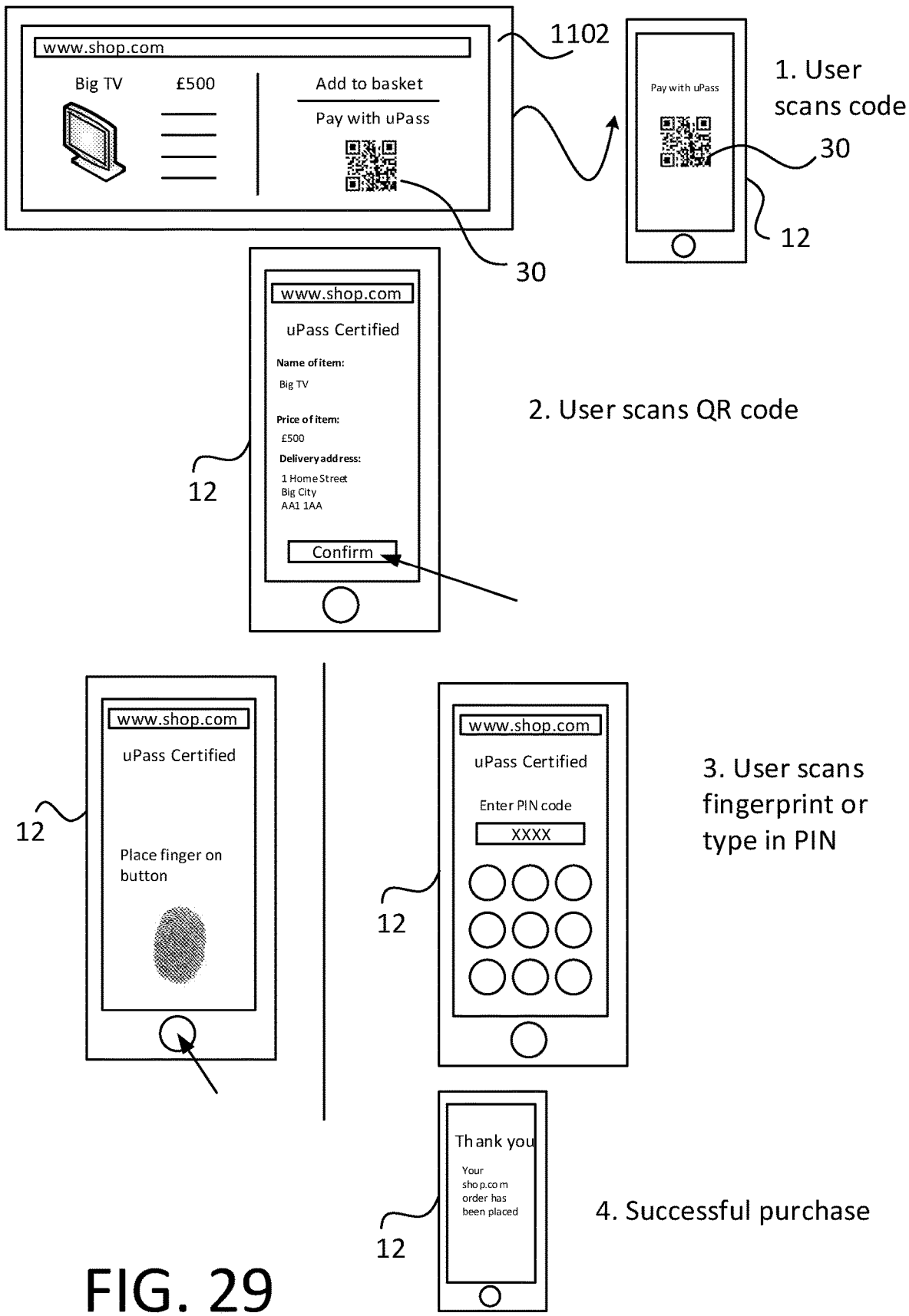
Figure 30:
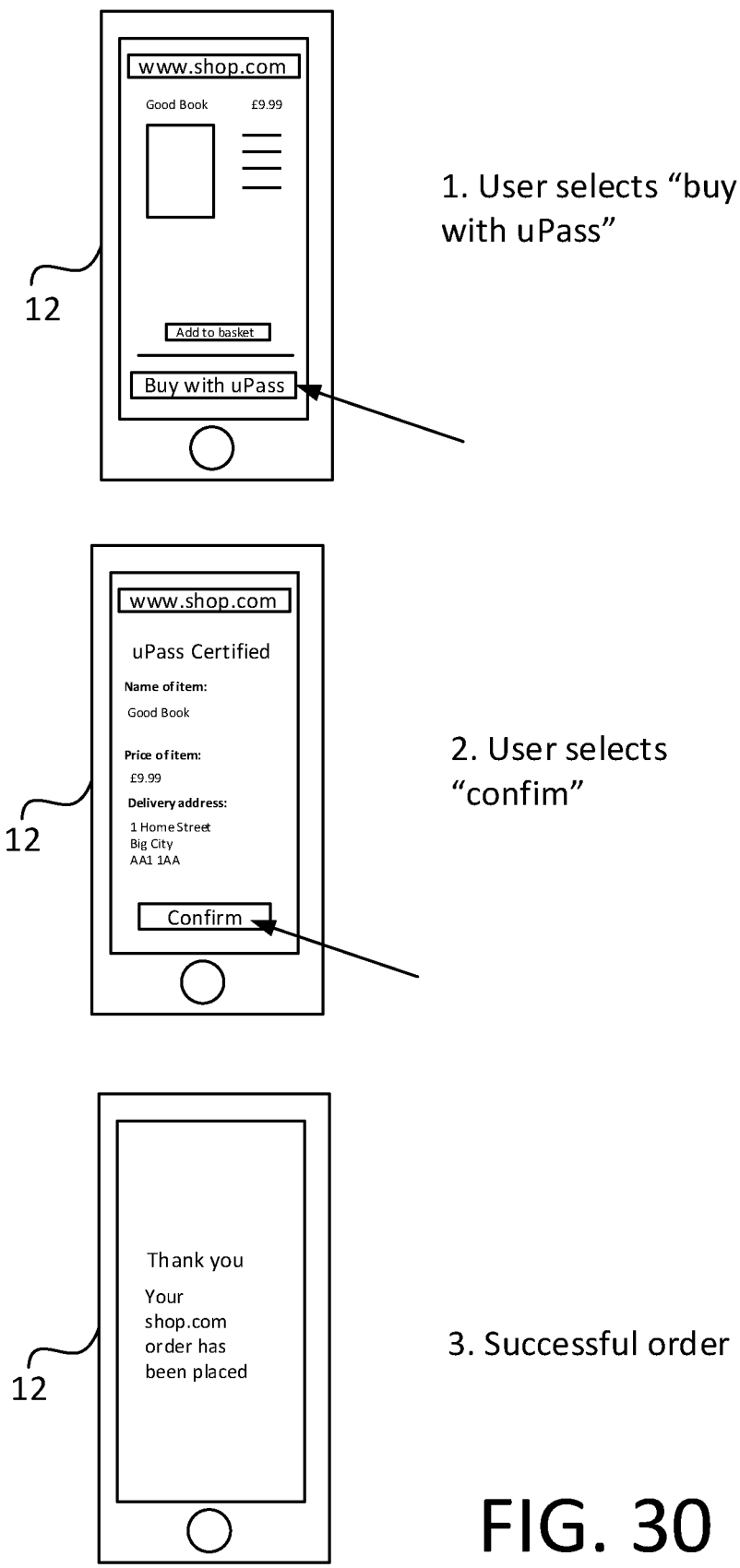
Figure 31:
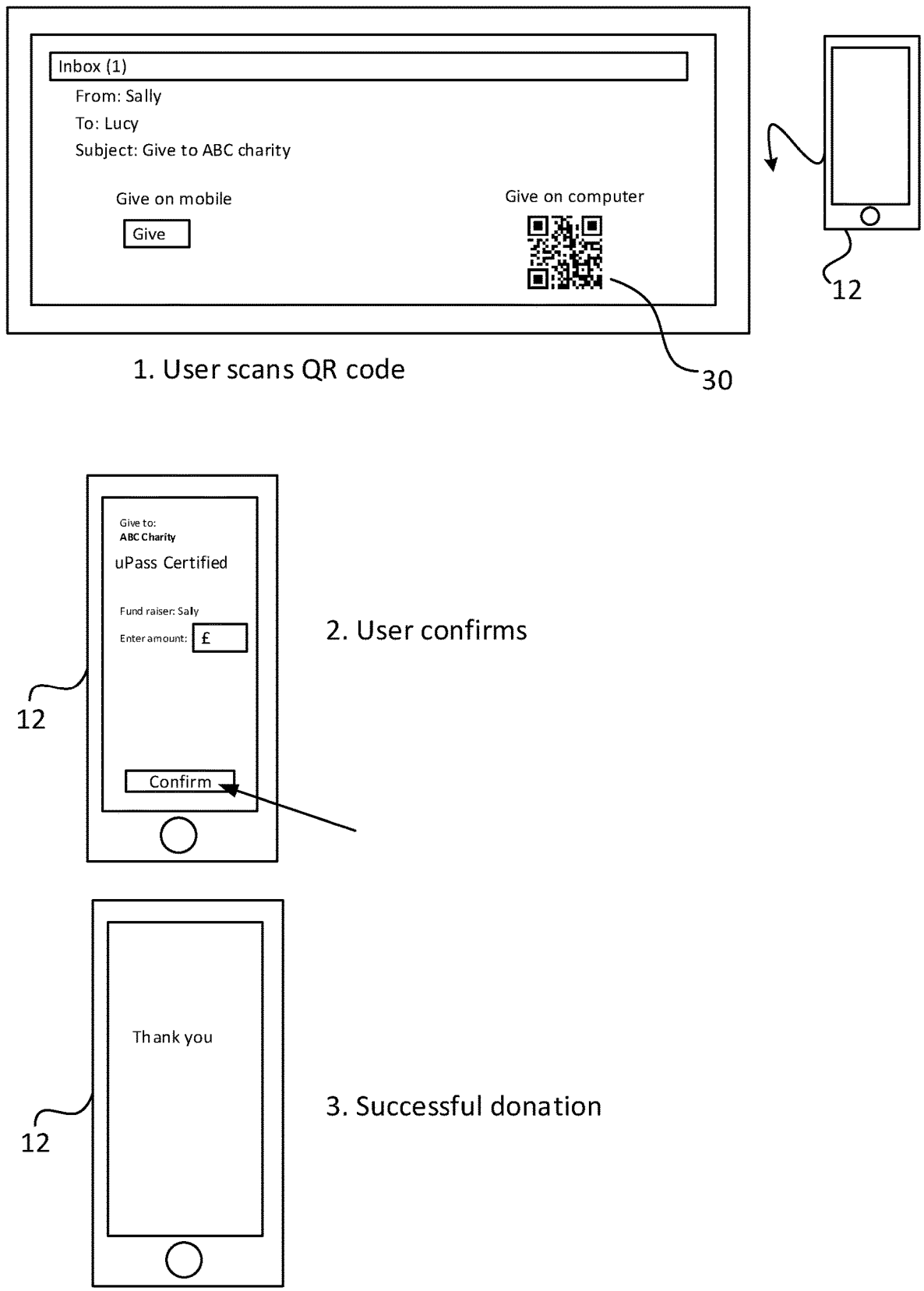
Figure 32:
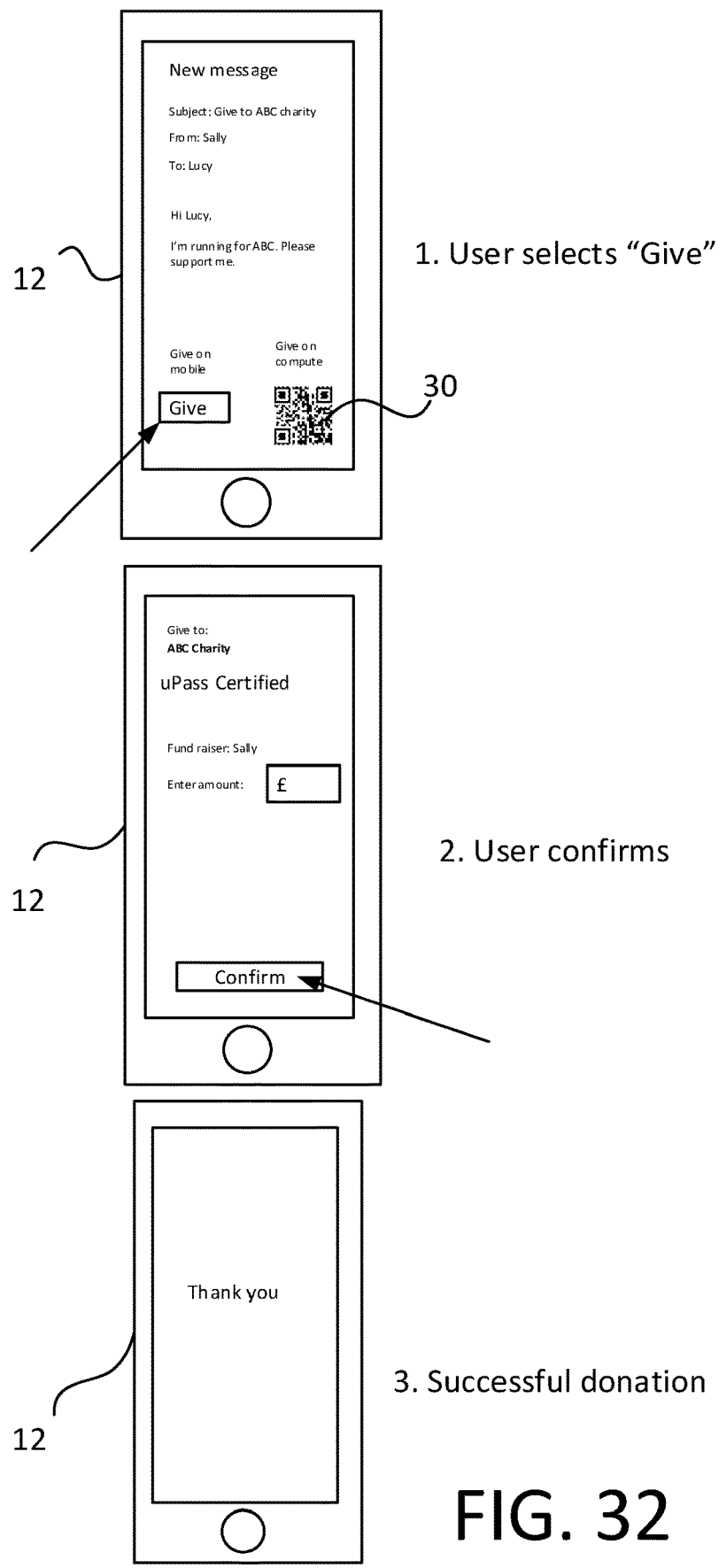

FIG. 29 shows how a user may effect a purchase form a website hosted on a Web server presented on a separate device with their mobile device 12. After capturing the website's credential, the user is required to provide additional verification by entering a PIN or scanning their fingerprint for example before the uPass app will present the captured credential and the user's own credential to the uPass system to provide additional security. Because the website has confidence the uPass system, it allows the transaction to proceed on the basis of the receipt which is issued to it. FIG. 30 shows an equivalent scenario in which the website is provided to the mobile device 12 directly, and without the additional layer of security. In both FIGS. 29 and 30, a key aspect is the simultaneous verification of the web Server to the user (so the user knows they are safe to purchase goods or services form the website), and the user to the Web server (so the website knows it is safe to sell to the user). As will be apparent, an equivalent use case is a real-word use case in which Web server is substituted for a human vendor operating the separate device 1102. FIGS. 31 (separate device) and 30 (same device 12) shows how a user may use their uPAss to donate to charity. The underlying principles are the same as the purchase scenarios only here the reward reaped by the user is intangible.

Transactions—Examples

A credential bound to a profile can be used once in a uPass transaction to do e.g. one of the following:
1. simply publish that profile to make it accessible to a validator;
2. modify that profile e.g. by adding a data item(s) to it;
3. create a new profile;

the profile to which the credential is bound is also published in 2 and 3, as that is an inherent part of a uPass transaction. In 2 and 3, a requesting entity may be e.g. an employer and a target entity an employee (see above), or the requesting entity may be a part of the uPass system itself e.g. the validation service 14b or uPass controller 116—as an exception, the part of the uPass system may not have a profile or its own credential (though neither are excluded). Thus, in this case, only one profile may be published (the target's, sent to the part of the uPass system) and only one fresh credential may be generated (for and sent to the target).

Figure 33:
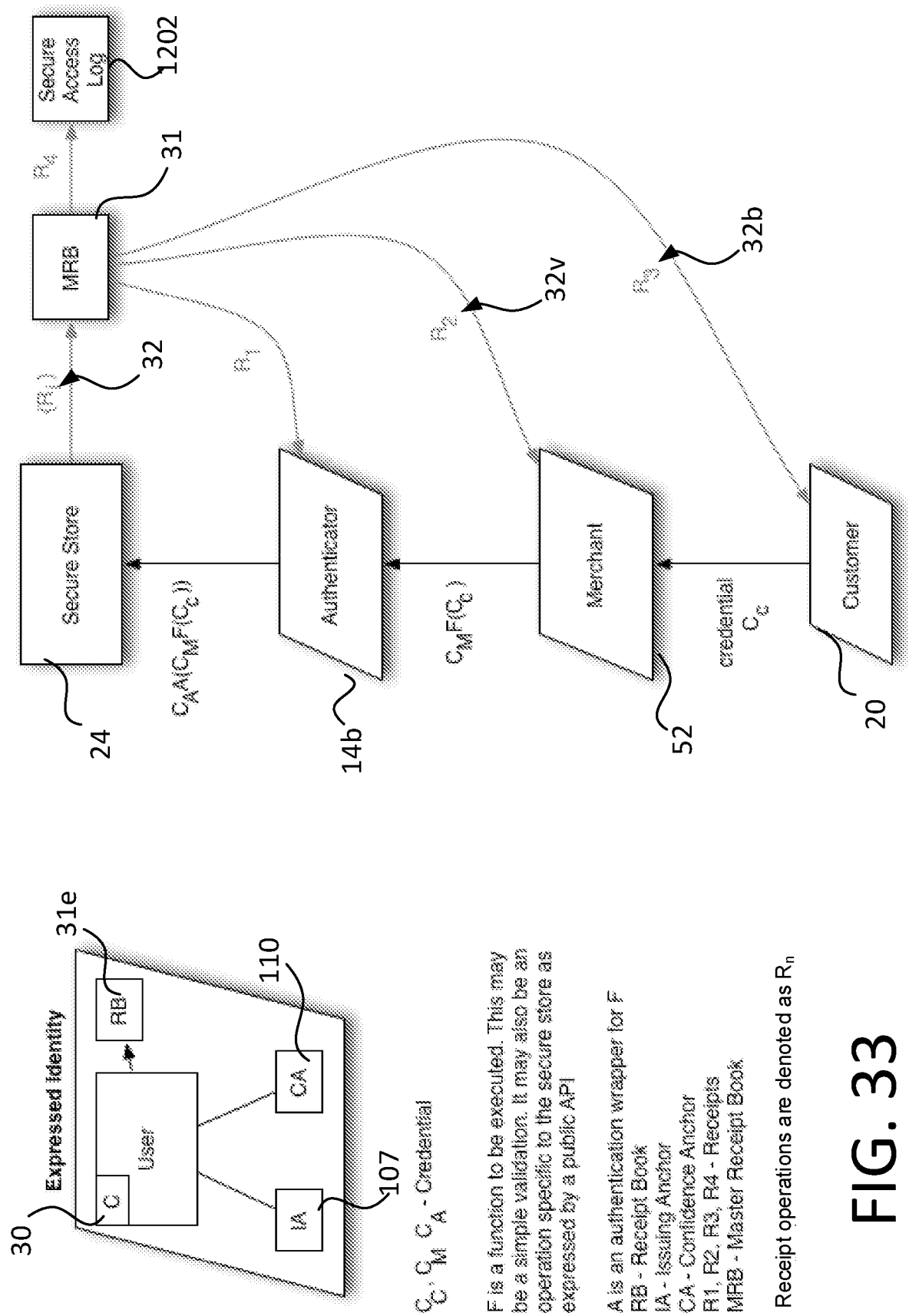
FIG. 33 depicts an example transaction conducted between a bearer, validator, and validation service.
Figure 34:
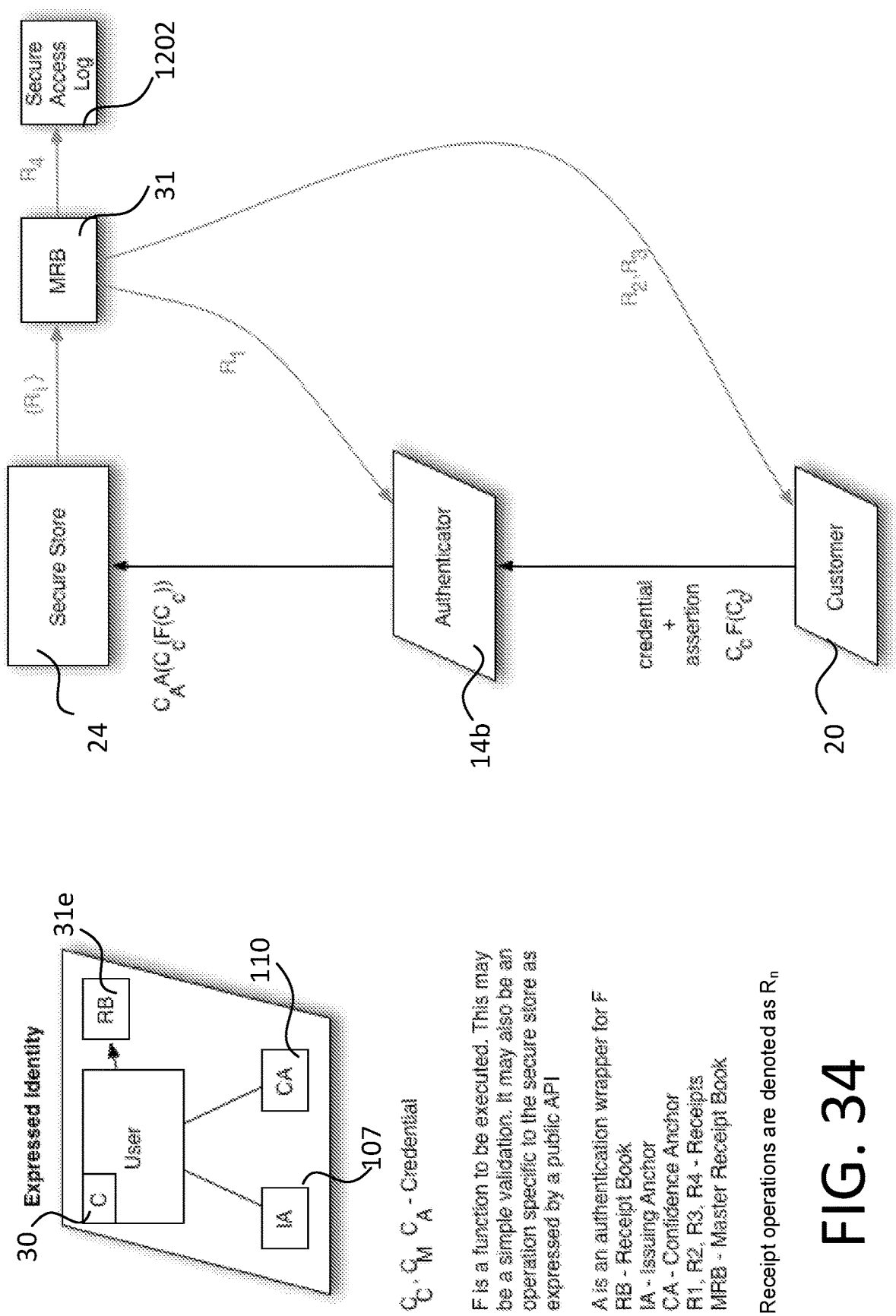
FIG. 34 depicts an alternative example transaction conducted between a bearer, validator, and validation service.

A uPass transaction can be conducted between three entities (such as bearer 20, validator 52, and validation service (authenticator) 14b), as shown in FIG. 33. In FIG. 33 F represents a function to be executed. This may be a simple validation. It may also be an operation specific to the secure store 24 as expressed by a public API. A represents an authentication wrapper for F. The bearer 20 (e.g. customer) sends their credential Cc to the validator 52 (e.g. merchant) in a first electronic message. The validator sends its own credential Cm with the bearer credential Cc with an indicator of the function F to be executed to the authenticator 14b in a second electronic message ("CmF(Cc)"). The authenticator sends CmF(Cc) with an indicator of the authentication wrapper A and its own credential Ca to the secure store 24. A set of four receipts R1, R2, R3, R4 ({Ri}) is generated. A master receipt for the transaction is stored in the master receipt book 31, and bearer/validator receipts 32v/32b (R2/R3) are issued to the bearer and validator 20, 52. R1 is issued to the authenticator 14b, and R4 is logged in a secure access log 1202. All of the receipts R1, R2, R3, R4 and the master receipt share a transaction identifier which links them all together, FIG. 35 shows a similar scenario, however in this case the customer communicates directly with the authenticator 14b and receives both receipts R2, R3.

Alternative Biometrics:

In other embodiments, another type of biometric data (other than, or in addition to, the selfie) may be used, such as image of a fingerprint or a biometric template (e.g. LBP) derived therefrom. For this to be effective, a high resolution image of the fingerprint is needed. Where the device's camera is not equipped to provide an image with the necessary resolution, super resolution imaging can be used, whereby multiple images of the fingerprint are captured and combined using known super-resolution techniques to generate a composite fingerprint image having a greater image resolution than any of the individual images. The composite image is preferably generated at the user device, though is can be implemented by the uPass system. Accordingly, any of the above description pertaining to a selfie applies equally to a fingerprint image data (or other biometric data).

Liveness Detection in Enrolment

In some embodiments, during the enrolment process in which the image of the passport is captured, that same image (or images) may be used for liveness detection. That is, the uPass system may, upon receiving an image of an identity document, process it to simultaneously verify that the document is authentic and also that the hand holding it is a real, human hand (e.g. based on texture analysis). That is, document authentication and liveness detection may be performed based on the same image(s). The authenticity of the document and the liveness of the hand holding it may be prerequisites for anchoring the document within the system.

| Glossary | | | |
|---|---|---|---|
| Term | Description | May associate with | Example |
| Account creation message | A message used in the account creation process | | |
| Acquired Credential | A candidate Credential acquired via mechanisms known to a specific Client Application. | | |
| An uPass | At least one (uPass) profile with at least one credential bound to it | | |
| Anchor | confidence or issuing | | |
| Authenticator | A service authorised to broker a Transaction between two Registered Devices. | | |
| Blob | a binary data element | | |
| Client Application | A software application running on a Registered Device and capable of storing a Current Credential. | | |

-continued

Glossary

| Term | Description | May associate with | Example |
|---|---|---|---|
| Confidence Framework? | Confidence Network, Confidence Web | | |
| Confidence anchor | a uPass profile which is used to assert the validity of a upass profile belonging to a different uPass user | | Another uPass user |
| Confidence value | the numeric value assigned to an uPass profile based on the sum of the confidence and issuing anchors | | |
| Contingent Trust | A value indicating the trustworthyness of a particular profile or data titem based upon its confidence value and the usage of this profile or data item over time | | |
| Credential | A token binding a specific Profile to a Registered Device, both associated with an Identity. This token is unique and may only be used once. Optionally it may also be time-limited or invalidated. | a proflie, a registered device, a receipt | |
| Current Credential | The Credential which is valid for a specific Profile and Registered Device at a given point in time. | | |
| Data element | a combination of a data item and associated metadata | | |
| Data Item | Data Element | | |
| HMAC | In cryptography, a keyed-hash message authentication code (HMAC) is a specific construction for calculating a message authentication code (MAC) involving a cryptographic hash function in combination with a secret cryptographic key. As with any MAC, it may be used to simultaneously verify both the data integrity and the authentication of a message | | |
| HSTS | HTTP Strict Transport Security (HSTS) is a web security policy mechanism which is necessary to protect secure HTTPS websites against downgrade attacks, and which greatly simplifies protection against cookie hijacking. | | |
| Identifying Anchor | identifying document | | |
| Identity Assertion | Any atomic key value pair representing a statement about the identity of the uPass User | | |
| Identifying document | Issuing document | | |
| Identity | The characteristic information associated with a single user. An identity many consist of many profiles | | |

-continued

| Term | Description | May associate with | Example |
|---|---|---|---|
| Identity statement | profile | | |
| Issuing anchor | the author of an issuing document | | like the crown for a passport |
| Issuing document | a source document from which a profile may be created | profile | Passport, Driving Licence, Utility Bill, ID card, Student card |
| Master Receipt Book | A central repository of Receipts of all uPass Users. | | |
| Merchant | registered corporate entity, sole trader, partnership, registered charity, club, society etc. | | |
| Profile | A cohesive set of one or more Identity Assertions describing some aspect of an identity, combined with a photo and linked to the contingent trust system | | |
| Profile History | A time sequence of stored versions of a Profile for a given Identity along with associated metadata. | | |
| Published Profile | An instance of a Profile at a given point in time, stored encrypted in a randomly selected and publicly-accessible location. | | |
| Receipt | A token created subsequent to a Validation which contains key metadata related to that Transaction and links to a Published Profile for the other party involved in that Transaction. | | |
| Receipt Book | A time sequence of Receipts associated with a specific Identity | | |
| Receipt Pair | Receipts are generated in pairs so that each party to a Transaction receives one. The Receipt Pair are bound together by a shared Transaction ID which is used as a shared symmetric key to encrypt both associated Published Profiles. | | |
| Registered Device | Any computing system registered as valid for a given Identity | | |
| Registration data | Sum of all data items submitted for registration | | |
| Registration documents | submitted issuing documents | | |
| Registration item | registration Datum | | |
| Registration Event | The act of submitting or resubmitting an identity Document to the Secure Store, allowing its baseline Contingent Trust to be determined | | |
| Remote Connect | The mechanism whereby an intermediary unassociated with the system is used to present a Credential from a Virtual Device hosted in a remote service such as a web server. This Credential is then acquired by a registered Device which acts as a Validator. | | |

-continued

Glossary

| Term | Description | May associate with | Example |
|---|---|---|---|
| Security Event | a message sent to a separate security auditing and enforcement system | | |
| Selfie | A self-taken photo of a user, in particular of their face | | |
| Social graph | mapping and pinpointing a uPass user in relation to other uPass users | | |
| System Application | One or more software applications which together use a series of Transactions to perform a more complex task. | | |
| Transaction ID | A cryptographically random, unique number used to identify a given Transaction. | | |
| Transaction Key | transaction ID | | |
| Trust Arbitration | An automated mechanism which establishes trust in a timely manner between two users via proffered credentials | | |
| uPass User | An entity registered to the uPass system that has been assigned at least one profile | | Some of the document type and the method of submission is contingent trust |
| Validation Transaction | The process of confirming that an acquired Credential is valid and current for a given Registered Device, leading to the creation and dissemination of a Receipt Pair. | | |
| Validator | A Registered Device capable of acquiring a Credential from another registered Device and using this to request a Validation via an Authenticator. | | |
| Virtual Device | A notional Registered Device which exists purely as an embodiment in software hosted on a physical Registered Device. | | |

Aspects of the Subject Matter and Embodiments Thereof

Various aspects of the present subject matter, and embodiments thereof, are set out below.

An aspect is directed to a method of authenticating content offered by a content source to a local device for displaying content, the method comprising: establishing a communication session between the content source and a browser executing at the local device; transmitting from the content source to the browser a validation page comprising a content authentication token which is a randomly generated one-time use only credential bound to the content source; capturing the content authentication token from the browser by a verification application; transmitting the authentication token to a validation service which determines whether the token is bound to a valid source of content; and causing the content to be displayed on the local device if the token is bound to a valid source of content In embodiments, causing content to be displayed may comprise transmitting a content source receipt from the validation service to a mobile device with or indicating a data item relating to the valid source of content. The content source receipt may comprise a link identifying a memory location from which the data item is accessible, thereby indicating the data item. The data item may be accessed from a digital profile of the content source identified by the credential. The profile may be published by storing a version of it to an addressable memory location, and a link identifying the addressable memory location is included in the content source receipt, thereby indicating the data item.

The verification application may be executed on the mobile device which captures the content authentication token displayed on the validation page by one of: digital image capture; scanning, near field communications and Bluetooth.

The content authentication token may be received by a local browser of the local device and transferred to the verification application which is executed in the local device.

Causing the content to be displayed may comprise transmitting a receipt to the local device which indicates a data item relating the valid source of content.

The token may identify an address of the source of content, the method may comprise transmitting the address to an address verification service to confirm the address is a valid address.

The data item may be displayed at the mobile device.

The data item may be details of a server hosting the content. The data item may comprise details of a virtual device hosting the content and/or a physical device on which the virtual device is running.

The method may comprise the steps of transmitting from the mobile device a device authentication token which is a randomly generated one-time use only credential bound to the mobile device to the verification service with the content authentication token.

The validation service may use the device authentication token to access a digital identity profile using the credential. The validation service may generate a device identification receipt comprising or indicating a data item accessed from the digital identity profile and transmits the receipt to the content source. The content source may determine whether or not to release content based on the data item in the device identification receipt. The method may comprise transmitting in the device identification receipt a fresh device authentication token.

The method may comprise a fresh content authentication token to the content source.

The device identification receipt and the content source receipt may share a common transaction identifier.

The method may comprise the steps of transmitting from the local device an authentication token which is a randomly generated one-time use only credential bound to the local device to the verification service with the content authentication token.

The source of content may comprise a server, and the token may be bound to the server. The content source may comprise a server, and the content authentication token may be bound to a transient virtual device created by the server in a session establishment procedure instigated by the local device.

A confidence value may be associated with the data item and displayed with the data item.

Another aspect is directed to a computer system comprising:
- a digital identity system configured to implement a validation service;
- a local device comprising a network interface and a processor configured to execute a browser which operates to:
  establish a communication session between a content source and the browser via the network interface, and
  receive from the content source a validation page comprising a content authentication token which is a randomly generated one-time use only credential bound to the content source;
  wherein a verification application captures the content authentication token from the browser and transmits the authentication token to a validation service which determines whether the token is bound to a valid source of content; and
  wherein the validation service causes the content to be displayed on the local device if the token is bound to a valid source of content.

In embodiments, the verification application may be executed on the local computing device. The computer system may comprise a mobile device, which comprises a processor and a network interface, wherein the verification application is executed on the processor of the mobile device.

Another aspect is directed to a digital identity system for creating a computer stored digital identity comprising:
- a network interface configured to send and receive electronic messages; persistent electronic storage;
- a profile management module configured to receive from an entity an electronic message comprising a data item, extract the data item from the electronic message and store the data item in a digital profile in the persistent electronic storage;
- a credential creation module configured to generate a credential for the profile and associate the credential with the digital profile;
- a receipt generation module configured to automatically generate two non-matching receipts, each receipt comprising a transaction identifier, a first of the receipts comprising a link identifying the memory location to which the profile is published, a second of the receipts comprising the credential, wherein the first receipt is stored at the digital identity system and the second receipt is transmitted to an address associated with the entity; and
- a publication module configured to publish the profile by storing a version of it to an addressable memory location;

In embodiments, a master receipt comprising data of each receipt may also generated and stored in a master receipt book at the digital identity system, whereby both the first and the master receipt are stored at the digital identity system. The master receipt may comprise only part of the first receipt. The master receipt may comprise the link but not the credential. For instance, the master receipt may comprise the link and the transaction identifier, but not the credential. Alternatively, the data of each receipt in the master receipt may be encrypted with the transaction identifier, wherein the master receipt does not include the transaction identifier.

The credential may be a randomised one-time only use credential.

Multiple digital profiles associated with the entity may be created each profile being associated with a credential unique to that profile, wherein each digital profile may be published by assigning a unique set of data items for each digital profile to a corresponding addressable memory location.

The data item may be shared between the unique sets. For instance, one of the sets may consist only of the data item, and the remaining sets may each comprise the data item and at least one additional data item.

The data item may be a visual image of the entity.

The multiple data items may be received in the electronic message and stored in the profile.

Metadata available from a computer device associated with the entity may be received with the data item and stored at the digital identify system. The credential may be generated using the metadata. For instance, the credential may be generated by a hash of the metadata and a random salt. The random salt may be stored in association with the metadata, whereby a copy of the credential can be generated from the stored random salt and stored metadata. The credential may be generated by hashing the device metadata and the random salt a random number of times, wherein the random number may be stored in association with the random salt and the metadata. The metadata may comprise an identifier of the computer device (device identifier).

The credential may be associated with the digital profile by creating an entry in a database, the entry comprising the digital profile or an indicator which enables the digital profile to be located in the persistent electronic storage, wherein the publication module may be configured to use the credential as a key to that entry in the database to access the profile for publication.

The profile may be published in response to the credential being presented to the digital identity system. The credential is presented by a validating entity other than the entity, the credential having been provided to the validating entity by the entity.

The credential may be one-time only use, and the credential creation module may be configured to generate a fresh credential in response to the credential being presented to the digital identity system, whereby another version of the profile is published to a different addressable memory location by the publication module in response to the fresh credential being presented to the digital identity system.

A device identifier may be received with the data item and stored at the digital identify system, wherein publication of the profile may be conditional on a matching device identifier being presented with the credential.

The link may be generated from and/or the memory location may be selected based on a randomly generated sequence.

The link may be is a Uniform Resource Indicator (URI).

The digital identity system may comprise a confidence value management module configured to allocate a confidence value to the profile based on at least one of a source of the electronic message and a type of the data item. The confidence value may be published with the profile, whereby the confidence value and the profile are available to a requesting entity.

The confidence value may be changed over time based on a clock signal.

Another aspect is directed to a computer-implemented method for creating a computer stored digital identity comprising:
  receiving from an entity an electronic message comprising a data item; extracting the data item from the electronic message;
  storing the data item in a digital profile in the persistent electronic storage; generating a credential for the profile and associating the credential with the digital profile;
  automatically generating two non-matching receipts, each receipt comprising a transaction identifier, a first of the receipts comprising a link identifying the memory location to which the profile is published, a second of the receipts comprising the credential;
  storing the first receipt at the digital identity system; and transmitting the second receipt an address associated with the entity; and
  publishing the profile by storing a version of it to an addressable memory location.

Another aspect is directed to a method of registering a digital identity comprising:
  capturing at a computer device a data item associated with an entity;
  creating an electronic message comprising the data item;
  transmitting the electronic message to a registration service;
  receiving a receipt from the registration service;
  extracting a credential from the receipt to render the credential available for accessing the data item for authenticating the entity; and
  storing the receipt in a local receipt book at a location accessible to the computer device.

In embodiments, the data item may be captured in the form of an identifying datum from an identity document.

The data item may be captured the form of a photo taken by a camera of the computer device.

The first data item may be captured by one of: scanning, near field access; and Bluetooth.

The local receipt book may be held at a server accessible to the device.

Another aspect is directed to a method implemented by executing digital identity software on a processor of a user device to:
  capture with a camera of the user device an image of the face of a user of the device;
  capture data from a real-world identity document, the data including an identification photograph, wherein the data is captured with the camera, from an electronic transmitter embedded in the anchoring document, or a combination of both;
  transmit the image of the user and the captured data to a digital identify system; and
  receive from the digital identify system a credential for the user, wherein presentation of the credential to the digital identity system renders at least part of the captured data available to a presenting entity.

In embodiments, the captured data may also comprise an attribute of the document, The identity document may be a passport or driving licence.

The user device is may be smart device, such as a smartphone or tablet.

Another aspect is directed to a user device comprising:
  a camera;
  a processor configured to execute digital identity software which operates to:
  capture with the camera of the user device an image of the face of a user of the device;
  capture data from a real-world identity document, the data including an identification photograph, wherein the data is captured with the camera, from an electronic transmitter embedded in the anchoring document, or a combination of both;
  transmit the image of the user and the captured data to a digital identify system; and
  receive from the digital identify system a credential for the user, wherein presentation of the credential to the digital identity system renders at least part of the captured data available to a presenting entity.

Another aspect is directed to a computer implemented method implemented by a digital identity system, the method comprising:
  receiving in an electronic message from a user device: an image of the face of a user of the user device which has been captured at the user device; and data which has been captured from a real-world identity document and which comprises an identification photograph;
  storing at least part of the captured data at the digital identity system in persistent electronic storage;
  comparing the image of the face with the identity photograph using a facial verification algorithm; and
  only if the image of the face matches the identification photograph, generating a credential for the user and transmitting the credential to the user, wherein presentation of the credential to the digital identity system renders at least part of the stored data available to a presenting entity.

In embodiments, an attribute of the document may be received in the message, and the credential may be generated and transmitted only if the attribute meets a predetermined criteria. The photograph and/or image may be made available to the presenting entity.

Another aspect is directed to a digital identity system comprising:
  a network interface configured to send and receive electronic messages;
  a processor configured to perform operations comprising:
  receiving in an electronic message from a user device: an image of the face of a user of the user device which has been captured at the user device; and data which has been captured from a real-world identity document and which comprises an identification photograph;
  storing at least part of the captured data at the digital identity system in persistent electronic storage;
  comparing the image of the face with the identity photograph using a facial verification algorithm;
  only if the image of the face matches the identification photograph, generating a credential for the user; and
  transmitting the credential to the user, wherein presentation of the credential to the digital identity system renders at least part of the stored data available to a presenting entity.

Another aspect is directed to a method of authenticating a digital credential of a bearer by a validating device, the method comprising:
  capturing the bearer credential by the validating device;
  transmitting to a validation service the bearer credential with a validator credential bound to the validating device;
  at the validation service, validating the bearer credential and the validation credential, and if the validator credential is valid, using the bearer credential to access a data item of a digital profile and creating an electronic message for transmission to the validating device, the electronic message indicating the data item and comprising a fresh validator credential generated by the validation service;
  issuing a fresh bearer credential and creating an electronic message to transmit the fresh bearer credential to an address associated with the bearer.

In embodiments, the method may comprise the step of using the validator credential to access a data item of a digital profile associated with the validating device and creating an electronic message for transmission to the bearer, the electronic message indicating a data item for verification by the bearer.

The electronic message may indicate the data item by providing a link to a version of the digital profile held at an addressable memory location identified in the link.

The electronic message which indicates the data item for verification by the bearer may indicate the data item by providing a link to a version of the digital profile associated with the validator at an addressable memory location indicated by the link.

The data item may comprise a visual image of the bearer or validator respectively.

The fresh bearer credential may be generated for transmission to the bearer is comprised in a receipt having a transaction identifier. The validation service may generate a master receipt, wherein the master receipt may be stored in a master receipt book. The validation service may generate a master receipt having the same transaction identifier as the receipt generated for transmission to the bearer, wherein the master receipt may be stored in a master receipt book.

Alternatively, part of the master receipt may be encrypted with the transaction identifier, in which case the transaction identifier is not included in the master receipt.

The fresh validator credential may be comprised in a non-matching receipt having the same transition identifier.

The address associated with the bearer may comprise an address of a device previously registered by the bearer and stored in association with the bearer credential.

The step of generating a fresh credential may comprise using a randomly generated sequence to generate a fresh credential bound to the digital profile.

The credentials may be one-time only use.

Another aspect is directed to a method of providing access to digital profiles held in persistent electronic storage of a digital identity system, the method comprising:
  receiving from a requesting entity an electronic request message identifying a target entity;
  in response to the request, publishing: (i) a digital profile of the target entity by storing a version of that profile in an addressable memory location, and (ii) a digital profile of the requesting entity by storing a version of that profile in another addressable memory location;
  generating two non-matching receipts, each comprising a transaction identifier, a first of which comprises a link identifying the memory location to which the target entity's profile is published, the second of which comprises a link identifying the other memory location to which the requesting entity's profile is published;
  transmitting the first receipt to an address associated with the requesting entity; and
  transmitting the second receipt to an address associated with the target entity.

In embodiments, a target credential may be associated with the target entity's profile and a requestor credential may be associated with the requesting entity's profile in a database of the digital identity system, and the step of publishing may be conditional on matching target and requestor credentials being received in the electronic request message.

The credentials may be one-time use only, and the method may comprise generating a fresh target and a fresh requestor credential and associating them with the target entity's profile and the requesting entity's profile in the database respectively, the fresh target and requestor credentials being included in the second and first receipt respectively.

The method may comprise storing a master receipt at the digital identity system, the master receipt comprising data of both receipts and being stored in a master receipt book.

The master receipts may comprise both links but may not include the fresh credentials. The data of both receipts in the master receipt (e.g. the links) may be encrypted with the transaction identifier, in which case the transaction identifier is not included in the master receipt. The master receipt may comprise both links and the transaction identifier but may not include the fresh credentials.

The target entity may be a bearer and the requesting entity a validator, the bearer's profile being a pre-existing digital profile which is accessed in the persistent electronic storage in response to the request.

The target entity may be a registrant and the requesting entity may be an enrolment module of the digital identity system which has created the digital profile in the persistent electronic storage.

A respective confidence value may be allocated to each profile which is published with that profile and accessible via the respective link.

Another aspect is directed to a computer system comprising a network interface configured to transmit and receive electronic messages, and a processor configured to implement the method of any preceding claim.

Another aspect is directed to a digital identity system comprising:
- a network interface configured to send and receive electronic messages;
- persistent electronic storage holding a digital profile of a target entity and a digital profile of the requesting entity;
- a publication module configured to receive from the requesting entity an electronic request message identifying the target entity and, in response to the request, publish: (i) the target entity's digital profile by storing a version of that profile in an addressable memory location, and (ii) the requesting entity's digital profile by storing a version of that profile in another addressable memory location;
- a receipt generation module configured to generate two non-matching receipts, each comprising a transaction identifier, a first of which comprises a link identifying the memory location to which the target entity's profile is published, the second of which comprises a link identifying the other memory location to which the requesting entity's profile is published, wherein the first receipt is transmitted to an address associated with the requesting entity and the second receipt is transmitted to an address associated with the target entity.

Another aspect is directed to a digital identity system comprising:
- an enrolment module configured to receive a data item from an enrolling device and to create in persistent electronic storage a digital profile comprising the data item;
- a credential creation module configured to generate a credential from a random sequence, to associate the credential with the digital profile in a database, and to transmit the credential to the enrolling device;
- a publication module configured, in response to later presentation of the credential to the digital identity system, to publish the digital profile by storing a version of the digital profile in a memory location accessible to a device presenting the credential.

In embodiments, the enrolment module may be configured to also receive metadata of the enrolling device, which is stored in the database in association with the profile.

The credential may be generated from the random sequence and the metadata, and the credential may be associated with the profile by storing the random sequence and the metadata in the database in association with the profile, and wherein the system may comprise a validation module configured to generate a copy of the credential from the sequence and metadata stored in the database, and the publication of the profile may be conditional on the presented credential matching the copy.

The metadata may comprise an identifier of the enrolling device, and the publication of the profile may also conditional on a matching device identifier being presented with the credential, whereby use of the credential is restricted to the enrolling device.

The credential may be associated with the profile by storing a copy of the credential in the database in association with the profile, wherein the system may comprise a validation module configured to validate the presented credential by comparing it with the copy and the publication of the profile may be conditional in the presented credential being valid.

A link identifying the addressable memory location may be transmitted to the presenting device.

The link may be generated from a random sequence. The addressable memory location may be selected based on a random sequence.

Another aspect is directed to a digital identity system according to claim 1 wherein the persistent electronic storage also holds another digital profile associated with another credential and comprising a data item which has been received from the presenting device, wherein both credentials are presented by the presenting device, and in response the other profile is published to a different memory location accessible to the enrolling device.

In embodiments, the digital identity system may comprise a receipt generation module configured to generated two non-matching receipts, one of which is transmitted to the presenting device and comprises a link identifying the memory location to which the profile is published, the other of which is transmitted to the enrolling device and comprises a link identifying the other memory location to which the other profile is published.

The digital identity system according may comprise a confidence value allocation module configured to allocate a confidence value to the profile based on at least one of: a type of the received data item and a source of the data item.

Another aspect is directed to a method implemented at a digital identity system and comprising:
- receiving a data item from an enrolling device;
- creating in persistent electronic storage a digital profile comprising the data item;
- generating a credential from a random sequence;
- associating the credential with the digital profile in a database;
- transmitting the credential to the enrolling device, wherein later presentation of the credential to the digital identity system causes publication of the digital profile by storing a version of the digital profile in a memory location accessible to a device presenting the credential.

Another aspect is directed to a method of providing access to a digital profile comprising:
- receiving a one-time only use credential associated with a digital profile in persistent electronic storage;
- validating the credential and, only if the credential is valid, publishing the profile to an addressable memory location by storing a version of it at the memory location, thereby invalidating the credential;
- generating a fresh one-time only use credential for the digital profile;
- associating the fresh credential with the digital profile; and
- transmitting the fresh credential to an address associated with an entity, whereby the entity can use the fresh credential once thereafter to cause the profile to be republished to a different addressable memory location.

Another aspect is directed to a computer system comprising a network interface and a processor configured to implement the method.

Another aspect is directed to a computer system comprising:
- electronic storage;
- a network interface configured to receive electronic messages;
- a processor configured to execute identity management code which operates to:
  - receive an electronic message from the network interface, the message including at least one data item to be included in a digital profile for an entity, the data item associated with the entity and uniquely identifying the entity;

extract the data item from the electronic message;

create a digital profile using the data item in the electronic storage, wherein the profile comprises the data item;

allocate a confidence value to the profile, wherein the confidence value is allocated based on at least one of a source of the electronic message and a type of the data item; and create and transmit a credential to the entity, wherein presentation of the credential to the computer system renders a version of the digital profile and the confidence value available to a presenting entity.

In embodiments, the electronic may hold a plurality of digital profiles associated with the entity, each digital profile comprising a unique set of data items for that digital profile. At least some of the data items may be shared between the unique sets.

In embodiments, the electronic storage may hold anchoring documents in association with the digital profiles, wherein an anchoring document may be received in the electronic message and the data item has been extracted from the anchoring document.

The confidence value may be allocated based on the type and/or age of the anchoring document.

The confidence value may be allocated based on the source of the anchoring document.

The version of the profile may be rendered available by storing it to an addressable memory location, and transmitting a link identifying the memory location to the presenting entity.

The processor may be configured to create and transmit a credential each time a data item is stored in a digital profile, wherein presentation of each credential to the computer system may cause a respective version of it to be stored to a different addressable memory location, whereby multiple versions of the profile may be published.

The memory location may be selected based on a random sequence. The link mat be generated from a random sequence.

The link may be a Uniform Resource Indicator.

One of the data items may be a visual image of the entity.

The entity may be a person and the visual image is a facial image of the person.

The electronic storage may comprise a device metadata storage section which holds metadata associated with computer devices which have been used to transmit electronic messages to the network interface.

The electronic storage may hold one or more digital profiles for each of multiple entities.

The digital profile may comprise multiple data items received from the entity.

The identity management code may be operable to allocate a confidence value associated with a source of the electronic message, such that when the source of the electronic message is unknown to the computer system, the confidence value is low.

When the source of the electronic message is known to the computer system, the identity management code may be operable to allocate a confidence value appropriate to the status of the source of the electronic message.

When the source of the electronic message is a document issuing authority, the confidence value which is allocated may be high.

The identity management code may be operable to allocate a confidence value such that when one of the multiple entities which has a digital profile held in the electronic storage is the source of the electronic message, a contingent trust value associated with that entity is used to calculate the confidence value.

The contingent trust value may be dependent on usage of the digital profile by the multiple entities in one or more authentication process.

The identity management code may be operable to update the digital profile on receipt of further data items, and wherein the allocated confidence value is changed when the profile is updated.

The processor may be configured to change the allocated confidence value over time based on a clock signal.

The confidence value may be increased in response to receiving an additional visual image of the entity.

The entity may be required to present a new data item when subsequently logging on to the system, and the confidence value may be changed based on the new data item.

The new data item may be a visual image of the entity.

The identity management code may be operable to receive a data item from a third party to assign a profile to the entity, and wherein the confidence value which is allocated may depend on the status of the third party.

The electronic message may be received from the entity.

The electronic message may be received from another entity different than the entity.

The data item may be one of two data items are received in the message, a first of which is an image of the entity which has been captured with a camera and the second of which is an identification photograph which has been captured from a real-world identity document, and the confidence value may be allocated by comparing the two data items and may reflect an extent to which they match, The two data items may be compared using a facial verification algorithm.

Another aspect is directed to a computer-implemented method of managing a digital profile comprising: receive an electronic message including at least one data item to be included in a digital profile for an entity, the data item associated with the entity an uniquely identifying the entity;

extracting the data item from the electronic message;

creating a digital profile using the data item in electronic storage, wherein the profile comprises the data item;

allocating a confidence value to the profile, wherein the confidence value is allocated based on at least one of a source of the electronic message and a type of the data item; and creating and transmitting a credential to the entity, wherein presentation of the credential to the computer system renders a version of the digital profile and the confidence value available to a presenting entity.

Another aspect of the present invention is directed to a digital identity system comprising a data store having at least one storage location, at which identity data of an entity is held; a computer interface configured to receive an electronic message, which identifies the storage location of the entity's identity data in the data store, wherein the message comprises a one-time use only credential of the entity; and a computer system configured to validate the credential and, if the credential is valid, retrieve the entity's identity data from the identified storage location, issue a fresh one-time use only credential to the entity, and publish the retrieved identity data by storing a version of it to an addressable memory location; wherein the computer system is configured to generate in a master receipt store a master receipt, wherein the master receipt comprises a link to the addressable memory location and an index which comprises a hash of the fresh credential.

In embodiments, the master receipt may also comprise a hash of the credential received in the electronic message.

The computer system may be configured to provide to another entity, in response to receiving a grant of access by the entity to the other second entity, a receipt comprising a copy of the link whereby the other entity can access the entity's published identity data.

The receipt may comprise a transaction identifier, wherein the link in the master receipt and/or the published identity data at the addressable memory location is encrypted with the transaction identifier.

The computer system may be configured to provide the receipt to the other entity only if it has received a valid one-time only use credential of the other entity in association with the grant of access, wherein in that event a fresh one-time only use credential is issued to the other entity by the computer system, wherein the master receipt comprises another index comprising a hash of the fresh credential issued to the other entity.

The computer system may be configured to provide to the entity another receipt which comprises the same transaction identifier.

The grant of access may be denoted by the electronic message comprising the credential of the entity.

The electronic message comprising the credential of the entity may be received from the entity.

The electronic message comprising the credential of the entity may be received from the other entity.

In response to receiving a copy of the credential at a later time in an electronic search request message via the computer interface, the computer system may be configured generate a search index comprising a hash of the credential received in the search request message, use the search index to locate the master receipt in the master receipt.

The computer system may be configured generate a search index comprising a hash of the credential received in the electronic message, use the search index to locate in the master receipt store an earlier master receipt having an index that matches the search index, and generate a hash and/or a digital signature from at least part of the earlier master receipt, wherein the master receipt also comprises the hash of the at least part of the earlier master receipt.

The hash and/or the digital signature may be generated from substantially all of the earlier master receipt, including its index.

The other entity may hold a symmetric or private key, and the computer system may be configured to encrypt the other receipt using a version of the private key or a corresponding public key available at the digital identity system.

The entity may hold a symmetric or private key, and the computer system may be configured to encrypt the other receipt using a version of the private key or a corresponding public key available at the digital identity system.

The hash of the credential in the master receipt may be encrypted with the transaction identifier.

The grant of access may be denoted by a later electronic message received via the computer interface after the electronic message comprising the credential of the entity.

The electronic message may be a sharing token request received from the entity, wherein the computer system is configured, if the credential is valid, to issue to the entity in response a sharing token bound to the identity data in the identified storage location, wherein the other electronic message may be received from the other entity and comprise the sharing token.

Another aspect is directed to a method comprising implementing any of the above described system, device, application or other functionality.

Another aspect is directed to a computer program product comprising code stored on a computer readable storage medium and configured to implement any method, system or device functionality disclosed herein.

The system and method described above may, in embodiments, be used for any of the following. Note that the "uPass system" is sometimes referred to herein as a "YOTI system". The terms "uPass" and "YOTI"/"Yoti" used interchangeable in this disclosure.

uPass Connect

The uPass Connect mechanism can be used for the following purposes:
Verifying identity (ID) Online
Verifying age online
KYC (Know Your Customer) mechanisms
No-phishing i.e. as an anti-phishing mechanism
Multi Factor Authentication
Bots Prevention
Preventing Multiple Accounts (i.e. being opened by the same entity)
To implement "One user one Vote" voting mechanisms, e.g. for:
  Competition Entries
  Voting
  Polling
  Lobbying
  Petitions
anonymous but verified login
to create a profile blacklist e.g. to provide Anti Touting
authentication without usernames+passwords
form filling/registration
restricting access to content by:
  Location
  Age
  Nationality
  Name
  DOB
  Address
  other 'profile' details
Send a user's identity over the Internet The following are additional, useful configurations and/or uses of the uPass system:

F2F (Friend to Friend/Peer to Peer)

The uPass system can be configured in an F2F context. For example is can be configured to provide mechanisms for the following:
Entry to a building via QR code/NFC
entry to venues by proving profile+permissions. Profile details which may be provided include:
  Company
  Age
  Nationality
  Name
  DOB
  Address
  Do you have the correct ticket
  Do you have the correct security clearance
  other profile details
Proving age for access control/point of sale, for example at:
  Nightclubs
  Casinos
  Pubs Signing into a location, for example in the following contexts:
  Roll Call e.g. schools
  Visitor Book
  Courses
  Health and Safety
  Hotels/BnBs
  Gyms
Logging hours worked
Hotel use case—book via connect, assign pass to device, avoid check-in+key cards
Proving ID to another individual, for example in the context of:
  Classifieds
  Dating
  Taxis
  Flatshare
  Carshare
Business proving ID to an individual—e.g:
  for use during home visits:
  for showing to employer
  for showing appropriate qualifications
Individual proving ID to business, for example:
  Pawnbrokers
  Car Rental
  High Value Purchases
  Age Restricted Goods
  Goods collection
  Transport
Home Delivery, for example to provide:
  Proof of Receipt of Goods
  Authorisation to individuals to collect goods on your behalf
F2F and online KYC, e.g. in the context of:
  Estate/Lettings Agents
  Creating bank accounts
  Insurance
  Mortgage
  Peer2Peer lending
Employee proving ID to business, for example demonstrating:
  Right to work inc.:
    Visas
    Qualifications
    Nationality etc
  User Access to Business Applications
  Building Access
  Certifications e.g.:
    Health and Safety Course
    Forklift Driver
    First Aid
    Child Protection
    CRB
    License to Practice
  Insurance, e.g.:
    Indemnity Insurance
    Liability insurance
Yotis Issued by Third Parties
  Examples of third parties that can usefully issue Yoti's are:
    Parents
    Businesses
    Charities, e.g.:
      Diaster relief—charity can issue a temporary identity until such a time when the country's infrastructure has improved
      Using Yoti to assign a unique identifier e.g. QR code or an NFC chip to an identity. Yoti is capable of working in an offline capacity
Asset Tags
  Assigning an identity to an object
  Digital watermarks
    Assigning an identity to digital content
    Assigning an identity to tickets
  Tagging pets
  Assigning an identity to
    Certificates
    Documents
IOT (Internet of Things)
  Assigning permissions to IoT connected devices based on a Yoti identity
  Allowing devices to communicate with individuals
MOOCS
  Online tests, e.g.
    Random face checks to verify identity
    Verify identity of examinee
    Assigning qualifications
Global Address Book
  Sharing a user's contact information with others which gets updated when the user updates
  Being able to restrict access to your contact information
  Sharing business cards
Restricting Online Content
  Paywall infront of content
  Micropayments
  Subscription Services
Microdonations
Messaging System for Healthcare Patients to Give and Receive Feedback
Loyalty Scheme Management
  registering to loyalty schemes
  proof of membership, loyalty level, points allocation
Club Management
  registration to clubs/societies
  proof of membership, proof of subscription payment, proof of membership level
  membership communication
  payment of subscriptions and other items relating to club
Digital Signatures
  signing electronic format contracts (like DocuSign)
  acknowledging agreement to an agreement created and hosted on Yoti
Escrow Services
  domain name transfers
  other electronic item transfers
  physical good transfers (e.g. City exchanges)
Invoices
  A service to issue invoices. This would be a useful product for some premium Yoti Individuals/smaller service providers (cleaning lady, electrician, plumber, etc.).
  Disruption to the insurance by using Yoti connect and verifying ID it is possible to can mitigate false insurance; this in turn creates a lower premium due to lower risk due to a verified identity
AML (Anti Money Laundering)
  Credential Management Apps—Across Devices
  Private Messaging System—Like Wickr but with a guaranteed identity
  Encrypt emails using Yoti, e.g. to provide:
    Digital signatures and encryption using Yoti identities for permission Digital Vault
  Personal vault linked to identity, e.g. for:
    Documents
    Qualifications
    Digital Content
    Medical records
    Wills
    Share Certificates
    Cryptographic key store—allow yoti to store keys to unencrypt secure documents stored elsewhere
Ticketing
  Verifying Identity
  Prevent Bots
  Prevent Multiple Accounts
  Control Purchasing of Tickets
  Blacklists
  Tout Profiles
  Assign Identity To Tickets
  Purchase of Tickets (through e-wallet)
  Controlled Resale of tickets
  Event Entry Control
  Ballots
  Offer events a profit share on the resale of tickets
Ewallet
  Building an e-wallet ontop of an identity system
  Social Savings
  Pocket Money/Childrens ewallet
  P2P Payday lending
  Charity Donations
  Associating profiles with contactless payments
  Cryptocurrencies
  Tying in identity with cryptocurrencies
  Secure Ledger, e.g. for managing:
    Cryptocurrency—removes need for distributed ledgers
    Microdonations
    Transferring funds
Sectors
  The following uses within the following sectors are envisaged:
Freelancers
  Verifying Previous work e.g. associate identity to previous designs
  Reviews
  Prevent multiple accounts
  Payments (through eWallet)
  Verifying qualifications
Sharing Economy
  B2B (Business to Business)
    Verifying Users
    Verifying ownership of shared goods
    Registration/Login
    Payments (through ewallet)
  B2C (Business to Consumer)
    Allow users to send identity to each other over the internet
    Allow users to show identity in person
Classifieds
  B2B
    Verifying Users
    Verifying ownership of shared goods
    Registration/Login
  B2C
    Allow users to send identity to each other over the internet
    Allow users to show identity in person
    Payments (through ewallet)
Online Dating
  B2B
    Verifying Users
    Prevent Bots
    Prevent Multiple Accounts
    Registration/Login
  B2C
    Allow users to send identity to each other over the internet
    Allow users to show identity in person
    Temporary Chat
Online Gaming
  AML
  KYC
  Prevent Bots
  Prevent Multiple Accounts
  Secure Login
  Payments (through ewallet)
DRM Content Management
  Assign Identities to Digital Goods
  Allow resale of digital goods through Yoti
Age Restricted Content
  Anonymous Age Verification
  Secure Login
  Prevent Sharing of Login Details
  Age Restricted Chat Rooms
  Childrens Games
Ticketing/Events/Conferences
  Verifying Identity
  Prevent Bots
  PRevent Multiple Accounts
  Control Purchasing of Tickets
  Blacklists
  Tout Profiles
  Assign Identity To Tickets
  Purchase of Tickets (through e-wallet)
  Controlled Resale of tickets
  Event Entry Control
  Ballots
Third Sector
  Disaster relief—charity can issue a temporary identity until such a time when the country's infrastructure has improved
  Using Yoti to assign a unique identifier e.g. QR code or an NFC chip to an identity.
MOOCs/Training
  Verify Identity of Candidates
  Assigning Qualifications
  Checking Identity of Examinees
  Face Matching during online Exams
  Secure Login
Review Sites
  Prevent Bots
  Prevent Duplicate Accounts
  Prevent Fake Reviews
  Secure Login
  Verifying Businesses
Public Health
  Verifying Employees
  Verifying Visitors
  Storage of IPatients Health Records
  Asset management
  Building Entry
  Doctor Patient Messaging
  Patient Feedback
  Online Appointment Booking Delivery Services
  Verifying Identity of Individuals Picking up parcels
  Giving friends/family permission to pick up parcels on your behalf
  Signing for Parcels-Receipt of Delivery
  Verifying employees
  Asset Management, e.g.:
    Employees signing out vans/cars
Recruitment
  Verifying Identities of candidates, e.g:
    Qualifications
    Visas
    Nationalities
  Sharing identity with HR
  Sharing contact details
Retail
  Discounts Based on profile items
  Loyalty Schemes
  Proof of membership
  Proof of age
  Competitions
  Data Capture of shoppers
  EPOS
  Building Access
  Online Retail Login
  Online Retail Registration
  Payments (through eWallet)
Company Profiles
  Business proof of identity to customer on home visits
  Proof of qualifications to customer
  Proof of receipt of visit
  Proof of work done
Residential
  KYC
  Proof of right to live
  Contact sharing
Financial Services
  KYC
  AML
  Secure online login
  Disruption to the insurance by using Yoti connect and verifying ID we can mitigate false insurance, creates a lower premium due to lower risk due to a verified identity
  Building Access
Universities
  Building Access
  Secure online login
  Receipt of work Submissions
  Verifying identity of students
  Verifying Visas
  Payments (through ewallet)
  Library book loans
  Club/Society Memberships
  Age Verification at Bars
  Roll call for lectures/seminars
Travel
  Storing Tickets
  Proof of age for discounts
Public Sector
  Voting and Polling—Online and Offline
  Asset Management.
uPass Connect
  The uPass Connect mechanism can be used for the following purposes:
  Verifying identity (ID) Online
  Verifying age online
  KYC (Know Your Customer) mechanisms
  No-phishing i.e. as an anti-phishing mechanism
  Multi Factor Authentication
  Bots Prevention
  Preventing Multiple Accounts (i.e. being opened by the same entity)
  To implement "One user one Vote" voting mechanisms, e.g. for:
    Competition Entries
    Voting
    Polling
    Lobbying
    Petitions
  anonymous but verified login
  to create a profile blacklist e.g. to provide Anti Touting authentication without usernames+passwords
  form filling/registration
  Send a user's identity over the Internet
  restricting access to content by:
    Location
    Age
    Nationality
    Name
    DOB
    Address
    other 'profile' details
  Enabling paywalls to work more effectively by associating users with probable desired content, either through expressed interest or attributes.
  Subscription Services
    Streaming content for specific user access, for example User "A" who is a BBC licence payer is able to access the content that they have paid for from France or any other country. Netflix and other companies are struggling with mobile users access rights without using geolocation as a filter.
  F2F P2P (Friend to Friend/Peer to Peer)
    The uPass system can be configured in an F2F context. This can work both in a face to face via a QR code/NFC scan and also remotely by sending a link through a messaging platform.
    For example is can be configured to provide mechanisms for the following:
      Entry to a building via QR code/NFC
      entry to venues by proving profile+permissions. Profile details which may be provided include:
        Company
        Age
        Nationality
        Name
        DOB
        Address
        Do you have the correct ticket
        Do you have the correct security clearance
        other profile details
      Proving age for access control/point of sale, for example at:
        Nightclubs
        Casinos
        Pubs
      Simultaneously paying for an item while proving an aspect of identity using the Yoti e-wallet e.g. over 18
      Signing into a location, for example in the following contexts:
        Roll Call e.g. schools
        Visitor Book
        Courses Health and Safety
Hotels/BnBs
Gyms
Hospitals/Doctors Surgery
Offices
Shopping Malls
Airports
Logging hours worked
Hotel use case—book via connect, assign pass to device, avoid check-in +key cards
Proving ID to another individual, for example in the context of:
  Classifieds
  Dating
  Taxis
  Flatshare
  Carshare
Business proving ID to an individual—e.g:
  for use during home visits:
  for showing to employer
  for showing appropriate qualifications
Individual proving ID to business, for example:
  Pawnbrokers
  Car Rental
  High Value Purchases
  Age Restricted Goods
  Goods collection
  Transport
Proving that you are over the required age at point of purchase when buying alcohol, cigarette or any age restricted product. Not only does the purchaser conveniently purchase the goods that they require but the vendor will also receive an immutable receipt proving that age was check and who made the purchase.
  Home Delivery, for example to provide:
    Proof of Receipt of Goods
    Authorisation to individuals to collect goods on your behalf
    Secure access to a storage unit via connect
  F2F and online KYC, e.g. in the context of:
    Estate/Lettings Agents
    Creating bank accounts
    Insurance
    Mortgage
    Peer2Peer lending
  Employee proving ID to business, for example demonstrating:
    Right to work inc.:
      Visas
      Qualifications
      Nationality etc
    User Access to Business Applications
    Building Access
    Certifications e.g.:
      Health and Safety Course
      Forklift Driver
      First Aid
      Child Protection
      CRB/DBS
      License to Practice
      Insurance, e.g.:
        Indemnity Insurance
        Liability insurance Yotis Issued by Third Parties
  Examples of third parties that can usefully issue Yoti's are:
    Parents
    Businesses
    Charities, e.g.:
      Disaster relief—charity can issue a temporary identity until such a time when the country's infrastructure has improved
      Using Yoti to assign a unique identifier e.g. QR code or an NFC chip to an identity. Yoti is capable of working in an off line capacity
    Yoti portal allowing merchants/vendors/businesses etc to set up a Yoti company profile. From there they can assign attributes and their staff, customers etc that will grant them rights or authentication. This might manifest in gas man and season pass
Global Address Book
  Yoti will allow a profile of attributes to be not only share with multiple people but also be revoked as and when you wish it to be.
  As such users will not ultimately need to keep their own contact directories, rather a global address book will exist with dynamic up to date attributes with with a nexus of permissions that exist between users.
  Sharing a user's contact information with others which gets updated when the user updates
  Being able to restrict access to your contact information
  Sharing business cards
VRM (Vendor Relationship Management)
  Yoti is an enabling technology could realise the visions of Doc Searls and others. In essence, through a certified, secure and trusted identity and digital vault (see below) one could:
    Public release data about oneself that expressed a wish to purchase something, what you would be willing to pay for it, and some terms under which you would be willing to trade.
    Vendors are then able to respond to those terms with offers.
    A protocol that defines the manner in which the these terms are broadcast, consumed and responded to needs to be established.
    A forum in which opportunities can be searched and responded to needs to be established.
    Applications that deliver the above need to be developed.
Digital Vault
  Applications that use a trusted identity as a mechanism to access and control a store of personal data.
  Applications where attributes can be held securely and encrypted.
  Personal vault linked to identity, e.g. for:
    Documents
    Qualifications
    Digital Content
    Medical records
    Wills
    Share Certificates
  Cryptographic key store—allow yoti to store keys to unencrypt secure documents stored elsewhere
Age Restricted Content & Products
  Anonymous Age Verification
  Secure Login
  Prevent Sharing of Login Details
  Age Restricted Chat Rooms
  Children's Games

Applications

Asset Tracking
  Either through tags to physical objects or through virtual devices and node we can associate identities to assets.
  Applications that aid the association of identities and policies to assets.
  Applications that control a register of assets with their identities and policies
  Assigning an identity to an object
  Assigning useful Yoti attributes to RFID tags, QR codes and other unique identifiers that when consumed give out useful data. For example a lost wallet with an RFID tag with personal attributes can be scanned and data delivered that the finder can contact and return the item.
  Digital watermarks
    Assigning an identity to digital content
    Assigning an identity to tickets
  Tagging pets
  Assigning an identity to
    Certificates
    Documents
    Share certificates
IOT (Internet of Things)
  Assigning permissions to IoT connected devices based on a Yoti identity
  Allowing devices to communicate with individuals
  Payment to systems via the ewallet (e.g. accessing an autonomous vehicle)
  Providing a security layer to devices. Any IOT device can ensure that authorised users can access and control it. Both the device and the user have been given an identity via Yoti and as such permissions can be controlled.
  Applications that deliver functionality as above
Microdonations
  Provision of payments through an application where regulations have been met and the transaction charge was negligible and therefore worthwhile.
Messaging System for Healthcare Patients and Staff to Give and Receive Feedback
  Communicate the experience anonymously or directly
  Build a database of outcomes and learning for continual improvement
Loyalty Scheme
Management
  registering to loyalty schemes
  proof of membership, loyalty level, points allocation
Club Management
  registration to clubs/societies
  proof of age
  proof of membership, proof of subscription payment, proof of membership level
  membership communication
  payment of subscriptions and other items relating to club
Digital Signatures
  signing electronic format contracts (like DocuSign)
  acknowledging agreement to an agreement created and hosted on Yoti
Escrow Services
  domain name transfers
  other electronic item transfers
  physical good transfers (e.g. City exchanges)
Invoices
  A service to issue invoices. This would be a useful product for some premium Yoti Individuals/smaller service providers (cleaning lady, electrician, plumber, etc.).
AML (Anti Money Laundering)
  Associating identity to financial transactions.
  Associating identity to the block chains
  Providing immutable, auditable receipts to transactions conducted outside of the traditional (1850-2010) banking platforms, ie transactions through text messages, email, mobile payment applications etc
  Credential Management Apps—Across Devices
  Private Messaging System—Like Wickr but with a guaranteed identity
  Encrypt emails using Yoti, e.g. to provide:
    Digital signatures and encryption using Yoti identities for permission
Ticketing & Anti Touting
  Verifying Identity
  Prevent Bots
  Prevent Multiple Accounts
  Control Purchasing of Tickets, ballots, age restrictions, fan base only etc.
  Blacklists
  VIP lists, promos to select members
  Tout Profiles, monitoring of tout behavior and restricting future access
  Assigning Identity To Tickets
  Purchase of Tickets (through e-wallet)
  Controlled Resale of tickets
  Event Entry Control
  Ballots
  Offer events a profit share on the resale of tickets
  Delivering tickets though a blockchain
  You face is your ticket—no paper ticket nor QR code required.
  Applications that deliver functionality as above
E-Wallet
  Building an e-wallet on top of an identity system
  Social Savings
  Pocket Money/Childrens ewallet, parental control and oversight with a simple mechanism to add funds.
  P2P Payday lending
  Charity Donations
  Associating profiles with contactless payments
  Cryptocurrencies
  Tying in identity with cryptocurrencies
  Secure Ledger, e.g. for managing:
    Cryptocurrency—removes need for distributed ledgers
    Microdonations
    Transferring funds
  Transferring identity details along with payment e.g. transfer age, gender along with the payment to a vendor
Lettings Applications
Overview
  To provide a digital and streamlined alternative for tenants, landlords and letting agents to check identities, employment, residency and credit histories, referencing to ensure compliance to all current legislation.
  Know Your Customer—Validate the identity of tenants, to confirm, full name, nationality, date of birth, current address (3 years history), bank account validation. To include right to rent checks (EEA passport or identity card, permanent residence card or travel document showing indefinite leave to remain, Home Office immigration status document, certificate of registration or naturalisation as a British citizen.
  Credit Checks—to include Credit Check Acceptability Score, credit history search over a six-year period, County Court Judgments (CCJs) & bankruptcy checks, individual voluntary agreements and/or debt management plan information, debts, defaults, rent arrears and repossessions checks.

Employment Verification—Proof of employment (at least 2 years), name of company, contact details, start date, annual salary (inc overtime and bonuses), probationary period.

Business accounts if self employed.

Previous employment details, name of company, contact details, start date, annual salary (inc overtime and bonuses).

Previous landlord—Reference from current landlords or letting agencies—Name, contact details of agents/landlords and address and dates of everywhere you have lived in the past 3 years Rent guarantor's—for students or young people renting for the first time, or you can't prove that you can pay the rent. The guarantor will have to sign a document agreeing to pay the rent if you do not.

Guarantor would usually need to be a UK resident and own a property

Website Page and Requirements
    Website URL
    Yoti Login
Tenant
    Full Name
    Nationality*
    DoB
    Current Address
        If not UK, EEC+Switzerland
    UK Visa (Residency permit etc)
        Chip
        Security Features (where chip not present)
Credit Check (Up to 6 Years History)
    Credit score
    Tenant affordability
    Linked address
    CCJ
    Electoral Roll
    Insolvency
    User has to consent to credit report taking place
Current Employer:
    Name of Company:
    Address of Company:
    Contact: First Name Last Name
    Email Address: (×2)
    Phone Number
    Employee Start Date: Day (option) Month & Year (mandatory)
    Employee End Date: Day (option) Month & Year (mandatory)
    Job Title:
    Annual Salary:
    Probation Period (tick box):
Previous Employer (if Current Employment Less than 2 Years)
    Name of Company:
    Address of Company:
    Contact: First Name Last Name
    Email Address: (×2)
    Phone Number:
    Employee Start Date: Day (option) Month & Year (mandatory)
    Employee End Date: Day (option) Month & Year (mandatory)
    Annual Salary:
Employer Reference
    Receive email with link
    Log in—Usemame & Password (get Yoti, signs in with Yoti?)
    Confirms tenants details:
        Employee Start Date: Day (option) Month & Year (mandatory)
        Employee End Date: Day (option) Month & Year (mandatory)
        Job Title:
        Annual Salary:

Tick box to confirm—By completing this reference you are agreeing that you are authorised to provide this information. It is an offence to supply a fraudulent reference. This reference will be used as part of our assessment of the above named persons application. In line with the Data Protection Act 1998, if requested, a copy of your reference may be supplied to the above named persons and/or the client we are acting on behalf of. I declare that the above statements are true and complete to the best of my knowledge and belief, and that no material facts have been withheld, suppressed or omitted.

Previous Landlord/Agency Reference (Past 3 Years)
        Landlord/Agency Name:
        Contact Person: First Name Last Name
        Email Address:
        Phone Number
        Previous Address:
        Tenancy Start Date: Day (option) Month & Year (mandatory)
        Tenancy End Date: Day (option) Month & Year (mandatory)
        Comments:
            Arrears
            Damage
            AOB
    Guarantor
        Full Name
        Nationality (must be UK resident)
        DoB
        Current Address
        Name of Employee:
        Address of Company:
        Contact: First Name Last Name
        Email Address: (×2)
        Phone Number:
        Employee Start Date: Day (option) Month & Year (mandatory)
        Employee End Date: Day (option) Month & Year (mandatory)
        Job Title:
        Annual Salary Where an applicant tenant selects time at current employer as under 3 months, the site should request that the tenant completes a Guarantor details section. Credit report etc. should then be obtained for the Guarantor instead of the applicant tenant.

Guarantor also required where salary is too low or bad credit rating/criteria is obtained (lettings Agent should be able to select their own thresholds for this to automate the system and require guarantor in advance to reduce back and forth.

Where guarantor is required, we can offer the deed of guarantee agreement as part of the package. Currently, this is done by the letting agent rather than the tenant referencing company.

Reception Applications

What is Yoti Reception?

Yoti Reception is a digital alternative to a paper-bound visitor book. It is much more adaptive than a non-digital solution that allows office buildings to notify inhabitants when they have a visitor, while improving security via digitally ID'ing visitors.

What problem is Yoti Reception trying to solve?

Yoti Reception is a solution to multiple problems that have been detailed below:

| Problem | Solution |
| --- | --- |
| Visitors arriving at company buildings for meetings without the person they are visiting being notified | Yoti Reception will send an email notification to the appropriate person upon arrival of the visitor |
| Venues often have no idea who enters their building | Yoti Reception requires visitors to enter their basic details: name, email address, and picture |
| Venues find it difficult to record who has visited their building over the course of the previous 'x' years | Yoti Reception will provide a digital receipt of a visitor interaction, including: timestamp, name, company visiting from and who they are visiting. This will be stored on a company's web portal and is exportable. |
| Venues have no access to aggregated data | Yoti Reception will include an analytics panel |
| Venues being unsure of an individual's identity | Visitors using their Yoti ID to scan into a Yoti Reception buildings will provide buildings with the verified identity of the individual entering the building |

How are the problems typically dealt with at present?

The current solution implemented by the majority of buildings is to require visitors to sign their name and details into a paper bound log-book held in reception.

Why will Yoti Reception be an improvement?

It will notify the appropriate person that there is a visitor waiting for them, reducing the time in which visitors have to spend unattended in a building foyer It can log details in a digital format that is easily accessible and traceable at both a company level, and at a building level It will integrate with Yoti's ID functionality—giving buildings and companies the peace of mind that individuals who enter their building 1) can't lie about their identity and 2) are held accountable by recording their actual identities Will there be any requirement for a visitor to present ID, and if not, why not?

No, this is because the service is primarily a streamlining solution that enhances the visitor experience rather than a security enhancement. Requiring visitors to presents their ID increases friction within the transaction. In future buildings could disable the email sign-in Nightclub Applications An identity system that is used in places where businesses are legally required to check the identity/age of individuals in real life.

People are used to presenting identity before entering a venue that serves alcohol, meaning they are going to expect to use their Yoti here, whether we offer this product or not. This document is setting out the general strategy for this sector.

Yoti is an identity system that can be used on and offline.

1.1 Problems we are Solving

| Problem | Solution |
| --- | --- |
| Carrying around documents | Yoti is on an individual's phone |
| Employees not trained to identify fraudulent documents | Yoti verifies documents and information before displaying this to businesses |
| No safety aspects to manually looking at a passport | We provide venues with a record of who has entered their venue |
| The lengthy process venues go to get data | One QR scan and we can share data with these venues |

Duty Free and Tax Refunds

Using technology to simplify the international tax refund schemes which are complex to understand time consuming to operate. In addition there is a great deal of error from applicants and the tax authorities which is costly to rectify. The combination of Yoti identity on a phone, in conjunction with the attributes of the visa allowing the foreign national to be eligible for tax free shopping in the country and with the use of ewallet that transacts these payments, our application will:

For Individual

ID individual

From passport classify their nationality

From VISA classify them as category 1, 2 or 3

Present them with and explanation of the benefits of what they can benefit from and the stores from which they can accrue this benefit.

Make them confirm the terms and conditions of the rebate both for HMRC and also to accept and charges that the store may wish to apply to this process Make a payment from YotiWallet or an alternative for the full payment including VAT.

Add the item/s purchased to a basket of qualifying items purchased and display a possible rebate value to be reclaimed upon successful confirmation at customs.

For HMRC Border Staff or Authorised MiPass Staff

ID the individual standing in front of them

Record the date they are exiting the EU (Ticket/Boarding card etc)

Provide a checklist of all the items that are being claimed against so the staff can choose to check/verify.

Certify the export is correct

For the Merchant

Yoti check that the individual is who they say they are and confirm that they qualify for the scheme.

Mandate the acceptance of the scheme and store admin charges and sign the agreement from both parties.

Take a payment from YotiWallet or an alternative for the full value including VAT.

Merchant dashboard should display the total purchases of all qualifying items that are awaiting confirmation at customs and those that have already been approved and refunds due to be paid back out to individuals MiWallet account.

For the Tour Group Leader

Link all individuals associated to their group and track their purchases in each store so that they might benefit from the commission.

Sectors

MOOCs/Training
  Online tests, e.g.
    Random face checks to verify identity
    Verify identity of examinee
    Checking Identity of Examiners
    Assigning qualifications
    Secure Login
    Applications that deliver the functionality above.
Freelancers
  Verifying Previous work e.g. associate identity to previous designs
  Reviews
  Prevent multiple accounts
  Payments (through eWallet)
  Verifying qualifications
  Establishing a contract between 2 parties prior to coming on site. For example a plumber may specify a call out charge and time at £x and materials as their terms and a the purchaser will accept these terms before the plumber departs for the job. Equally the purchaser will expect that quality work will be conducted and will sign off that the work has been conducted to suitable standard. Therefore, reduced ambiguity and happy parties.
  Applications that deliver this functionality.
Sharing Economy
  B2B (Business to Business)
    Verifying Users
    Assurance of identity in an immutable record should something nefarious or unfortunate take place.
    Verifying ownership of shared goods
    Registration/Login
    Payments (through ewallet)
  B2C (Business to Consumer)
    Allow users to send identity to each other over the internet
    Allow users to show identity in person
Classifieds
  Verifying Users
  Verifying ownership of goods
  Registration/Login
  Allow users to send identity to each other over the internet
  Allow users to show identity in person
  Payments (through ewallet)
  Improved safety from knowing who you are dealing with
  Reduced fraud from knowing who you are dealing with.
  Reviews that can be trusted
  Applications that deliver the functionality above.
Online Dating
  Verifying Users
  Prevent Bots
  Prevent Multiple Accounts
  Registration/Login
  Allow users to send identity to each other over the internet prior to meeting. Increasing trust decreasing deception.
  Allow users to show identity in person
  Providing immutable record of identity exchange.
  Temporary Chat
For Example
  An individual is able to register themselves on the site using verified information. This would prevent users creating completely fake profiles, creating multiple profiles or lying about details such as age.
  Before going on a date the two individuals will be able to send their identity to each other using a link through sms/email or another chat function so they both know who they are going to be meeting. Then when they do meet up in person they would be able to do another interaction using the system giving them both a timestamped receipt of meeting up so if anything happened both parties would be able to confirm exactly who they met with and when.
Online Gaming
  AML
  KYC
  Prevent Bots
  Eliminate robots that are rigging games and cheating human players
  Prevent Multiple Accounts
  Secure Login
  Payments (through ewallet)
DRM Content Management
  Assign Identities to Digital Goods
  Allow resale of digital goods through Yoti
Ticketing/Events/Conferences
  Verifying Identity
  Prevent Bots
  PRevent Multiple Accounts
  Control Purchasing of Tickets
  Blacklists
  Tout Profiles
  Assign Identity To Tickets
  Purchase of Tickets (through e-wallet)
  Controlled Resale of tickets
  Event Entry Control
  Ballots
Third Sector
  Disaster relief—charity can issue a temporary identity until such a time when the country's infrastructure has improved
  Using Yoti to assign a unique identifier e.g. QR code or an NFC chip to an identity.
  Review Sites
  Prevent Bots
  Prevent Duplicate Accounts
  Prevent Fake Reviews
  Secure Login
  Verifying Businesses
Public Health
  Verifying Employees
  Verifying Visitors
  Storage of IPatients Health Records
  Asset management
  Building Entry
  Doctor Patient Messaging
  Patient Feedback
  Online Appointment Booking
  Bedside secure access to records for medical professionals
  Patient access to medical records
  Patient access to booking appointments online
Delivery Services
  Verifying Identity of Individuals Picking up parcels
  Giving friends/family permission to pick up parcels on your behalf
  Signing for Parcels-Receipt of Delivery
  Verifying employees
  Asset Management, e.g.:
    Employees signing out vans/cars
Insurance
  Disruption to the insurance by using Yoti connect and face to face as a mechanism to:

Verifying ID more expediently, cutting the time required to accurately establish if a potential is who they claim to be.

Having verified identity expediently to a very high level, risk can be better judged, and premiums positioned to the desired level.

Insurance fraud can be reduced.

Applications can be developed that quickly align individuals to policies

Applications can be developed that allow those seeking insurance to expose their profiles to providers.

Issuance of certificates to be stored as a shareable attribute in the Yoti system.

Recruitment
  Verifying Identities of candidates, e.g:
    Qualifications
    Visas—checking their right to work
    Nationalities
  Sharing identity with HR
  Sharing contact details
  Details can either be shared in person—via a face to face check, or they can be shared remotely—via company specific Webpages, containing QR codes that are communicated to applicants via email or via website integration Retail
  Discounts Based on profile items
  Loyalty Schemes
  Proof of membership
  Proof of age
  Competitions
  Data Capture of shoppers
  EPOS
  Building Access
  Online Retail Login
  Online Retail Registration
  Payments (through eWallet)

Company Profiles
  Business proof of identity to customer on home visits
  Proof of qualifications to customer
  Proof of receipt of visit
  Proof of work done For example British Gas may wish to issue a credential/profile to one of their employees who can show this to homeowner. The homeowner will see the photograph of the Gas operative which is issued and therefore certified by the gas company. Both parties will receive a receipt of the exchange. British Gas can view employees activity log and GPS location.

Residential
  Proof of right to live
  Contact sharing
  Landlords running affordable KYC and credit checks on a potential tenants before investing time to show them round.
  Tenants broadcasting a profile explaining what their budget is and what they are looking for in order to receipt offers.

Financial Services
  KYC
  Quick registration
  AML
  Secure online login
  Disruption to the insurance by using Yoti connect and verifying ID we can mitigate false insurance, creates a lower premium due to lower risk due to a verified identity Unique QR code on envelope or internal document, scanned using Yoti to (biometrically) confirm receipt by intended recipient Building Access Activating Cards, remote authorizing/verifying cards. Which codes printed on cards we can ask user to scan the code to confirm that it is them using it (for example when a bank freeze your card when abroad and asks you to call them back for fraud prevention). By scanning a code on receiving the card you can activate it.

ATM withdrawals, in the future this can be identifying oneself with no need for a cash card.

Onboarding customers and connecting their biometrics to a banking application in one transaction Once a card has been verified as received by a Yoti user, we may record a unique card attribute against this user within their secure set of Yoti attributes. Upon request a user can confirm that they are not only the user that is expected in the transaction but also that they are in possession of the unique card attribute. This can replace card authentication processes such as 3DSecure, Verified by Visa and any other such schemes that are giving the card issuers confidence that the card is be utilised by the authorized person. A typical use case would be when making a purchase of goods or services online using a credit card and being asked to make an additional authentication.

Overview of Yoti for Financial Institutions:

| | |
|---|---|
| Desktop customer Onboarding | AML level checks against verified identity documents that have been biometrically linked to an individual |
| Mobile customer onboarding | AML level checks on a against verified identity documents that have been biometrically linked to an individual. All carried out on a mobile phone - this can include Yoti creation through our SDK |
| MFA Authentication | Authentication linked to a person's verified biometric information, device and passcode |
| Connecting bank card to identity | Connect a bank account/card to Yoti so that the individual can then use their card through Yoti QR codes |
| Reset passcode/order new card | Through taking a selfie a person can biometrically authenticate themselves if they have lost their card and/or forgotten their pin/password, the card could then be sent out like below |
| Bank card authentication | Prove that a person has received a bank card through the post by scanning a static QR code on the letter or on the card itself, this static QR code requests the name of the individual to verify that the right person has received the card |

Universities
  Building Access
  Secure online login
  Receipt of work Submissions
  Verifying identity of students
  Verifying Visas
  Payments (through ewallet)
  Library book loans
  Club/Society Memberships
  Age Verification at Bars
  Roll call for lectures/seminars
  Storing University Certificate qualifications digitally
  Student discounts and offers
  Applying for student loans Airlines
  Purchasing the flight ticket via Yoti ewallet and simultaneously attaching all ID details to the ticket
  Proving identity while purchasing the flight ticket and attaching this ticket to a Yoti Connecting boarding pass to identity
Storing the boarding pass on Yoti
Proving your identity and proof of purchase simultaneously at the airport
Working with airlines, airports and the border authorities to expedite passengers securely through high security areas
Applications that deliver the functionality above Travel
Storing Tickets
Proof of age for discounts Public Sector
Voting and Polling—Online and Offline
Asset Management
Creation of immutable public records that hold identity, ie the land registry, etc.

Adult
The adult sectors is insufficiently regulated and therefore people under the required age to access adult content are often easily able to do so when gaining access to unrestricted internet. Governments are stating that they will instigate change but are lacking tools to do so other than insisting upon ISPs to block providers who do not acquire Credit Card details or ID documents as proof of age. Yoti will enable users to anonymously certify that their are over the required age, giving no names, DOB, address or other attributes. By using the Yoti API an adult site can simply as a response from Yoti to a question eg: "Is this person over 18"? The Yoti validation service will reply "Yes" and given them an anonymous receipt to confirm they have reach the required government standard.

Additional use cases are set out in tables 1 and 2 at the end of the Detailed Description.

Whilst the above has been described in terms of specific embodiments, these are not exhaustive. The scope is not limited by the described embodiments but only by the following claims.

TABLE 1

| Sector | example organisations | log in and reg | Proof that a real person | proof of age | anonymous | proof of address/ contact details | specific use case |
|---|---|---|---|---|---|---|---|
| Events and ticketing | Glastonbury/ Rugby World Cup/U2 | yes | yes | yes | | | stop bots buying tickets/know who is in your venue for H&S requirements/check age |
| Classified sites | Autotrader/ Gumtree/ Freecycle | yes | yes | | | yes | Allowing users to check ID of buyers/sellers to assure they're not going to rip each other off |
| Dating sites | Match.com/ Single Muslims/ Guardian Soulmates | yes | yes | yes | yes | | easy return log in for regular usage/ stop users lying about themselves/ stop sites using bots to lure punters in |
| Peer-to-peer accommodation | Airbnb/ Roomshare | yes | yes | | | yes | Give hosts/guests assurance that users are not villains/give guests assurance that house belongs to host |
| Peer-to-peer car sharing | Bla Bla Car/ Go Car Share | yes | yes | | | yes | Give drivers/passengers assurance that users are not villains/give passengers assurance that car belongs to driver and they have a valid licence etc |
| Peer-to-peer other . . . | Freelancer.com/ chat rooms | yes | yes | yes | | yes | Assurance that people you are talking to are a) real people b) have the age/gender etc they describe |
| online gambling | Jackpot Joy/ Pokerstars/ Lotteries | yes | yes | yes | yes | yes | Check users are over 18 (or 16)/ stop people cheating by setting up multiple usernames |
| adult sites | Playboy/ tube sites | yes | yes | yes | yes | yes | Check users over 18/give anonymous log in |
| children/youth specific sites | Club Penguin | yes | yes | yes | | yes | Check users are not pretending to be children (i.e. grooming) and stopping cyber bullying because bullies can't hide behind fake profiles |
| Retail outlets | ASOS/ Topshop/ Starbucks | yes | yes | yes | | yes | Allowing retail outlets (both online and f2f) to offer age/gender or even name related offers |
| Student bodies | NSU/ Universities | yes | yes | yes | | | building entry/borrowing library books/discounts specific to that uni/ entry to bars and clubs etc |
| Charities and not for profits | UK Youth/ Oxfam/ domestic violence charities | yes | yes | yes | yes | | age and/or gender restricted areas of websites/online polls/assigning Oxfam Yoti profiles in emergency situations to act as a temporary ID doc - probably with NFC chip rather than phone |
| developer/tech community | tech start hubs/ incubators | yes | yes | yes | yes | yes | allow start-ups to build innovative solutions that are reliant on yoti technology and will in turn deliver additional use cases |

TABLE 1-continued

| Sector | example organisations | log in and reg | Proof that a real person | proof of age | anonymous | proof of address/ contact details | specific use case |
|---|---|---|---|---|---|---|---|
| Fintech organisations | Funding Circle/ Seedrs | yes | yes | | | yes | Proving the 'fundee' is legitimate and not going to run off with the cash without delivering |
| Lettings and estate agents | Foxtons . . . | yes | yes | | | yes | estate agents and 'viewers' proving ID to one another (with an audit trail) to increase safety/estate agents using Yoti as proof of ID instead of requesting paper docs etc (recognise not currently legal) |
| Utility companies | British Gas | yes | yes | | | yes | Engineers proving who they are to customers (and vice versa)/ engineers proving to employer they were at location (due to audit trail given by our 'receipts') |
| building entrance | Hotel chains/ office blocks | yes | yes | | | yes | using NFC phones (and chips) as passes to enter buildings and rooms (e.g. in hotel chains) |
| employers | anyone from Lampkicking to Deloitte . . . | yes | yes | yes | | yes | similar to above but a simpler version that just links NFC reader to a tablet to show picture of user when they swipe with Yoti chip (could be used at reception). This will be be particularly relevant in India where security is of paramount importance at the moment and current security solutions v onerous. Can also be used for checking in and out, timesheets for project based work etc. Can also be used at beginning of employment to verify they are who they say they are, maybe even visa requirements etc |
| discussion forums | Health forums/ political commentary | yes | yes | | yes | | allow users to post anonymously when the subject matter may be personal and to prevent racial/sexual bullying etc |
| broadcast and streaming content websites | Sky, Vivendi, Netflix, BBC | yes | yes | yes | | yes | allow broadcasting and streaming companies to better manage their clients, avoiding password sharing, etc.; eventually allow users to use their paid subscriptions abroad (subject to broadcasting rights) |
| multi sector | digital membership details & loyalty programmes | yes | yes | yes | | yes | allow small clubs to manager their membership list, sending communications via yoti and attributing profiles to their members; allow companies to issue loyalty 'cards' via yoti, sharing communications and promotions; allow users to store all membership and loyalty programme details on their yoti |
| multi sector | digital "ownership" of company assets and "usage" by an employee | | | | | | manage company assets, allowed staff users, control which equipment is held by each staff member (hardware, software) |

TABLE 2

| Age/Milestone | Relevant uPass Cases | Information | | | Industry & Sector Targets |
|---|---|---|---|---|---|
| Attending Nursery | | | | | |
| (Age 2-4) | Medical Information | Allergy advice, injections | Maintain secure medical record | | Parents |
| | Safe picks ups | Who can pick child up | | | Nurseries |
| First passport School | | | | | |
| (Age 5-18) | Lunch money | Parents topping up account, setting limits on amount child can spent and see what they are spending money on | The end of payment hassle | | |
| | Trip money | Parents agrees for child to attend trips, sends money for trip | | | |
| | Geo-location | Parents being able to see location of children (maybe up until a certain age age) | | | |
| | Exams | Individual attends exams (although usually phones aren't allowed in exam rooms) | | | |
| | Exams Results | Link exam results to uPass | Prove qualifications | | |
| | First bank account | | | | |
| | Travel pass | | | | |
| | Set up Social Networking Sites | | End of username and passwords | | |
| | Online Games | | End of username and passwords | | |
| | Children Chat Rooms | Proving they are the correct age to enter the chat room | Eliminating grooming | | |
| | Sending money to friends | | The end of payment hassle | | |
| | CV | Job application, job sites | Prove qualifications | End of username and passwords | |
| | Work - part-time | | Corporate logon/authentication | | |
| | Learning to drive | | | | |
| | University Application (UCAS) | | Prove qualifications | End of username and passwords | |
| | Buying Age restricted goods (offline and online) | | Easy online age check | | |
| | Cinema - proving age | | Easy face to face check | | |
| | Buying Tickets | | Eliminating Touting | | |
| | Receiving money from parents | | The end of payment hassle | | |
| | Medical Information | | Maintain secure medical record | | |

TABLE 2-continued

| Age/ Milestone | Relevant uPass Cases | Information | | | Industry & Sector Targets |
|---|---|---|---|---|---|
| Second passport University | | | | | |
| (Age 18-21) | Exams | Attendance and proof of results | Prove qualifications | | |
| | University Access/Login | | End of username and passwords (Uni website) | | |
| | Using taxis | | | | |
| | Student Loans | Application | | | |
| | Student Discounts | Proof of student status | Proof of age (student status) | End of username and passwords (student discount sites) | |
| | Buying Age restricted goods (offline and online) | Alcohol etc. | Easy online age check | The end of payment hassle | |
| | Entering Clubs | | Easy face to face check | | |
| | Buying Tickets | | Eliminating Touting | The end of payment hassle | |
| | Sending money to friends | | The end of payment hassle | | |
| | Receiving money from parents | | The end of payment hassle | | |
| | Insurance | (Travel, Contents, Car) | | End of username and passwords - Insurance sites | |
| | Online dating | | Eliminating scammers/ fake accounts | Eliminating bot/fake accounts | End of username and passwords |
| | Adult sites/ films | | Easy online age check | End of username and passwords | |
| | Trading Items | Buying and Selling online | | End of username and passwords | |
| | Parcel delivery and pick up | (Proof of delivery and pick up) | Free secure ID | | |
| | Part-time work/ Work experience | Applications, references | Prove qualifications | Corporate logon/ authentication | |
| | Register for voting | | Free Digital democracy for all | | |
| | Online fundraising | | | | |
| | Accomodation | (Proving exempt from Council Tax) | Proof of student status | | |
| | Volunteering | | Corporate logon/ authentication | | |
| | Job applications | Entering details, logging into job/CV sites | Prove qualifications | End of username and passwords | |
| | Medical Information | | Maintain secure medical record | | |

TABLE 2-continued

| Age/ Milestone | Relevant uPass Cases | Information | | | Industry & Sector Targets |
|---|---|---|---|---|---|
| Post Student | | | | | |
| (22+) | CRB/DBS Checks | | | | |
| | Work - entering company buildings | | Corporate logon/ authentication | | |
| | Work - HR | Proof of ID, CV/qualifications | Prove qualifications | Easy face to face check | |
| | Car Rental | | | | |
| | Insurance | (Home, Pet, Travel, Contents, Car) | | | |
| | Professional Exams | (Proof of results) | Prove qualifications | | |
| | Using taxis | | | | |
| Third passport | | | | | |
| | Mortgages/ Financial Services | | Eliminating ID fraud | | |
| | News/ Website Subscription | | Micropayments | | |
| | Donating to Charity | | Micropayments | End of payment hassle | |
| | Adult Chat Rooms | | Easy online age check | Eliminating scammers/ fake accounts | |
| | Dating Sites | | Eliminating scammers/ fake accounts | Easy online age check | End of username and passwords |
| | Register Council Tax | | | | |
| | Medical Records | | Maintain secure medical record | | |
| | Buying Tickets | | Eliminating Touting | | |
| | Loyalty Programmes | | | | |
| | Parcel Delivery/ Pick Up | (Proof of deliver/pick up) | Free secure ID | | |
| | Online Shopping | (Proof of delivery) | End of payment hassle | End of username and passwords | |
| | Home care - Cleaner | Know who is entering your home - their ID, experience etc. | Doorstep villains | Prove qualifications | |
| | Home care - Decorator | | Doorstep villains | Prove qualifications | |
| | Home care - Builders | | Doorstep villains | Prove qualifications | |
| | Important Docs (uPass Vault) | Insurance | Signing digital documents | | |
| | | Large Purchases (receipts) | Asset management with insurance | | |
| | | Passwords | | | |
| | | Driving License | | | |
| | | Financial Info, Shares | Asset management with insurance | | |
| | | Store Card Details | Eliminating ID fraud | | |
| | Digital Signature | | | | |
| | Parental Duties | Access to nursery, allowed to pick child up from nursery/school Nanny/childcare vetting Child trust funds | | | |

TABLE 2-continued

| Age/Milestone | Relevant uPass Cases | Information | | Industry & Sector Targets |
|---|---|---|---|---|
| Retirement | | | | |
| | Pension | | | |
| | Travel passes | | | |
| | Health Profile | Medical Information | | |
| | Emergency Contacts | | | |
| | Important Docs (uPass Vault) | Will, estate information | Asset management with insurance | Signing digital documents |
| | Online shopping | | The end of payment hassle | |
| | Online Dating | | Eliminating scammers/ fake accounts | |
| | Gambling Sites | | | |
| | Access to community services | | | |
| | Financial Information | Stocks and shares | Eliminating ID fraud | |
| | Insurance | | | |

The invention claimed is:

1. A method of tracking a physical object, the method comprising:
   at a recipient device operated by a recipient of the physical object, scanning a token of a bearer received with the physical object, the token of the bearer having been applied to the physical object by the bearer, the token received with the physical object having been associated at a digital identity system with a bearer address, in response to at least one electronic message received from the bearer;
   transmitting, from the recipient device to a validation service of the digital identity system, a validation message comprising the scanned token of the bearer and a credential stored at the recipient device, the credential being bound to a digital identity of the recipient maintained by the digital identity system;
   at the validation service, validating the credential, and if the credential is valid, using the credential and the digital identity of the recipient to create an electronic message comprising or indicating: a unique code identifying the recipient, and/or a digital identity attribute of the digital identity of the recipient; and
   transmitting the electronic message to a bearer device associated with said bearer address associated with the scanned token, at the digital identity system, wherein the electronic message confirms to the bearer receipt of the physical object by the recipient.

2. The method according to claim 1, wherein the digital identity system uses the scanned token to access at least one attribute of the physical object stored at the digital identity system, wherein the electronic message also comprises or indicates the attribute of the physical object.

3. The method according to claim 2, wherein the attribute of the physical object forms part of a digital identity of the physical object.

4. The method according to claim 1, wherein the electronic message comprises the unique code, the unique code being a composite code that is generated by combining a unique code of the bearer with a unique code of the recipient.

5. The method according to claim 1, wherein the electronic message comprises the unique code, the unique code having been made available to the bearer by the digital identity system in an earlier transaction between the recipient and the bearer.

6. The method according to claim 1, wherein the electronic message comprises the attribute, the attribute being a name or a facial image determined from the recipient's digital identity.

7. The method according to claim 1, wherein the electronic message received at the bearer device is used to determine whether the recipient is an intended recipient of the physical object.

8. The method according to claim 7, wherein the physical object is activated if the recipient is determined to be the intended recipient.

9. The method according to claim 8, wherein the physical object is a bank card.

10. The method according to claim 1 further comprising storing, as part of the recipient's digital identity, a unique object attribute which can be presented to other entities to confirm the recipient is in possession of a unique card attribute.

11. The method according to claim 1, wherein the token is a printed token.

12. The method according to claim 11, wherein the printed token is in the form of a printed QR code or barcode.

13. The method according to claim 1, wherein the token is scanned from an electronic chip received with the object.

14. The method according to claim 13, wherein the electronic chip is an RFID or NFC chip.

15. The method according to claim 1, wherein the digital identity attribute of the recipient is held at the digital identity system.

16. A system for tracking a physical object, the system comprising:
   a digital identity system configured to maintain a digital identity of a recipient having a credential bound thereto, wherein the digital identity system is configured to receive at least one electronic message from a bearer and associate a bearer address with a token of the bearer in response; and
   a recipient device comprising a scanner for scanning the token of the bearer received with the physical object, the token of the bearer having been applied to the physical object by the bearer, the token received with the physical object having been associated at the digital identity system with the bearer address, and a processor configured to transmit, from the recipient device to the digital identity system, a validation message comprising the scanned token of the bearer and the credential stored at the recipient device, the credential being bound to the digital identity of the recipient maintained by the digital identity system;

wherein the digital identity system comprises one or more processors configured to execute computer-readable instructions, which cause the one or more processors to validate the credential received in the validation message, and if the credential is valid:

use the credential and the digital identity of the recipient to create an electronic message comprising or indicating: a unique code identifying the recipient, and/or a digital identity attribute of the digital identity of the recipient, and transmit the electronic message to a bearer device associated with said bearer address associated with the scanned token at the digital identity system, wherein the electronic message confirms to the bearer receipt of the physical object by the recipient.

17. The system according to claim 16, wherein the electronic message comprises the unique code, the unique code being a composite code that is generated by combining a unique code of the bearer with a unique code of the recipient.

18. The system according to claim 17, wherein the digital identity system is configured to make the unique code available to the bearer in an earlier transaction between the recipient and the bearer.

19. The system according to claim 16 further comprising the bearer device, wherein the bearer device is configured to use the electronic message to determine whether the recipient is an intended recipient of the physical object.

20. The system according to claim 19, wherein the system is configured to activate the physical object if the recipient is determined to be the intended recipient.

* * * * *